(12) United States Patent
Lezzi et al.

(10) Patent No.: US 11,891,324 B2
(45) Date of Patent: Feb. 6, 2024

(54) THERMALLY STRENGTHENED CONSUMER ELECTRONIC GLASS AND RELATED SYSTEMS AND METHODS

(71) Applicant: CORNING INCORPORATED, Corning, NY (US)

(72) Inventors: Peter Joseph Lezzi, Corning, NY (US); Richard Orr Maschmeyer, Corning, NY (US); John Christopher Thomas, Elmira, NY (US); Kevin Lee Wasson, Elmira, NY (US)

(73) Assignee: CORNING INCORPORATED, Corning, NY (US)

( * ) Notice: Subject to any disclaimer, the term of this patent is extended or adjusted under 35 U.S.C. 154(b) by 268 days.

(21) Appl. No.: 17/380,461

(22) Filed: Jul. 20, 2021

(65) Prior Publication Data

US 2021/0347672 A1    Nov. 11, 2021

Related U.S. Application Data

(63) Continuation of application No. 15/749,015, filed as application No. PCT/US2016/044406 on Jul. 28, (Continued)

(51) Int. Cl.
*C03B 27/012* (2006.01)
*B32B 17/10* (2006.01)
(Continued)

(52) U.S. Cl.
CPC ...... *C03B 27/012* (2013.01); *B32B 17/10036* (2013.01); *B60J 1/001* (2013.01);
(Continued)

(58) Field of Classification Search
None
See application file for complete search history.

(56) References Cited

U.S. PATENT DOCUMENTS

| 2,106,527 A | 1/1938 | Hostetter |
| 2,145,119 A | 1/1939 | Littleton |

(Continued)

FOREIGN PATENT DOCUMENTS

| AU | 42657/72 A | 11/1973 |
| AU | 05245/73 B2 | 9/1982 |

(Continued)

OTHER PUBLICATIONS

Gupta, Prabhat, "Landscape Approach to Glass Transition and Relaxation: Four lectures on 'The Landscape Approach,'" IMI-NFG's MITT Course on Relaxation Processes in Glass Lecture 17, Mar. 23, 2010, 28 slides.

(Continued)

*Primary Examiner* — David Sample
(74) *Attorney, Agent, or Firm* — Russell S. Magaziner

(57) ABSTRACT

A strengthened cover glass or glass-ceramic sheet or article as well as processes and systems for making the strengthened glass or glass-ceramic sheet or article is provided for use in consumer electronic devices. The process comprises cooling the cover glass sheet by non-contact thermal conduction for sufficiently long to fix a surface compression and central tension of the sheet. The process results in thermally strengthened cover glass sheets for use in or on consumer electronic products.

20 Claims, 24 Drawing Sheets

Related U.S. Application Data 2016, now Pat. No. 11,097,974, which is a continuation-in-part of application No. 14/814,274, filed on Jul. 30, 2015, now Pat. No. 9,776,905, and a continuation-in-part of application No. 14/814,232, filed on Jul. 30, 2015, now Pat. No. 9,296,638, and a continuation-in-part of application No. 14/814,319, filed on Jul. 30, 2015, now Pat. No. 9,975,801, which is a continuation-in-part of application No. 14/814,335, filed on Jul. 30, 2015, now Pat. No. 10,077,204, said application No. PCT/US2016/044406 is a continuation-in-part of application No. 14/814,363, filed on Jul. 30, 2015, and a continuation-in-part of application No. 14/814,303, filed on Jul. 30, 2015, now Pat. No. 9,783,448, and a continuation-in-part of application No. 14/814,293, filed on Jul. 30, 2015, now Pat. No. 9,802,853.

(60) Provisional application No. 62/288,851, filed on Jan. 29, 2016, provisional application No. 62/286,192, filed on Jan. 22, 2016, provisional application No. 62/236,296, filed on Oct. 2, 2015.

(51) Int. Cl.

| | | |
|---|---|---|
| *B60J 1/00* | (2006.01) | |
| *C03B 27/016* | (2006.01) | |
| *C03B 27/04* | (2006.01) | |
| *C03B 27/044* | (2006.01) | |
| *C03B 27/048* | (2006.01) | |
| *C03B 27/052* | (2006.01) | |
| *C03B 29/12* | (2006.01) | |
| *C03B 29/06* | (2006.01) | |
| *C03B 35/24* | (2006.01) | |
| *C03C 21/00* | (2006.01) | |
| *C03C 3/11* | (2006.01) | |
| *C03B 29/16* | (2006.01) | |

(52) U.S. Cl.
CPC ............ *C03B 27/016* (2013.01); *C03B 27/04* (2013.01); *C03B 27/0404* (2013.01); *C03B 27/044* (2013.01); *C03B 27/048* (2013.01); *C03B 27/0413* (2013.01); *C03B 27/052* (2013.01); *C03B 27/0526* (2013.01); *C03B 29/12* (2013.01); *C03B 29/16* (2013.01); *C03B 35/24* (2013.01); *C03C 3/11* (2013.01); *C03C 21/002* (2013.01); *Y10T 428/315* (2015.01)

(56) References Cited

U.S. PATENT DOCUMENTS

| | | |
|---|---|---|
| 2,177,336 A | 10/1939 | Shaver et al. |
| 3,107,196 A | 10/1963 | Acloque |
| 3,169,900 A | 2/1965 | Ermlich |
| 3,174,839 A | 3/1965 | Long |
| 3,223,499 A | 12/1965 | Cypher et al. |
| 3,223,501 A | 12/1965 | Fredley et al. |
| 3,223,549 A | 12/1965 | Fredley et al. |
| 3,225,349 A | 12/1965 | Thor |
| 3,279,906 A | 10/1966 | Baker |
| 3,287,200 A | 11/1966 | Hess et al. |
| 3,293,015 A | 12/1966 | Fredley et al. |
| 3,332,759 A | 7/1967 | McMaster et al. |
| 3,374,078 A | 3/1968 | Wright |
| 3,409,422 A | 11/1968 | Gulotta |
| 3,423,198 A | 1/1969 | McMaster et al. |
| 3,445,316 A | 5/1969 | Megles |
| 3,449,102 A | 6/1969 | Nedelec et al. |
| 3,497,340 A | 2/1970 | Dennison et al. |
| 3,556,757 A | 1/1971 | Kozlowski et al. |
| 3,558,415 A | 1/1971 | Rieser et al. |
| 3,607,169 A | 9/1971 | Coxe |
| 3,637,453 A | 1/1972 | Simmons |
| 3,673,049 A | 6/1972 | Giffen et al. |
| 3,679,388 A | 7/1972 | Giddings et al. |
| 3,744,921 A | 7/1973 | Weller et al. |
| 3,753,674 A | 8/1973 | Ohlberg et al. |
| 3,776,712 A | 12/1973 | Wilde |
| 3,793,127 A | 2/1974 | Wartenberg |
| 3,794,476 A | 2/1974 | Michalik et al. |
| 3,830,540 A | 8/1974 | Sperry |
| 3,844,758 A | 10/1974 | Wartenberg |
| 3,850,679 A | 11/1974 | Sopko et al. |
| 3,883,339 A | 5/1975 | Michalik et al. |
| 3,890,128 A | 6/1975 | Melling et al. |
| 3,902,884 A | 9/1975 | Harrison |
| 3,929,442 A | 12/1975 | Neely, Jr. |
| 3,931,438 A | 1/1976 | Beall et al. |
| 3,936,291 A | 2/1976 | McMaster |
| 3,973,943 A | 8/1976 | Seymour |
| 3,994,711 A | 11/1976 | McMaster |
| 4,081,254 A | 3/1978 | Matsumoto et al. |
| 4,091,163 A | 5/1978 | Clausen |
| 4,107,460 A | 8/1978 | Grunza et al. |
| 4,128,690 A | 12/1978 | Boardman et al. |
| 4,194,898 A | 3/1980 | Marsh et al. |
| 4,198,226 A | 4/1980 | Marsh et al. |
| 4,198,463 A | 4/1980 | Greenhalgh |
| 4,204,845 A | 5/1980 | Shields et al. |
| 4,214,886 A | 7/1980 | Shay et al. |
| 4,286,052 A | 8/1981 | Ernsberger |
| 4,300,936 A | 11/1981 | Quillevere et al. |
| 4,314,836 A | 2/1982 | Seymour |
| 4,319,907 A | 3/1982 | Pike |
| 4,332,605 A | 6/1982 | Wright et al. |
| 4,372,774 A | 2/1983 | Cross et al. |
| 4,400,193 A | 8/1983 | Cross et al. |
| 4,470,838 A | 9/1984 | McMaster et al. |
| 4,471,024 A | 9/1984 | Pargamin et al. |
| 4,494,972 A | 1/1985 | Marsh et al. |
| 4,516,999 A | 5/1985 | Kiefer et al. |
| 4,662,926 A | 5/1987 | Aratani et al. |
| 4,690,871 A | 9/1987 | Gordon |
| 4,744,676 A | 5/1988 | Lind |
| 4,773,926 A | 9/1988 | Letemps et al. |
| 4,826,525 A | 5/1989 | Chesworth et al. |
| 4,913,720 A | 4/1990 | Gardon et al. |
| 4,973,163 A | 11/1990 | Sakai et al. |
| 4,985,275 A | 1/1991 | Takemura et al. |
| 5,009,694 A | 4/1991 | Nishitani et al. |
| 5,057,375 A | 10/1991 | Gordon |
| 5,071,796 A | 12/1991 | Jones et al. |
| 5,121,329 A | 6/1992 | Crump |
| 5,213,440 A | 5/1993 | Yeh et al. |
| 5,236,488 A | 8/1993 | Vehmas |
| 5,285,517 A | 2/1994 | Wu |
| 5,340,433 A | 8/1994 | Crump |
| 5,500,287 A | 3/1996 | Henderson |
| 5,626,911 A | 5/1997 | Bertin et al. |
| 5,643,649 A | 7/1997 | Hagan et al. |
| 5,654,057 A | 8/1997 | Kitayama et al. |
| 5,676,722 A | 10/1997 | Seidel et al. |
| 5,735,923 A | 4/1998 | Hisaeda |
| 5,795,659 A | 8/1998 | Meelu et al. |
| 5,885,316 A | 3/1999 | Sato et al. |
| 5,931,981 A | 8/1999 | McMaster et al. |
| 5,938,808 A | 8/1999 | McMaster et al. |
| 5,938,810 A | 8/1999 | De Vries et al. |
| 5,939,175 A | 8/1999 | Sugiura |
| 5,972,513 A | 10/1999 | Yoshizawa |
| 6,053,011 A | 4/2000 | Lisec |
| 6,079,227 A | 6/2000 | Yoshizawa et al. |
| 6,094,943 A | 8/2000 | Okuda et al. |
| 6,117,283 A | 9/2000 | Chen et al. |
| 6,183,565 B1 | 2/2001 | Granneman et al. |
| 6,200,665 B1 | 3/2001 | Seto |
| 6,295,842 B1 | 10/2001 | McMaster |
| 6,336,775 B1 | 1/2002 | Morita et al. |
| 6,353,283 B1 | 3/2002 | Ghosh et al. |

(56) References Cited

U.S. PATENT DOCUMENTS

| | | |
|---|---|---|
| 6,370,917 B1 | 4/2002 | Kato et al. |
| 6,412,309 B1 | 7/2002 | Kajii et al. |
| 6,442,017 B1 | 8/2002 | Ewing et al. |
| 6,461,439 B1 | 10/2002 | Granneman et al. |
| 6,472,800 B2 | 10/2002 | Goda et al. |
| 6,598,427 B1 | 7/2003 | Douche et al. |
| 6,613,685 B1 | 9/2003 | Granneman et al. |
| 6,642,017 B2 | 11/2003 | Weiser |
| 6,656,597 B2 | 12/2003 | Takahara |
| 6,713,180 B1 | 3/2004 | Torr et al. |
| 6,722,160 B1 | 4/2004 | Nemugaki et al. |
| 6,770,851 B2 | 8/2004 | Granneman et al. |
| 6,805,749 B2 | 10/2004 | Granneman et al. |
| 6,826,929 B2 | 12/2004 | Boaz |
| 6,877,250 B2 | 4/2005 | Granneman et al. |
| 6,881,485 B2 | 4/2005 | Kato et al. |
| 6,881,931 B2 | 4/2005 | Vehmas et al. |
| 6,977,710 B2 | 12/2005 | Akiyama et al. |
| 7,022,627 B2 | 4/2006 | Granneman et al. |
| 7,048,488 B1 | 5/2006 | Kuznetsov et al. |
| 7,153,798 B2 | 12/2006 | Bordeaux et al. |
| 7,215,262 B2 | 5/2007 | Suzuki et al. |
| 7,261,939 B2 | 8/2007 | Hallett et al. |
| 7,306,848 B2 | 12/2007 | Tominaga et al. |
| 7,312,156 B2 | 12/2007 | Granneman et al. |
| 7,341,968 B2 | 3/2008 | Yoda et al. |
| 7,367,205 B1 | 5/2008 | Boaz |
| 7,410,355 B2 | 8/2008 | Granneman et al. |
| 7,566,673 B2 | 7/2009 | Kawai |
| 7,666,511 B2 | 2/2010 | Ellison et al. |
| 7,694,532 B1 | 4/2010 | Boaz |
| 7,867,932 B2 | 1/2011 | Beall |
| 7,908,885 B2 | 3/2011 | Devitt |
| 8,074,473 B2 | 12/2011 | Nitschke et al. |
| 8,233,433 B2 | 7/2012 | Kalhan |
| 8,234,883 B2 | 8/2012 | Krall et al. |
| 8,289,342 B2 | 10/2012 | Matsumoto |
| 8,415,013 B2 | 4/2013 | Barefoot et al. |
| 8,524,804 B2 | 9/2013 | Kitano et al. |
| 8,585,463 B2 | 11/2013 | Nakae |
| 8,679,599 B2 | 3/2014 | Grzybowski et al. |
| 8,713,967 B2 | 5/2014 | Danielson et al. |
| 8,713,972 B2 | 5/2014 | Lakota et al. |
| 8,728,961 B2 | 5/2014 | Lautenschlaeger et al. |
| 8,759,238 B2 | 6/2014 | Chapman et al. |
| 8,765,262 B2 | 7/2014 | Gross |
| 8,769,990 B2 | 7/2014 | Saito et al. |
| 8,776,548 B2 | 7/2014 | Dannoux et al. |
| 8,802,581 B2 | 8/2014 | Dejneka et al. |
| 8,821,999 B2 | 9/2014 | Grzybowski et al. |
| 8,854,623 B2 | 10/2014 | Fontaine et al. |
| 8,916,013 B2 | 12/2014 | Hong et al. |
| 8,946,103 B2 | 2/2015 | Dejneka et al. |
| 8,951,927 B2 | 2/2015 | Dejneka et al. |
| 8,997,521 B2 | 4/2015 | Vehmas et al. |
| 9,003,835 B2 | 4/2015 | Lock |
| 9,039,886 B2 | 5/2015 | Gong et al. |
| 9,073,291 B2 | 7/2015 | Bookbinder et al. |
| 9,137,892 B2 | 9/2015 | Bando et al. |
| 9,145,329 B2 | 9/2015 | Drake et al. |
| 9,156,724 B2 | 10/2015 | Gross |
| 9,296,638 B2 | 3/2016 | Lezzi et al. |
| 9,478,449 B2 | 10/2016 | Vermont et al. |
| 9,522,836 B2 | 12/2016 | Gulati et al. |
| 9,552,836 B2 | 1/2017 | Ramakrishnan et al. |
| 9,586,861 B2 | 3/2017 | Borrelli et al. |
| 9,725,359 B2 | 8/2017 | Weber |
| 9,761,828 B2 | 9/2017 | Dabich et al. |
| 9,776,905 B2 * | 10/2017 | Maschmeyer ........ C03B 27/044 |
| 9,783,448 B2 * | 10/2017 | Maschmeyer ........... B60J 1/001 |
| 9,802,853 B2 * | 10/2017 | Maschmeyer ........ C03B 27/052 |
| 9,957,190 B2 | 5/2018 | Finkeldey et al. |
| 9,975,801 B2 * | 5/2018 | Maschmeyer .... B32B 17/10036 |
| 10,005,691 B2 * | 6/2018 | Maschmeyer .... B32B 17/10036 |
| 10,077,204 B2 * | 9/2018 | Maschmeyer .... B32B 17/10036 |
| 10,150,699 B2 | 12/2018 | Baum et al. |
| 10,173,923 B2 | 1/2019 | Kawamoto et al. |
| 10,195,778 B2 | 2/2019 | Wolf et al. |
| 10,253,550 B1 | 4/2019 | Kim et al. |
| 11,097,974 B2 * | 8/2021 | Lezzi ..................... C03B 29/16 |
| 2001/0007723 A1 | 7/2001 | Tokumoto |
| 2002/0011481 A1 | 1/2002 | Melson et al. |
| 2002/0145213 A1 | 10/2002 | Liu et al. |
| 2003/0037569 A1 | 2/2003 | Arbab et al. |
| 2003/0177790 A1 | 9/2003 | Langsdorf et al. |
| 2004/0107733 A1 | 6/2004 | Yashizawa |
| 2005/0099618 A1 | 5/2005 | Difoggio et al. |
| 2005/0138892 A1 | 6/2005 | Misonou |
| 2005/0266247 A1 | 12/2005 | Yoshizawa |
| 2006/0054774 A1 | 3/2006 | Yassour et al. |
| 2006/0121281 A1 | 6/2006 | Tamai et al. |
| 2006/0179722 A1 | 8/2006 | Spindler |
| 2006/0191292 A1 | 8/2006 | Carlomagno |
| 2006/0219605 A1 | 10/2006 | Devitt |
| 2006/0238100 A1 | 10/2006 | Miyata et al. |
| 2007/0122580 A1 | 5/2007 | Krall et al. |
| 2007/0271957 A1 | 11/2007 | Nakamura et al. |
| 2008/0314403 A1 | 12/2008 | Rebours |
| 2009/0069163 A1 | 3/2009 | Beall |
| 2009/0092472 A1 | 4/2009 | Luo et al. |
| 2009/0220761 A1 | 9/2009 | Dejneka et al. |
| 2010/0035038 A1 | 2/2010 | Barefoot et al. |
| 2010/0084016 A1 | 4/2010 | Aitken et al. |
| 2010/0130251 A1 | 5/2010 | Chu |
| 2010/0162761 A1 | 7/2010 | Carney et al. |
| 2010/0183767 A1 | 7/2010 | Noordam et al. |
| 2010/0279067 A1 | 11/2010 | Sabia et al. |
| 2010/0279068 A1 | 11/2010 | Cook et al. |
| 2010/0300535 A1 | 12/2010 | Aitken et al. |
| 2010/0300536 A1 | 12/2010 | Aitken et al. |
| 2011/0014475 A1 | 1/2011 | Murata |
| 2011/0045961 A1 | 2/2011 | Dejneka et al. |
| 2011/0123832 A1 | 5/2011 | Matsumoto et al. |
| 2011/0123833 A1 | 5/2011 | Endo et al. |
| 2011/0200804 A1 | 8/2011 | Tomamoto et al. |
| 2011/0281093 A1 | 11/2011 | Gulati et al. |
| 2011/0289971 A1 | 12/2011 | Brown et al. |
| 2011/0289972 A1 | 12/2011 | Brown et al. |
| 2012/0052271 A1 | 3/2012 | Gomez et al. |
| 2012/0144867 A1 | 6/2012 | Busch |
| 2012/0145991 A1 | 6/2012 | Nam et al. |
| 2012/0164314 A1 | 6/2012 | Labranche et al. |
| 2012/0194974 A1 | 8/2012 | Weber et al. |
| 2012/0247063 A1 | 10/2012 | Grzybowski et al. |
| 2012/0258250 A1 | 10/2012 | Rodgers |
| 2012/0281279 A1 | 11/2012 | Goto et al. |
| 2012/0291707 A1 | 11/2012 | Granneman |
| 2012/0328843 A1 | 12/2012 | Cleary et al. |
| 2013/0008500 A1 | 1/2013 | Lin et al. |
| 2013/0019639 A1 | 1/2013 | Saito et al. |
| 2013/0047673 A1 | 2/2013 | Lee et al. |
| 2013/0052347 A1 | 2/2013 | Kuznetsov et al. |
| 2013/0059120 A1 | 3/2013 | Shi et al. |
| 2013/0065795 A1 | 3/2013 | Allbritton et al. |
| 2013/0071666 A1 | 3/2013 | Komori et al. |
| 2013/0122284 A1 | 5/2013 | Gross |
| 2013/0122313 A1 | 5/2013 | Gross |
| 2013/0199448 A1 | 8/2013 | Granneman et al. |
| 2013/0255314 A1 | 10/2013 | Allan et al. |
| 2013/0291598 A1 | 11/2013 | Saito et al. |
| 2013/0323444 A1 | 12/2013 | Ehemann et al. |
| 2014/0010992 A1 | 1/2014 | Rendon Granados |
| 2014/0026622 A1 | 1/2014 | Wang |
| 2014/0050912 A1 | 2/2014 | Isono et al. |
| 2014/0053605 A1 | 2/2014 | Mader |
| 2014/0065401 A1 | 3/2014 | Donovan et al. |
| 2014/0106172 A1 | 4/2014 | Dejneka et al. |
| 2014/0113854 A1 | 4/2014 | Ni et al. |
| 2014/0120279 A1 | 5/2014 | Demartino et al. |
| 2014/0141217 A1 | 5/2014 | Gulati et al. |
| 2014/0162000 A1 | 6/2014 | Son et al. |
| 2014/0178663 A1 | 6/2014 | Varshneya et al. |
| 2014/0218867 A1 | 8/2014 | Kim et al. |
| 2014/0230492 A1 | 8/2014 | Murata |

(56) References Cited

U.S. PATENT DOCUMENTS

| | | |
|---|---|---|
| 2014/0242391 A1 | 8/2014 | Ono et al. |
| 2014/0290310 A1 | 10/2014 | Green |
| 2014/0331716 A1 | 11/2014 | Ahmed et al. |
| 2014/0352355 A1 | 12/2014 | Boudreau et al. |
| 2014/0356605 A1 | 12/2014 | Adib et al. |
| 2014/0370302 A1 | 12/2014 | Amin et al. |
| 2014/0370303 A1 | 12/2014 | Jin et al. |
| 2015/0027169 A1 | 1/2015 | Fredholm |
| 2015/0030827 A1 | 1/2015 | Gomez et al. |
| 2015/0030834 A1 | 1/2015 | Morey et al. |
| 2015/0031752 A1 | 1/2015 | Keil et al. |
| 2015/0037552 A1 | 2/2015 | Mauro |
| 2015/0051061 A1 | 2/2015 | Kiczenski et al. |
| 2015/0052949 A1 | 2/2015 | Bayne et al. |
| 2015/0082834 A1 | 3/2015 | Vehmas et al. |
| 2015/0083200 A1 | 3/2015 | Hickman et al. |
| 2015/0096331 A1 | 4/2015 | Rantala et al. |
| 2015/0158276 A1 | 6/2015 | Thompson et al. |
| 2015/0158757 A1 | 6/2015 | Amma et al. |
| 2015/0166390 A1 | 6/2015 | Cha et al. |
| 2015/0166401 A1 | 6/2015 | Yamamoto |
| 2015/0175469 A1 | 6/2015 | Tabe |
| 2015/0202845 A1 | 7/2015 | Cherekdjian et al. |
| 2015/0218045 A1 | 8/2015 | Balcom et al. |
| 2015/0240038 A1 | 8/2015 | Macedo et al. |
| 2015/0246846 A1 | 9/2015 | Choju et al. |
| 2015/0251353 A1 | 9/2015 | Rodgers et al. |
| 2015/0251377 A1 | 9/2015 | Cleary et al. |
| 2015/0266235 A1 | 9/2015 | Page |
| 2015/0274015 A1 | 10/2015 | Wachinger et al. |
| 2015/0307385 A1 | 10/2015 | Klein et al. |
| 2015/0314571 A1 | 11/2015 | Cites et al. |
| 2015/0329406 A1 | 11/2015 | Kawamoto et al. |
| 2015/0343704 A1 | 12/2015 | Stahl et al. |
| 2015/0368153 A1 | 12/2015 | Pesansky et al. |
| 2016/0002103 A1 | 1/2016 | Wang et al. |
| 2016/0031739 A1 | 2/2016 | Lezzi et al. |
| 2016/0031741 A1 | 2/2016 | Maschmeyer et al. |
| 2016/0031742 A1 | 2/2016 | Maschmeyer et al. |
| 2016/0031743 A1 | 2/2016 | Maschmeyer et al. |
| 2016/0031744 A1 | 2/2016 | Maschmeyer et al. |
| 2016/0031752 A1 | 2/2016 | Maschmeyer et al. |
| 2016/0031753 A1 | 2/2016 | Maschmeyer et al. |
| 2016/0082705 A1 | 3/2016 | Fisher et al. |
| 2016/0168023 A1 | 6/2016 | Baum et al. |
| 2016/0194233 A1 | 7/2016 | Van Pelt |
| 2016/0194239 A1 | 7/2016 | Seto |
| 2016/0207819 A1 | 7/2016 | Cleary et al. |
| 2016/0250825 A1 | 9/2016 | Cleary et al. |
| 2016/0250982 A1 | 9/2016 | Fisher et al. |
| 2016/0281233 A1 | 9/2016 | Granneman et al. |
| 2016/0304352 A1 | 10/2016 | Ozyilmaz et al. |
| 2016/0326051 A1 | 11/2016 | Kim |
| 2017/0008377 A1 | 1/2017 | Fisher et al. |
| 2017/0022100 A1 | 1/2017 | Masters et al. |
| 2017/0072613 A2 | 3/2017 | Bracha et al. |
| 2017/0113440 A1 | 4/2017 | Rickerl et al. |
| 2017/0158543 A1 | 6/2017 | Metz et al. |
| 2017/0174564 A1 | 6/2017 | Cleary et al. |
| 2017/0197870 A1 | 7/2017 | Finkeldey et al. |
| 2017/0226007 A1 | 8/2017 | Garner et al. |
| 2017/0233287 A1 | 8/2017 | Li et al. |
| 2017/0361574 A1 | 12/2017 | Kiczenski et al. |
| 2018/0200955 A1 | 7/2018 | Hoelldorfer et al. |
| 2018/0210308 A1 | 7/2018 | Lam et al. |
| 2018/0250748 A1 | 9/2018 | Page |
| 2018/0304588 A1 | 10/2018 | Harris et al. |
| 2019/0022979 A1 | 1/2019 | Luzzato et al. |
| 2019/0030861 A1 | 1/2019 | Bellman et al. |
| 2019/0160787 A1 | 5/2019 | Bartlow et al. |
| 2019/0227357 A1 | 7/2019 | Williams et al. |
| 2019/0270284 A1 | 9/2019 | Couillard et al. |
| 2019/0391337 A1 | 12/2019 | Sato |
| 2020/0039146 A1 | 2/2020 | Jahnle et al. |
| 2022/0144682 A1 | 5/2022 | McLaren et al. |

FOREIGN PATENT DOCUMENTS

| | | |
|---|---|---|
| AU | 05351/29 B2 | 3/1984 |
| CA | 1148742 A | 6/1983 |
| CA | 1176468 A | 10/1984 |
| CA | 2171323 A1 | 1/1996 |
| CN | 1208266 A | 2/1999 |
| CN | 1501892 A | 6/2004 |
| CN | 1693247 A | 11/2005 |
| CN | 1896020 A | 1/2007 |
| CN | 101312919 A | 11/2008 |
| CN | 101671112 A | 3/2010 |
| CN | 101774751 A | 7/2010 |
| CN | 101801869 A | 8/2010 |
| CN | 102112407 A | 6/2011 |
| CN | 102149649 A | 8/2011 |
| CN | 102503103 A | 6/2012 |
| CN | 102574726 A | 7/2012 |
| CN | 102659305 A | 9/2012 |
| CN | 102863146 A | 1/2013 |
| CN | 103201230 A | 7/2013 |
| CN | 103253857 A | 8/2013 |
| CN | 103319082 A | 9/2013 |
| CN | 103359934 A | 10/2013 |
| CN | 103534216 A | 1/2014 |
| CN | 103781733 A | 5/2014 |
| CN | 103827051 A | 5/2014 |
| CN | 104103385 A | 10/2014 |
| CN | 104144877 A | 11/2014 |
| CN | 104211288 A | 12/2014 |
| CN | 104260569 A | 1/2015 |
| CN | 104295448 A | 1/2015 |
| CN | 104310773 A | 1/2015 |
| CN | 104355530 A | 2/2015 |
| CN | 104364213 A | 2/2015 |
| CN | 104379532 A | 2/2015 |
| CN | 104428262 A | 3/2015 |
| CN | 104479282 A | 4/2015 |
| CN | 104520249 A | 4/2015 |
| CN | 104541233 A | 4/2015 |
| CN | 104583141 A | 4/2015 |
| CN | 104619622 A | 5/2015 |
| CN | 104619662 A | 5/2015 |
| CN | 104781201 A | 7/2015 |
| CN | 105271762 A | 1/2016 |
| CN | 205275454 U | 6/2016 |
| CN | 105980147 A | 9/2016 |
| CN | 106045283 A | 10/2016 |
| CN | 206970472 U | 2/2018 |
| DE | 2233057 A1 | 3/1973 |
| EP | 0173418 A2 | 3/1986 |
| EP | 0413254 A1 | 2/1991 |
| EP | 0426363 A2 | 5/1991 |
| EP | 0441804 A1 | 8/1991 |
| EP | 0882681 A1 | 12/1998 |
| EP | 1215039 A2 | 6/2002 |
| EP | 1245545 A1 | 10/2002 |
| EP | 1380550 A1 | 1/2004 |
| EP | 1414762 A1 | 5/2004 |
| EP | 1533282 A1 | 5/2005 |
| EP | 1925952 A1 | 5/2008 |
| EP | 2543644 A2 | 1/2013 |
| EP | 2782753 A1 | 10/2014 |
| EP | 2819965 A2 | 1/2015 |
| EP | 2853517 A1 | 4/2015 |
| EP | 2876092 A1 | 5/2015 |
| FR | 2326386 A1 | 4/1977 |
| FR | 2936794 A1 | 4/2010 |
| GB | 0996423 A | 6/1965 |
| GB | 1026770 A | 4/1966 |
| GB | 1103192 A | 2/1968 |
| GB | 1112781 A | 5/1968 |
| GB | 1160284 A | 8/1969 |
| GB | 1253681 A | 11/1971 |
| GB | 1282720 A | 7/1972 |
| GB | 1289488 A | 9/1972 |
| GB | 2232978 A | 1/1991 |
| IN | 202420 | 5/2005 |
| IN | 200301606 | 4/2006 |

(56) References Cited

FOREIGN PATENT DOCUMENTS

| | | |
|---|---|---|
| IN | 264254 | 8/2008 |
| IN | 200803022 | 8/2008 |
| IN | 201404365 | 2/2015 |
| IN | 201407444 | 4/2015 |
| JP | 46-042107 | 12/1971 |
| JP | 51-103920 A | 9/1976 |
| JP | 55-104935 A | 8/1980 |
| JP | 56-155030 A | 12/1981 |
| JP | 56-155031 A | 12/1981 |
| JP | 57-067035 A | 4/1982 |
| JP | 57-067036 A | 4/1982 |
| JP | 58-088132 A | 5/1983 |
| JP | 58-091042 A | 5/1983 |
| JP | 59-008626 A | 1/1984 |
| JP | 59-008627 A | 1/1984 |
| JP | 59-008628 A | 1/1984 |
| JP | 59-008629 A | 1/1984 |
| JP | 59-008630 A | 1/1984 |
| JP | 59-008631 A | 1/1984 |
| JP | 59-057923 A | 4/1984 |
| JP | 60-171245 A | 9/1985 |
| JP | 61-072637 A | 4/1986 |
| JP | 61-141756 | 6/1986 |
| JP | 62-036030 A | 2/1987 |
| JP | 63-270330 A | 11/1988 |
| JP | 02-102436 A | 4/1990 |
| JP | 02-175624 A | 7/1990 |
| JP | 03-045526 A | 2/1991 |
| JP | 03-271127 A | 12/1991 |
| JP | 05-098626 A | 4/1993 |
| JP | 05-098627 A | 4/1993 |
| JP | 05-098628 A | 4/1993 |
| JP | 05-098629 A | 4/1993 |
| JP | 05-098630 A | 4/1993 |
| JP | 05-098631 A | 4/1993 |
| JP | 05-330835 A | 12/1993 |
| JP | 06-236030 A | 8/1994 |
| JP | 06-336533 A | 12/1994 |
| JP | 07-089739 A | 4/1995 |
| JP | 07-809739 A | 4/1995 |
| JP | 07-157322 A | 6/1995 |
| JP | 07-267664 A | 10/1995 |
| JP | 09-278468 A | 10/1997 |
| JP | 09-301732 A | 11/1997 |
| JP | 11-199257 A | 7/1999 |
| JP | 11-310430 A | 11/1999 |
| JP | 2000-072463 A | 3/2000 |
| JP | 2000-103632 A | 4/2000 |
| JP | 2000-172202 A | 6/2000 |
| JP | 2000-327355 A | 11/2000 |
| JP | 2001-002434 A | 1/2001 |
| JP | 2001-180967 A | 7/2001 |
| JP | 2001-307662 A | 11/2001 |
| JP | 2001-348245 A | 12/2001 |
| JP | 2003-040635 A | 2/2003 |
| JP | 2003-137603 A | 5/2003 |
| JP | 2003-261344 A | 9/2003 |
| JP | 2003-321255 A | 11/2003 |
| JP | 2003-342030 A | 12/2003 |
| JP | 2004-091311 A | 3/2004 |
| JP | 2004-115358 A | 4/2004 |
| JP | 3804115 B2 | 8/2006 |
| JP | 2006-298691 A | 11/2006 |
| JP | 2007-191319 A | 8/2007 |
| JP | 2007-261850 A | 10/2007 |
| JP | 2008282863 A * | 11/2008 |
| JP | 4397196 B2 | 1/2010 |
| JP | 4438126 B2 | 3/2010 |
| JP | 4557606 B2 | 10/2010 |
| JP | 4642107 B2 | 3/2011 |
| JP | 4722371 B2 | 7/2011 |
| JP | 4951838 B2 | 6/2012 |
| JP | 2012-232882 A | 11/2012 |
| JP | 2013-177253 A | 9/2013 |
| JP | 5334005 B2 | 11/2013 |
| JP | 2014-001121 A | 1/2014 |
| JP | 2014-073952 A | 4/2014 |
| JP | 2014-521586 A | 8/2014 |
| JP | 2014-166938 A | 9/2014 |
| JP | 2014-523389 A | 9/2014 |
| JP | 5614607 B2 | 10/2014 |
| JP | 5622069 B2 | 11/2014 |
| JP | 2015-006650 A | 1/2015 |
| JP | 2015-034123 A | 2/2015 |
| JP | 2015-054790 A | 3/2015 |
| JP | 2015-061808 A | 4/2015 |
| JP | 2015-086080 A | 5/2015 |
| JP | 5714701 B2 | 5/2015 |
| JP | 2015-112929 A | 6/2015 |
| JP | 2015-151329 A | 8/2015 |
| JP | 2015-163574 A | 9/2015 |
| KR | 10-0218143 B1 | 9/1999 |
| KR | 10-2002-0061567 A | 7/2002 |
| KR | 10-0690381 B1 | 3/2007 |
| KR | 10-0909835 B1 | 7/2009 |
| KR | 10-0918577 B1 | 9/2009 |
| KR | 10-0937889 B1 | 1/2010 |
| KR | 10-1000677 B1 | 12/2010 |
| KR | 10-1032825 B1 | 5/2011 |
| KR | 10-2011-0087774 A | 8/2011 |
| KR | 10-2011-0106629 A | 9/2011 |
| KR | 10-2011-0112503 A | 10/2011 |
| KR | 10-1093947 B1 | 12/2011 |
| KR | 10-1120262 B1 | 3/2012 |
| KR | 10-2012-0051220 A | 5/2012 |
| KR | 10-2012-0070450 A | 6/2012 |
| KR | 10-2013-0024484 A | 3/2013 |
| KR | 10-1248380 B1 | 3/2013 |
| KR | 10-1286131 B1 | 7/2013 |
| KR | 10-1413626 B1 | 8/2014 |
| KR | 2014-0095564 A | 8/2014 |
| KR | 10-2014-0110364 A | 9/2014 |
| KR | 10-2014-0135846 A | 11/2014 |
| KR | 2015-0002816 A | 1/2015 |
| KR | 2015-0013166 A | 2/2015 |
| KR | 10-2015-0051166 A | 5/2015 |
| KR | 10-2015-0129302 A | 11/2015 |
| KR | 10-2015-0129703 A | 11/2015 |
| KR | 2015-0129703 A | 11/2015 |
| RU | 2151750 C1 | 6/2000 |
| RU | 2199496 C2 | 2/2003 |
| RU | 2237621 C1 | 10/2004 |
| RU | 2299184 C1 | 5/2007 |
| RU | 2464243 C1 | 10/2012 |
| RU | 254731 C | 3/2013 |
| SU | 95854 A1 | 11/1952 |
| SU | 443845 A1 | 9/1974 |
| SU | 537960 A1 | 12/1976 |
| SU | 631464 A1 | 11/1978 |
| SU | 556593 A1 | 8/1982 |
| SU | 548188 A1 | 9/1982 |
| SU | 1098916 A1 | 6/1984 |
| SU | 1150234 A1 | 4/1985 |
| SU | 1655920 A1 | 6/1991 |
| SU | 254731 A1 | 3/2013 |
| TW | 201111317 A | 4/2011 |
| TW | 201119967 A | 6/2011 |
| TW | I393686 B | 4/2013 |
| TW | 201343590 A | 11/2013 |
| TW | 201343591 A | 11/2013 |
| TW | 201418174 A | 5/2014 |
| TW | 201509858 A | 3/2015 |
| TW | 201609589 A | 3/2016 |
| TW | 201623168 A | 7/2016 |
| WO | 90/03337 A1 | 4/1990 |
| WO | 99/44952 A1 | 9/1999 |
| WO | 01/16040 A1 | 3/2001 |
| WO | 01/34531 A1 | 5/2001 |
| WO | 02/16277 A1 | 2/2002 |
| WO | 03/14035 A1 | 2/2003 |
| WO | 2006/083902 A1 | 8/2006 |
| WO | 2006/110145 A1 | 10/2006 |
| WO | 2008/020509 A1 | 2/2008 |
| WO | 2008/143999 A1 | 11/2008 |

(56) References Cited

FOREIGN PATENT DOCUMENTS

| | | | |
|---|---|---|---|
| WO | 2008/147558 | A1 | 12/2008 |
| WO | 2010/076903 | A1 | 7/2010 |
| WO | 2011/122678 | A1 | 10/2011 |
| WO | 2012/082709 | A1 | 6/2012 |
| WO | 2012/125857 | A1 | 9/2012 |
| WO | 2012/142629 | A1 | 10/2012 |
| WO | 2013/001841 | A1 | 1/2013 |
| WO | 2013/016157 | A1 | 1/2013 |
| WO | 2013/078039 | A1 | 5/2013 |
| WO | 2013/130665 | A2 | 9/2013 |
| WO | 2013/130700 | A1 | 9/2013 |
| WO | 2014/024583 | A1 | 2/2014 |
| WO | 2014/030682 | A1 | 2/2014 |
| WO | 2014/060108 | A2 | 4/2014 |
| WO | 2014/139147 | A1 | 9/2014 |
| WO | 2014/182641 | A1 | 11/2014 |
| WO | 2014/182776 | A1 | 11/2014 |
| WO | 2014/201315 | A1 | 12/2014 |
| WO | 2015/031148 | A1 | 3/2015 |
| WO | 2015/031594 | A2 | 3/2015 |
| WO | 2015/033562 | A1 | 3/2015 |
| WO | 2015/057552 | A2 | 4/2015 |
| WO | 2015/088010 | A1 | 6/2015 |
| WO | 2015/125584 | A1 | 8/2015 |
| WO | 2015/156262 | A1 | 10/2015 |
| WO | 2016/019171 | A1 | 2/2016 |
| WO | 2016/037793 | A1 | 3/2016 |
| WO | 2016/057590 | A1 | 4/2016 |
| WO | 2016/094262 | A1 | 6/2016 |
| WO | 2016/183059 | A1 | 11/2016 |
| WO | 2017/019837 | A1 | 2/2017 |
| WO | 2017/020041 | A1 | 2/2017 |
| WO | 2017/066243 | A1 | 4/2017 |
| WO | 2017/071911 | A1 | 5/2017 |
| WO | 2017/079540 | A1 | 5/2017 |
| WO | 2017/139552 | A1 | 8/2017 |
| WO | 2018/136384 | A1 | 7/2018 |
| WO | 2018/136388 | A1 | 7/2018 |
| WO | 2021/025981 | A1 | 2/2021 |

OTHER PUBLICATIONS

Gupta, Prabhat, "Landscape Approach to Glass Transition and Relaxation: Liquid to Glass Transition," IMI-NFG's MITT Course on Relaxation Processes in Glass Lecture 19, Mar. 30, 2010, 25 slides.
Gupta, Prabhat, "Landscape Approach to Glass Transition and Relaxation: Relaxation in the glassy state," IMI-NFG's Min Course on Relaxation Processes in Glass Lecture 20, Apr. 1, 2010, 20 slides.
Gy, Rene, "Ion exchange for glass strengthening," Materials Science and Engineering B, vol. 149, 2008, pp. 159-165.
Hara, Morihisa et al., "Vickers Hardness of Toughened Sheet Glass," Reports of the Research Laboratory, Asahi Glass Co., Ltd., vol. 12, No. 2, 1962, pp. 99-104.
Hibino, Yoshinori et al., "Raman study on silica optical fibers subjected to high tensile stress," Applied Physics Letters, vol. 47, No. 8, Oct. 15, 1985, pp. 812-814.
Hodge, Ian M., "Physical Aging in Polymer Glasses," Science, vol. 267, , No. 5206, Mar. 31, 1995, pp. 1945-1947.
Hrma et al; "Thermal Healing of Cracks in Glass"; Journal of Non-Crystalline Solids; vol. 102, (1988); pp. 88-94.
Huang, Liping et al., "Polyamorphic transitions in vitreous B2O3 under pressure," Journal of Physics: Condensed Matter, vol. 20, 2008, 8 pages.
Hubert, Mathieu, "Lecture 9: Annealing and tempering," IMI-NFG Course on Processing in Glass—Lecture 9, Feb. 19, 2015, 72 slides.
Hutchins, J. and R. Harrington, "Glass", Kirk-Othmer Encyclopedia of Chemical Technology, 2nd Edition, 10 pp. 533-604.
Hutchins, J. and R. Harrington, "Glass", Kirk-Othmer Encyclopedia of Chemical Technology, 2nd Edition, 10 pp. 533-604, Retrieved Jan. 9, 2017.
International Preliminary Report on Patentability of the International Searching Authority; PCT/US15/42955; dated Feb. 9, 2017; 9 Pages; European Patent Office.
International Preliminary Report on Patentability of the International Searching Authority; PCT/US15/42965; dated Feb. 9, 2017; 8 Pages; European Patent Office.
International Preliminary Report on Patentability of the International Searching Authority; PCT/US16/45022; dated Feb. 8, 2018; 15 Pages; European Patent Office.
International Preliminary Report on Patentability of the International Searching Authority; PCT/US2016/044406; dated Feb. 8, 2018; 11 Pages; European Patent Office.
International Preliminary Report on Patentability of the International Searching Authority; PCT/US2017/064108; dated Jun. 13, 2019; 11 Pages; European Patent Office.
International Preliminary Report on Patentability of the International Searching Authority; PCT/US2018/000276; dated Feb. 27, 2020; 7 Pages; European Patent Office.
International Search Report and Writien Opinin PCT/US2016/044401 dated Jan. 2, 2017.
International Search Report and Writien Opinion of the International Searching Authority; PCT/US2017/063287; dated Feb. 6, 2018; 14 Pages; European Patent Office.
International Search Report and Writien Opinion PCT/US2016/044445 dated Oct. 14, 2016.
International Search Report and Writien Opinion PCT/US2016/045022 dated Jan. 31, 2017.
International Search Report and Written Opinion of the International Searching Authority; PCT/US15/42955; dated Nov. 4, 2015; 10 Pages; European Patent Office.
International Search Report and Written Opinion of the International Searching Authority; PCT/US15/42965; dated Nov. 2, 2015; 9 Pages; European Patent Office.
International Search Report and Written Opinion of the International Searching Authority; PCT/US16/45022; dated Jan. 31, 2017; 20 Pages; European Patent Office.
International Search Report and Written Opinion of the International Searching Authority; PCT/US2016/044401; dated Jan. 2, 2017; 17 Pages; European Patent Office.
International Search Report and Written Opinion of the International Searching Authority; PCT/US2016/044406; dated Nov. 25, 2016; 15 Pages; European Patent Office.
International Search Report and Written Opinion of the International Searching Authority; PCT/US2016/044445; dated Oct. 14, 2016; 16 Pages; European Patent Office.
International Search Report and Written Opinion of the International Searching Authority; PCT/US2017/064108; dated Apr. 11, 2018; 13 Pages; European Patent Office.
International Search Report and Written Opinion of the International Searching Authority; PCT/US2018/000276; dated Dec. 17, 2018; 8 Pages; European Patent Office.
International Search Report and Written Opinion PCT/US2015/042955 dated Nov. 4, 2015.
International Searching Authority Invitation to Pay Additional Fees PCT/US2016/045022 dated Oct. 28, 2016.
Ito, Setsuro, "Brittleness and Nano-Structure of Glass," 4th International Workshop on Flow and Fracture of Advanced Glasses Presentation, Nov. 5-7, 2007, Shiga, Japan, 37 slides.
Jain, Himanshu, "Electrical Relaxation—Topic 1: Quasi-free ion transport," IMI-NFG's MITI Course on Relaxation Processes in Glass Lecture 23, Advanced Vitreous State, The Properties of Glass: Dielectric Properties—Lecture 1, 2010, 28 slides.
Jain, Himanshu, "Electrical Relaxation—Topic 2: Universal dielectric response (UDR)," IMI-NFG's MITT Course on Relaxation Processes in Glass Lecture 24, Advanced Vitreous State, The Properties of Glass: Dielectric Properties—Lecture 1, 2010, 22 slides.
Jain, Himanshu, "Electrical Relaxation—Topic 3: Nearly constant loss—second universality," IMI-NFG's Min Course on Relaxation Processes in Glass Lecture 25, Advanced Vitreous State, The Properties of Glass: Dielectric Properties—Lecture 3, 2010, 24 slides.

(56) References Cited

OTHER PUBLICATIONS

John Klein et al: "Additive Manufacturing of optically Transparent Glass", 3D Printing and Additive Manufactureing, vol. 2, No. 3, Aug. 19, 2015 (Aug. 19, 2015), pp. 92-105, XP055328426.

Karlsson, Stefan et al., "The technology of chemical glass strengthening—a review," Glass Technology, European Journal of Glass Science Technology Part A, 51(2), Apr. 2010, pp. 41-54.

Karlsson, Stefan et al., "The technology of chemical glass strengthening—a review," Glass Technology, European Journal of Glass Science Technology Part A, vol. 51, No. 2, Apr. 2010, pp. 41-54.

Kassir-Bodon, Assia et al., "Raman Mapping of the Indentation-Induced Densification of a Soda-Lime-Silicate Glass," International Journal of Applied Glass Science, vol. 3, No. 1, 2012, pp. 29-35.

Kiefer, Werner et al., "Method for Thermal Prestressing of Glass," Strength of Inorganic Glass, Plenum Press, New York, 1985, pp. 501-511.

Kishii, Toru, "Surface Stress Meters Utilising the Optical Waveguide Effect of Chemically Tempered Glasses," Optics and Lasers in Engineering, vol. 4, 1983, pp. 25-38.

Kistler, S. S., "Stresses in Glass Produced by Nonuniform Exchange of Monovalent Ions," Journal of the American Ceramic Society, vol. 45, No. 2, Feb. 1962, pp. 59-68.

Klein et al., "Additive Manufacturing of Optically Transparent Glass", 3D Printing and Additive Manufacturing, vol. 2, Issue 3, pp. 92-105.

Klein et al; "Additive Manufacturing of Optically Transparent Glass" ; 3D Printing and Additive Manufacturing; vol. 2, No. 3; 2015; pp. 92-105.

Koike, A. et al., "Fictive temperature dependence of subcritical crack growth rate of normal glass and anomalous glass," Journal of Non-Crystalline Solids, vol. 352, 2006, pp. 5522-5530.

Kong et al., "Residual Stress Analysis with Improved Numerical Methods for Tempered Plate Glasses Based on Structural Relaxation Model"; Metals and Materials International, vol. 13. No. 1 (2007); pp. 67-75.

Lathabai, Srinivasarao et al., "Fracture mechanics model for subthreshold indentation flaws: Part 1—Equilibrium fracture," Journal of Materials Science, vol. 26, 1991, pp. 2157-2168.

Lee et al., "Glass Thickness and Fragmentation Behavior in Stressed Glasses," New Journal of Glass and Ceramics, vol. 2, 2012, pp. 138-143.

Lezzi et al., "Confirmation of Thin Surface Residual Compressive Stress in Silica Glass Fiber by FTIR Reflection Spectroscopy," Journal of Non-Crystalline Solids, vol. 390, 2014, pp. 13-18.

Aben, H. et al., "2.7 Stresses Due to Heterogeneities," Photoelasticity of Glass, Springer-Verlag, New York, 1993, p. 46.

Acloque, P., "Influence of Strain-Systems In Glass upon the Course of its Fracture," Proceedings of the 4th International Glass Congress, vol. 6, 1965, pp. 279-291.

Acloque, Paul, "Comparison Between Heat-Transfer Conditions and Setting Up of Strain in Glass During Heat-Treatment," Journal of the American Ceramic Society, vol. 44, No. 7, Jul. 1961, pp. 364-373.

Agarwal, Anand et al., "A simple IR spectroscopic method for determining fictive temperature of silica glasses," Journal of Non-Crystalline Solids, vol. 185, 1995, pp. 191-198.

Agarwal, Anand et al., "Determination of Fictive Temperature of Soda-Lime Silicate Glass," Journal of the American Ceramic Society, vol. 78, No. 3, Mar. 1995, pp. 827-829.

Akeyoshi, K. et al., "Mechanical Properties of Tempered Glass," Proceedings of the 7th International Glass Congress, vol. 14, 1965, pp. 80-85.

Alexiades, V. et al., "The New Way/Glaston Problem," 28th Annual Workshop on Mathematical Problems in Industry, University of Delaware, Jun. 2012, 30 slides.

Alexiades, V. et al., "The New WaylGlaston Problem," 28th Annual Workshop on Mathematical Problems in Industry, University of Delaware, Jun. 2012, 30 slides.

Argon, A. S., "Chapter 3: Inelastic Deformation and Fracture in Oxide, Metallic, and Polymeric Glasses," In, "Glass: Science and Technology," vol. 5, Elasticity and Strength in Glass, Academic Press, May 28, 1980, pp. 79-132.

Aronen, Antti et al., "Tempering of Thin Glass," Glasstec 2012: Engineered Transparency, Oct. 25-26, 2012, pp. 145-153.

Author Unknown, "Application Nole AN 527: Depth profiling of complex samples using confocal Raman microscopy," Bruker Optics Inc., 2012, 3 pages.

Author Unknown, "Architectural ERH2 ," Architectural Glass Systems, Glasstech, Inc., 2011, 2 pages.

Author Unknown, "Architectural FCH2 ," Architectural Glass Systems, Glasstech, Inc., 2011, 2 pages.

Author Unknown, "Architectural FCH2(Trademark) ,"Architectural Glass Systems, Glasstech, Inc., 2011, 2 pages.

Author Unknown, "Corning(Registered) Gorilla Glass," Corning Incorporated, 2009, 2 pages.

Author Unknown, "Corning(Registered) Gorilla(Trademark) Glass," Corning Incorporated, 2009, 2 pages.

Author Unknown, "Glass Strengthening Methods,"Abrisa Technologies, Apr. 2015, 2 pages.

Author Unknown, "Heat Treated Glass for Architectural Glazing," Glass Technical Document: TD-138, PPG Glass Technology, PPG Industries, Inc., Nov. 2011, 8 pages.

Author Unknown, "Introducing—Glasstech CRB-S.TM. 1900 for Solar Parabolic Shapes," Solar Glass Systems, Glasstech, Inc., Date Unknown, 1 page, Retrieved Jul. 1, 2015.

Author Unknown, "New Way Air Bearings," 28th Annual Workshop on Mathematical Problems in Industry, University of Delaware, Jun. 2012, 16 slides.

Author Unknown, "Products, Glazing Techniques and Maintenance Section 4: GGF Dalasheet for the Quality of Thermally Toughened Soda Lime Silicate Safety Glass for Building," Glass and Glazing Federation, Aug. 2009, 12 pages.

Author Unknown, "Schott Technical Glasses—Physical and technical properties," Schott North America, Inc., Feb. 2010, 44 pages.

Author Unknown, "scratch and dig numbers," Sizes, Inc., Last Revised: Jun. 24, 2010, 5 pages, http:/fwww.sizes.com/units/scratch_and_dig.him.

Author Unknown, "Solar FCH-S ," Solar Glass Systems, Glasstech, Inc., 2011, 2 pages.

Author Unknown, "Standard Specification for Heat-Strengthened and Fully Tempered Flat Glass," Designation: C 1048-12, ASTM International Standard, 2015, 7 pages.

Author Unknown, "Subject Index," Date Unknown, pp. 277-282, Retrieved Apr. 24, 2015.

Author Unknown, "Subject Index," Date Unknown, pp. 277-282.

Author Unknown, "Tempered Glass," Tecnoglass, www.tecnoglass.com/tempered.pdf, Date Unknown, 5 pages, Retrieved Jul. 28, 2015.

Author Unknown, "Tempered Glass," Tecnoglass, www.tecnoglass.com/tempered.pdf, Date Unknown, 5 pages.

Author Unknown, "Thermal Tempering," EuropTec GmbH, Nov. 6, 2014, 2 pages.

Author Unknown, "Unsteady Heat Transfer—HT3: Experimental Studies of Thermal Diffusivities and Heat Transfer Coefficients," Date Unknown, 27 slides, Retrieved Jul. 21, 2015.

Author Unknown, "Unsteady Heat Transfer—HT3: Experimental Studies of Thermal Diffusivities and Heat Transfer Coefficients," Date Unknown, 27 slides.

Ayinder, C.C. et al., "Thermal-Tempering Analysis of Bulk Metallic Glass Plates Using an Instant-Freezing Model," Metallurgical and Materials Transactions A, vol. 32A, Nov. 2001, pp. 2709-2715.

Baldwin, K. J. et al., "Confocal Raman Microspectroscopy through a Planar Interface," Applied Spectroscopy, vol. 55, No. 5, 2001, pp. 517-524.

Bandyopadhyay et al; "Application of Fused Deposition in Controlled Microstructure Metal-Ceramic Composites", Rapid Prototyping Journal, vol. 12 Issue 3, pp. 121 128 (2006).

Barr, J. W., "Glass Tempering by Numbers," Aug. 2008, 8 pages.

Barr, Jonathan W., "The Tempering Process," Cardinal Waxahachie Tempering Seminar, Mar. 26, 2008, 36 slides.

(56) References Cited

OTHER PUBLICATIONS

Barr, Jonathan, "The Glass Tempering Handbook—Understanding the Glass Tempering Process," Self Published, 2015, 52 pages, http://www.lambertgtservices.co.uk/book/TheGlassTemperingHandbook.pdf.
Barsom, John M., "Fracture of Tempered Glass," Journal of the American Ceramic Society, vol. 51, No. 2, Feb. 1968, pp. 75-78.
Bartholomew, Roger F. et al., "Chapter 6: Chemical Strengthening of Glass," In "Glass: Science and Technology," vol. 5, Elasticity and Strength in Glass, Academic Press, May 28, 1980, pp. 217-270.
Beauchamp, Edwin K. et al., "Dynamics of Window Glass Fracture in Explosions," Sandia Report SAND98-0598 UC-700, Sandia National Laboratories, May 1998, 74 pages.
Bird, R. D., W. E. Stewart, and E. N. Lightfoot, Transport Phenomena—Chapter 11: The Equations of Change for Nonisothermal Systems, Wiley, (1960) pp. 349-373.
Bird, R. D., W. E. Stewart, and E. N. Lightfoot, Transport Phenomena—Chapter 3: The Equations of Change for sothermal Systems, Wiley, (1960) pp. 75-113.
Bird, R. D., W. E. Stewart, and E. N. Lightfoot, Transport Phenomena—Chapter 3: The Equations of Change for Isothermal Systems, Wiley, (1960) pp. 75-113.
Boaz, Prem, "Tempering Very Thin Glass—What Radio Waves Mean for the Glass Industry," USGlass Magazine, vol. 45, Issue 3, Mar. 2010, 5 pages.
Boaz, Prem, "Thin glass processing with radio wave assist," Glass on Web, Last Reviewed: Jan. 2013, 6 pages, http://www.glassonweb.com/articles/article/561/.
Boguslavskii, I. A., "Studying the Nature of the Super-Strength of Glasses Strengthened by the Thermophysical Method," Glass and Ceramics, vol. 21, No. 10, Oct. 1964, pp. 562-567.
Boguslavskll, I. A., "Studying the Nature of the Super-Strength of Glasses Strengthened by the Thermophysical Method," Glass and Ceramics, vol. 21, No. 10, Oct. 1964, pp. 562-567.
Brown, Angus M., "Nonlinear regression analysis of data using a spreadsheet," Application Note, ISC, Oct. 2001, pp. 58-59.
Lezzi, P. J. et al., "Confirmation of thin surface residual compressive stress in silica glass fiber by FTIR reflection spectroscopy," Journal of Non-Crystalline Solids, vol. 390, 2014, pp. 13-18.
Li, Hong et al., "Effect of Fictive Temperature on Dynamic Fatigue Behavior of Silica and Soda-Lime Glasses," Journal of the American Ceramic Society, vol. 78, No. 5, 1995, pp. 1393-1396.
Loucks, "Lecture 13: The Fictive and Glass Transition Temperatures," IMI-NFG's Min Course on Relaxation Processes in Glass Lecture 13, Mar. 2, 2010, 25 Slides.
Loucks, "Lecture 14: Relaxation and the Tool-Narayanaswamy-Moynihan Equation," IMI-NFG's MITT Course on Relaxation Processes in Glass Lecture 14, Mar. 4, 2010, 27 Slides.
Loucks, "Lecture 15: The Tool-Narayanaswamy-Moynihan Equation Part II and DSC," IMI-NFG's MITT Course on Relaxation Processes in Glass Lecture 15, Mar. 9, 2010, 33 Slides.
Loucks, "Lecture 16: The Tool-Narayanaswamy-Moynihan Equation Part II and DSC," IMI-NFG's MITT Course on Relaxation Processes in Glass Lecture 16, Mar. 11, 2010, 32 Slides.
Luo et al; "Additive Manufacturing of Glass for Optical Applications"; Proc. of SPIE, vol. 9738, 2016; pp. 97380Y-1-97380Y-9.
Markovsky, Alex et al., "An Efficient and Stable Algorithm for Calculating Fictive Temperatures," Communications of the American Ceramic Society, Apr. 1984, 2 pages.
Martin, Dr. Steve, "Lecture 10: Thermodynamic Functions," IMI-NFG's MITT Course on Relaxation Processes in Glass Lecture 10, 2010, 25 slides.
Martin, Dr. Steve, "Lecture 11: Thermodynamics in the Glass Transition Region," IMI-NFG's MITT Course on Relaxation Processes in Glass Lecture 11, 2010, 22 slides.
Martin, Dr. Steve, "Lecture 12: The Glass Transition as a Kinetic Transition," IMI-NFG's Min Course on Relaxation Processes in Glass Lecture 12, 2010, 21 slides.
Martin, Dr. Steve, "Lecture 9: Thermodynamic Concepts and the Law of Thermodynamics," IMI-NFG's Min Course on Relaxation Processes in Glass Lecture 9, 2010, 32 slides.
Mass En, Claire P. et al., "Power-law distributions for the areas of the basins of attraction on a potential energy andscape," Physical Review E, The American Physical Society, vol. 75, 2007, 4 pages.
Mauricio-Iglesias, M. et al., "Raman depth-profiling characterization of a migrant diffusion in a polymer," Journal of Membrane Science, vol. 375, 2011, pp. 165-171.
McGlinchy, Timothy B., "Energy Efficient Tripe IG Automation EEE (Triple-E)," DE-EE0000167, GED Integrated Solutions, Feb. 28, 2013, 45 pages.
McMaster, Ronald A., "Flat Glass Tempering—How II Works," Glass Industry, Jun. 1989, pp. 10-15.
McMaster, Ronald A., "Fundamentals of Tempered Glass," Proceedings of the 49th Conference on Glass Problems: Ceramic Engineering and Science Proceedings, vol. 10, Issue 3/4, 1989, pp. 193-206.
McMaster, Ronald A_ et al., "Annealed and Tempered Glass," Engineered Materials Handbook, vol. 4, Ceramics and Glasses, 1991, 9 pages.
Merriam-Webster Online Dictionary, "Coextensive", 2009, 1 page. Retrieved from: https://www.merriam-webster.com/dictionary/coextensive.
Mikowski, A. et al., "Statistical analysis of threshold load for radial crack nucleation by Vickers indentation in commercial soda-lime silica glass," Journal of Non-Crystalline Solids, vol. 352, 2006, pp. 3544-3549.
Mognato, Ennio et al., "Thermally toughened safety glass," Glass on Web, Last Reviewed: Jul. 2011, 9 pages, http://www.glassonweb.com/articles/article/727/.
Moynihan, C. T. et al., "Structural Relaxation in Vitreous Materials," Annals of the New York Academic of Sciences, vol. 279, Oct. 1976, pp. 15-35.
Narayanaswamy, 0. S. et al., "Calculation of Residual Stresses in Glass," Journal of the American Ceramic Society, vol. 52, No. 10, Oct. 1969, pp. 554-558.
Narayanaswamy, O. S., "Stress and Structural Relaxation in Tempering Glass", Journal of the American Ceramic Society, vol. 61, No. 3-4, (3-4/1978), pp. 146-152.
Narayanaswamy, O. S., "Stress and Structural Relaxation in Tempering Glass," Journal of the American Ceramic Society, vol. 61, No. 3-4, Mar.-Apr. 1978, pp. 146-152.
Oakley, David R., "Crack branching in float glass subjected to biaxial loading," Journal of Non-Crystalline Solids, vol. 196, 1996, pp. 139-143.
Ohlberg et al., "Thermal Stress Calculations Based on a Linear Viscoelastic Deviatoric Response and a Fictive Temperature Component for the Volumetric Response", Journal of Non-Crystalline Solids, vol. 14, 1974, pp. D280-D286.
Paschel, Richard, "History of the Safety Glazing Certification Council," Safety Glazing Certification Council, Date Unknown, 11 pages, Retrieved Jul. 21, 2015.
Paschel, Richard, "History of the Safety Glazing Certification Council," Safety Glazing Certification Council, Date Unknown, 11 pages.
Ray, N. H. et al., "Increasing the strength of glass by treatment in molten salts," Physics and Chemistry of Glasses, vol. 8, No. 1, Feb. 1967, pp. 30-34.
Rekhson, S. M., "Chapter 1: Viscoelasticity of Glass," In "Glass: Science and Technology," vol. 3, 1986, 117 pages.
Rekson, S. M., "Structural Relaxation and Shear Stresses in the Glass-Transition Region," Soviet Journal of Glass Physics and Chemistry, 1975, pp. 417-421.
Sastry, Srikanth, "The relationship between fragility, configurational entropy and the potential energy landscape of glass-forming liquids," Nature, vol. 409, Jan. 11, 2001, pp. 164-167.
Scherer, George W., "Use of the Adam-Gibbs Equation in the Analysis of Structural Relaxation," Journal of the American Ceramic Society, vol. 67, No. 7, Jul. 1984, pp. 504-511.
Sciortino, Francesco, "Potential energy landscape description of supercooled liquids and glasses," Journal of Statistical Mechanics: Theory and Experiment, May 31, 2005, 35 pages.

(56) References Cited

OTHER PUBLICATIONS

Sehgal, Jeetendra et al., "A New Low-Brittleness Glass in the Soda-Lime-Silica Glass Family," Journal of the American Ceramic Society, vol. 81, No. 9, Sep. 1998, pp. 2485-2488.
Setsuro, Ito et al., "Processing Technical Books to the Glass High-Functions," Chapter 3: Sections 2.5, 3, 3.1, 3.2 & 3.3, Science & Technology Co., Ltd., Sep. 27, 2012, pp. 58-65.
Sglavo, V., A. Prezzi, M. Alessandrini, "Processing of Glasses with Engineered Stress Profiles," Journal of Non-Crystalline Solids, 344 (2004), 73-78.
Shelby "Introduction to Glass Science and Technology"; The Royal Chemical Society, 2nd Edition, 2005; p. 193.
Shimodaira, N. et al., "Raman spectra of fluorine-doped silica glasses with various fictive temperatures," Journal of Applied Physics, vol. 91, No. 6, Mar. 15, 2002, pp. 3522-3525.
Shin Kai, Norihiko et al., "Indentation Fracture of Tempered Glasses," Reports of the Research Laboratory, Asahi Glass Co., Lid., vol. 23, No. 2, 1973, pp. 83-99.
Shouyuan, Zhai et al., "Influence of Temperature and Time on Glass Strength During Chemical Tempering," [8J Journal of Shangdong Institute of Light Industry (Natural Science Edition), Feb. 1996, 3 pages.
Shouyuan, Zhai et al., "Influence of Temperature and Time on Glass Strength During Chemical Tempering," Journal of Shangdong Institute of Light Industry (Natural Science Edition), Feb. 1996, 3 pages.
Shutov, A. I. et al., "Prediction of the Character of Tempered Glass Fracture," Glass and Ceramics, vol. 55, Nos. 1-2, 1998, pp. 8-10.
Soules, Thomas F. et al., "Finite-Element Calculation of Stresses in Glass Parts Undergoing Viscous Relaxation," Journal of the American Ceramic Society, vol. 70, No. 2, Feb. 1987, pp. 90-95.
Southard, J. C., "The Thermal Properties of Crystalline and Glassy Boron Trioxide," Journal of the American Chemical Society, vol. 63, No. 11, Nov. 1941, pp. 3147-3150.
Spaght, Monroe E_ et al., "Studies on Glass_ VIII. The Coefficient of Thermal Expansion of Boron Trioxide," Journal of Physical Chemistry, vol. 38, No. 1, 1934, pp. 103-110.
Specialty Glass Products, "Soda Lime/AR/Flint Glass"; http://www.sgpinc.com/sodalime.htm accessed Aug. 11, 2016.
Stillinger, Frank H. et al., "Packing Structures and Transitions in Liquids and Solids," Science, New Series, vol. 225, No. 4666, Sep. 7, 1984, pp. 983-989.
ASTM C1499-09, "Standard Test Method for Monotonic Equibiaxial Flexural Strength of Advanced Ceramics at Ambient Temperature", 2013, 14 pages.
ASTM C158-02, "Standard Test Methods for Strength of Glass by Flexure" (Determination of Modulus of Rupture), 2012, 9 pages.
Guo, Xiaoju et al. "Unified approach for determining the enthalpic fictive temperature of glasses with arbitrary thermal history" Journal of Non-Crystalline Solids, vol. 357, 2011, pp. 3230-3236.
International Search Report and Written Opinion of the International Searching Authority; PCT/US2020/027913; dated Aug. 3, 2021; 11 pages; European Patent Office.
Luo et al., "Competing Indentation Deformation Mechanisms in Glass Using Different Strengthening Methods", Frontiers in Materials, vol. 3, No. 52, 2016, 11 pages.
International Search Report and Written Opinion of the International Searching Authority; PCT/US2020/062128; dated Mar. 15, 2021; 9 pages; European Patent Office.
International Search Report and Written Opinion of the International Searching Authority; PCT/US2020/062145; dated Mar. 16, 2021, 11 pages; Korean Patent Office.
Stillinger, Frank H., "A Topographic View of Supercooled Liquids and Glass Formation," Science, New Series, vol. 267, No. 5206, Mar. 31, 1995, pp. 1935-1939.
Tallant, D.R. et al., "The Effects of Tensile Stress on the Raman Spectrum of the Silica Glass," Journal of Non-Crystalline Solids, vol. 106, 1988, pp. 380-383.
Tandon, Rajan et al., "Controlling the Fragmentation Behavior of Stressed Glass," Fracture Mechanics of Ceramics, vol. 14, 2005, p. 77.
To, Q.D., et al., "Failure analysis of tempered glass structures with pin-loaded joints," Engineering Failure Analysis, vol. 14, Issue 5, Jul. 2007, pp. 841-850.
Tomlinson, R., G. Calvert, and A. Conway, "A Photoelastic Investigation Into Spontaneous Glass Fracture", Proceedings of the XIth International Congress and Exposition, (Jun. 2008) 8 pgs.
Varughese, Binoy et al., "Effect offictive temperature on mechanical strength of soda-lime glasses," Journal of Non-Crystalline Solids, vol. 241, 1998, pp. 134-139.
Walrafen, G. E. et al., "Raman investigation of optical fibers under high tensile stress," Journal of Applied Physics, vol. 52, No. 4, Apr. 1981, pp. 2832-2836.
Wang et al., "Glass and Hot Extrusion by ME Module for 3D Additive Manufacturing", IEEE International Conference on Industrial Technology (ICIT), 2016, pp. 1167-1171.
Wang, Fei et al., "Pressure Raman effects and internal stress in network glasses," Physical Review B, vol. 71, 2005, 32 pages.
Weissmann, R and D. Durkop, "A Novel Method for Measuring Stresses in Flat Glass", XV International Congress on Glass Leningrad 1898, Proceeding 3b, O. V. Mazurin, ed., pp. 217-220.
Yamane, Masayuki, "Chapter 3: Thermal Processing," Glass Engineering Handbook, Asakura Publishing Co. Ltd., Jul. 1999, pp. 410-417.
Yue, YL et al., "Determination of the fictive temperature for a hyperquenched glass," Chemical Physics Letters, vol. 357, Issues 1-2, May 3, 2002, pp. 20-24.
Zaccaria et al.; "Thermal Healing of Realistic Flaws in Glass"; J. Mater. Civ. Eng 2016, 28(2); pp. 04015127-1-04015127-9.
Zaman, F. D. et al., "Cooling of a Plate with General Boundary Conditions," International Journal of Mathematics and Mathematical Sciences, vol. 23, No. 7, 2000, pp. 477-485.
Zhi-Hai, L., "Development status and trend of tempered glass," Glass, Apr. 30, 2004, pp. 49-52 (Orignal Document Only).
"Energy Curable Resins", https://www.allnex.com/en/technologies/energy-curable-resins; retrieved on Oct. 10, 2022.
Author Unknown, "Corning(Registered) Gorilla(Trademark) Glass," Coming Incorporated, 2009, 2 pages.
Barsom; "Fracture of Tempered Glass"; J. Am. Ceram. Soc., 51[2] 75-78 (1968).
Conradt, Reinhard, "I. Fragility and its Relation to Other Glass Properties," IMI-NFG's MITT Course on Relaxation Processes in Glass Lecture 21, Apr. 6-8, 2010, 61 slides.
Cox, Dr. Chris, "Lecture 3: Complex exponential function, Fourier and Laplace transforms," IMI-NFG's MITT Course on Relaxation Processes in Glass and Polymers Lecture 3, 2010, 25 slides.
Hara, Morihisa et al., "Vickers Hardness of Toughened Sheet Glass," Reports of the Research Laboratory, Asahi Glass Co., LtdF., vol. 12, No. 2, 1962, pp. 99-104.
Huang, Liping et al., "Polyamorphic transitions in vitreous B2O3 under pressure," Journal of Physics: Condensed Matter, vol. 20, 2008, 8 pages.
Narayanaswamy; "Stress and Structural Relaxation in Tempering Glass," J. Am. Ceram. Soc., 61[3-4] 146-152 (1978).
Sehgal, Jeetendra et al., "A New Low-Biillleness Glass in the Soda-Lime-Silica Glass Family," Journal of the American Ceramic Society, vol. 81, No. 9, Sep. 1998, pp. 2485-2488.
Tailant, D. R. et al., "The Effects of Tensile Stress on the Raman Spectrum of the Silica Glass," Journal of Non-Crystalline Solids, vol. 106, 1988, pp. 380-383.
Varughese, Binoy et al., "Effect of Active temperature on mechanical strength of soda-lime glasses," Journal of Non-Crystalline Solids, vol. 241, 1998, pp. 134-139.
Walrafen, G. E. et al., "Raman investigation of optical Abers under high tensile stress," Journal of Applied Physics, vol. 52, No. 4, Apr. 1981, pp. 2832-2836.
Yue, Y.Z. et al., "Determination of the Active temperature for a hyperquenched glass," Chemical Physics Letters, vol. 357, Issues 1-2, May 3, 2002, pp. 20-24.
Chinese Patent Application No. 201680054630.4 First Office Action dated Sep. 1, 2020; 12 Pages (English Translation Only) Chinese Patent Office.

(56) References Cited

OTHER PUBLICATIONS

Chinese Patent Application No. 201780073613 X, Office Action dated Jun. 17, 2021, 11 pages (5 pages of English Translation and 6 pages of Original Document), Chinese Patent Office.
Chinese Search Report; 201680054630.4; dated Aug. 24, 2020; 4 Pages; (2 pages of English Translation and 2 pages of Original Document). Chinese Patent Office.
Conradt, Reinhard, "II. Networks," IIMI-NFG's MITT Course on Relaxation Processes in Glass Lecture 22, Apr. 6-8, 2010, 61 slides.
Conway, Jr., Joseph C et al., "Use of Crack Branching Data for Measuring Near-Surface Residual Stresses in empered Glass," Journal of the American Ceramic Society, vol. 72, No. 9, Sep. 1989, pp. 1584-1587.
Conway, Jr., Joseph C. et al., "Use of Crack Branching Data for Measuring Near-Surface Residual Stresses in Tempered Glass," Journal of the American Ceramic Society, vol. 72, No. 9, Sep. 1989, pp. 1584-1587.
Cox, Dr. Chris, "Lecture 3: Complex exponential function, Fourier and Laplace transforms," IMI-NFG's Min Course on Relaxation Processes in Glass and Polymers Lecture 3, 2010, 25 slides.
Cox, Dr. Chris, "Lecture 4: Differential Equations," IMI-NFG's Min Course on Relaxation Processes in Glass and Polymers Lecture 4, 2010, 24 slides.
Danishkin, G. K. et al., "Development of a Continuous Method of Bending and Toughening Glass," Glass and Ceramics, vol. 34, Issue 8, Aug. 1977, pp. 495-498.
Daudeville, L. et al., "Numerical Simulation of Soda-Lime Silicate Glass Tempering," Journal de Physique IV, France, vol. 6, No. C1, Jan. 1996, pp. C1-175-C1-185.
Daudeville, Laurent et al., "Thermal Tempering Simulation of Glass Plates: Inner and Edge Residual Stresses," Journal of Thermal Stresses, vol. 21, 1998, pp. 667-689.
De Grauw, C. J. et al., "Axial resolution of confocal Raman microscopes: Gaussian beam theory and practice," Journal of Microscopy, vol. 188, Pl. 3, Dec. 1997, pp. 273-279.
Deschamps, T. et al., "Soda-lime silicate glass under hydrostatic pressure and indentation: a micro-Raman study," Journal of Physics: Condensed Matter, vol. 23, 2011, 7 pages.
Donald, I. W., "Review: Methods for improving the mechanical properties of oxide glasses," Journal of Materials Science, vol. 24, 1989, pp. 4177-4208.
Electronic Cooling Editors, "The Thermal Conductivity of Gases", Design, Materials, Adhesives, Substrates, No. 3, Technical Data, Test & Measurement, vol. 4, Gases, Thermal Conductivity, Sep. 1, 1998, 2 pages.
English Translation of CN104211288A, Performed by Phoenix Translations Jun. 2016.
Ernsberger, F. M., "Chapter 1: Elastic Properties of Glasses," In "Glass: Science and Technology," vol. 5, Elasticity and Strength in Glasses, Academic Press, Inc., May 28, 1980, pp. 1-19.
Ernsberger, F. M., "Chapter 4: Techniques of Strengthening Glasses," In "Glass: Science and Technology," vol. 5 Elasticity and Strength in Glasses, Academic Press, Inc., May 28, 1980, pp. 133-144.
European Patent Application No. 15757030 Office Action dated Jun. 23, 2021; 5 Pages; European Patent Office.
European Patent Application No. 15757030.0 Office Action dated Mar. 2, 2018; 5 Pages; European Patent Office.
European Patent Application No. 16750337.4 Office Action dated Jan. 24, 2020; 4 Pages; European Patent Office.
European Patent Application No. 16754030.1 Office Action dated Jan. 18, 2019; 7 Pages; European Patent Office.
EUROPTEC; "Themal Tempering" ; EUROPTEC GMBH, DIC, Jun. 11, 2014; www.europtec.de.
Everall, Neil et al., "Optimizing Depth Resolution in Confocal Raman Microscopy: A Comparison of Metallurgical, Dry Corrected, and Oil Immersion Objectives," Applied Sprectroscopy, vol. 61, No. 3, 2007, pp. 251-259.
Everall, Neil J., "Confocal Raman Microscopy: Why the Depth Resolution and Spatial Accuracy Can be Much Worse then You Think," Applied Spectroscopy, vol. 54, No. 10, 2000, pp. 1515-1520.
Fajans, Kasimir et al., "Properties and Structures of Vitreous and Crystalline Boron Oxide," Journal of the American Chemical Society, vol. 74, No. 11, Jun. 5, 1952, pp. 2761-2768.
Fotheringham, Dr. Ulrich, "Lecture 1: Internet teaching set-up," IMI-NFG's Min Course on Relaxation Processes in Glass and Polymers Lecture 1, 2010, 6 slides.
Fotheringham, Dr. Ulrich, "Lecture 2: Phenomenology of viscoelasticity & glass transition," IMI-NFG's Min Course on Relaxation Processes in Glass and Polymers Lecture 2, 2010, 17 slides.
Fotheringham, Dr. Ulrich, "Lecture 5: Viscoelasticity I—Shear," IMI-NFG's Min Course on Relaxation Processes in Glass and Polymers Lecture 5, 2010, 19 slides.
Fotheringham, Dr. Ulrich, "Lecture 6: Viscoelasticity II—Bulk Viscoelasticity," IMI-NFG's Min Course on Relaxation Processes in Glass and Polymers Lecture 6, 2010, 16 slides.
Fotheringham, Dr. Ulrich, "Lecture 7: Viscoelasticity III—Dynamic Testing," IMI-NFG's MITI Course on Relaxation Processes in Glass and Polymers Lecture 7, 2010, 19 slides.
Fotheringham, Dr. Ulrich, "Lecture 8: Viscoelasticity IV—Important Application of Pre-Stressing," IMI-NFG's MITT Course on Relaxation Processes in Glass and Polymers Lecture 8, 2010, 12 slides.
Freiman, S. W., "Chapter 2: Fracture Mechanics of Glass," In "Glass: Science and Technology," vol. 5, Elasticity and Strength in Glasses, Academic Press, Inc., May 28, 1980, pp. 21-78.
Frick, B. et al., "The Microscopic Basis of the Glass Transition in Polymers from Neutron Scattering Studies," Science, vol. 267, Mar. 31, 1995, pp. 1939-1945.
Galeener, Frank L., "Raman and ESR Studies of the Thermal History of Amorphous $SiO.sub.2$," Journal of Non-Crystalline Solids, vol. 71, 1985, pp. 373-386.
Gang, Zhang Ming, "Manufacturing and Properties of Glass Used in Construction," Guangdong Golden Glass Technologies Ltd, Dec. 27, 2002, 11 pages.
Gardon, Robert, "Calculation of Temperature Distributions in Glass Plates Undergoing Heat-Treatment," Journal of the American Ceramic Society, vol. 41, No. 6, Jun. 1958, pp. 200-209.
Gardon, Robert, "Tempering Glass with Modulated Cooling Schedules," Journal of the American Ceramic Society, vol. 71, No. 10, Oct. 1988, pp. 876-878.
Gardon, Robert, "Variation of Densities and Refractive Indices in Tempered Glass," Journal of the American Ceramic Society, vol. 61, No. 3-4, Mar.-Apr. 1978, pp. 143-146.
Gardon. Robert, "Chapter 5: Thermal Tempering of Glass," In "Glass: Science and Technology," vol. 5, Elasticity and Strength in Glasses, Academic Press, Inc., May 28, 1980, pp. 145-216.
Glass, Jill et al., "Processing and Properties of Ion Exchanged Glasses," Glass and Optical Materials Division Fall Meeting, Nov. 6-12, 2004, Cape Canaveral, FL, 33 slides.
Glass, S. J. et al., "Stressed Glass Technology for Actuators and Removable Barrier Applications," Sandia Report SAND2007-4106, Sandia National Laboratories, Jul. 2007, 18 pages.
Global Dossier Translation of JP 2018-504918 Office Action dated Jul. 15, 2020; 2 Pages; Japanese Patent Office.
Gomez, Sinue et al., "69.2: Designing Strong Glass for Mobile Devices," SID Symposium Digest of Technical Papers, vol. 40, No. 1, Jan. 2009, pp. 1045-1048.
Gross, T.M., "Deformation and cracking behavior of glasses indented with diamond tips of various sharpness," Journal of Non-Crystalline Solids, vol. 358, Issue 24, Dec. 12, 2012, pp. 3445-3452.
Guillemet, C., "Annealing and Tempering of Glass," Journal of Non-Crystalline Solids, vol. 123, 1990, pp. 415-426.
Gulati, Suresh T., "Frangibility of Tempered Soda-Lime Glass Sheet," Glass Processing Days, Sep. 13-15, 1997, pp. 72-76.
Gupta, Prabhat K. et al., "The laboratory glass transition," The Journal of Chemical Physics, vol. 126, 2007, 9 pages.

(56) References Cited

OTHER PUBLICATIONS

Gupta, Prabhat, "Landscape Approach to Glass Transition and Relaxation: Basic Concepts (contd.)," IMI-NFG's MITT Course on Relaxation Processes in Glass Lecture 18, Mar. 25, 2010, 23 slides.

* cited by examiner

THERMALLY STRENGTHENED CONSUMER ELECTRONIC GLASS AND RELATED SYSTEMS AND METHODS

RELATED SYSTEMS AND METHODS

This application is a continuation of U.S. application Ser. No. 15/749,015 filed Jan. 30, 2018, which is a U.S. national-stage entry of International Application No. PCT/US16/44406 filed Jul. 28, 2016, which claims the benefit of priority of U.S. Application Nos. 62/228,851 filed Jan. 29, 2016, 62/236,296 filed Oct. 2, 2015, and 62/286,192 filed Jan. 22, 2016 and also claims the priority benefit as continuation-in-part of U.S. application Ser. No. 14/814,232 filed Jul. 30, 2015, which issued Mar. 29, 2016 as U.S. Pat. No. 9,296,638, Ser. No. 14/814,274 filed Jul. 30, 2015, which issued as U.S. Pat. No. 9,776,905 on Mar. 10, 2017, Ser. No. 14/814,293 filed Jul. 30, 2015, which issued as U.S. Pat. No. 9,802,853 on Feb. 4, 2016, Ser. No. 14/814,303 filed Jul. 30, 2015, which issued as U.S. Pat. No. 9,783,448 on Oct. 10, 2017, Ser. No. 14/814,363 filed Jul. 30, 2015, which issued as U.S. patent Ser. No. 10/005,691 on Jun. 26, 2018, Ser. No. 14/814,319 filed Jul. 30, 2015, which issued as U.S. Pat. No. 9,975,801 on May 22, 2018, and Ser. No. 14/814,335 filed Jul. 30, 2015, which issued as U.S. patent Ser. No. 10/077,204 on Sep. 18, 2018, each of which is hereby incorporated by reference herein in its entirety.

BACKGROUND

The disclosure relates generally to thermally conditioned (e.g., strengthened, tempered, heated, etc.) cover glass for consumer electronic applications, and specifically relates to thermally strengthened glass and to related methods and systems for the thermal strengthening of glass for consumer electronic applications, particularly for thin consumer electronic glass sheets (also called "cover glass" herein).

In thermal (or "physical") strengthening of glass sheets, a glass sheet is heated to an elevated temperature above the glass transition temperature of the glass and then the surfaces of the sheet are rapidly cooled ("quenched") while the inner regions of the sheet cool at a slower rate. The inner regions cool more slowly because they are insulated by the thickness and the fairly low thermal conductivity of the glass. The differential cooling produces a residual compressive stress in the glass surface regions, balanced by a residual tensile stress in the central regions of the glass.

Thermal strengthening of glass is distinguished from chemical strengthening of glass, in which surface compressive stresses are generated by changing the chemical composition of the glass in regions near the surface by a process such as ion diffusion. In some ion diffusion based processes, exterior portions of glass may be strengthened by exchanging larger ions for smaller ions near the glass surface to impart a compressive stress (also called negative tensile stress) on or near the surface. The compressive stress is believed to limit crack initiation and/or propagation.

Thermal strengthening of glass also is distinguished from glass strengthened by processes in which exterior portions of the glass are strengthened or arranged by combining two types of glass. In such processes, layers of glass compositions that have differing coefficients of thermal expansion are combined or laminated together while hot. For example, by sandwiching molten glass with a higher coefficient of thermal expansion (CTE) between layers of molten glass with a lower CTE, positive tension in the interior glass compresses the outer layers when the glasses cool, again forming compressive stress on the surface to balance the positive tensile stress. This surface compressive stress provides strengthening.

Thermally strengthened consumer electronic glass or cover glass has advantages relative to unstrengthened glass. The surface compression of the strengthened consumer electronic glass or cover glass provides greater resistance to fracture than unstrengthened glass. The increase in strength generally is proportional to the amount of surface compression stress. If a sheet possesses a sufficient level of thermal strengthening, relative to its thickness, then if the sheet is broken, generally it will divide into small fragments rather than into large or elongated fragments with sharp edges. Glass that breaks into sufficiently small fragments, or "dices," as defined by various established standards, may be known as safety glass, or "fully tempered" glass, or sometimes simply "tempered" glass.

Because the degree of strengthening depends on the temperature difference between the surface and center of the glass sheet during quenching, thinner glasses require higher cooling rates to achieve a given stress. Also, thinner glass generally requires higher values of surface compressive stress and central tension stress to achieve dicing into small particles upon breaking. Accordingly, achieving desirable levels of tempering in glass with thicknesses of around 3 mm or less has been exceedingly challenging, if not impossible.

Aspects of the present disclosure also relate to consumer electronic glass or cover glass that has a stress profile for strengthening exterior portions thereof. Consumer electronic glass, such as cover glass for use on any surface of a consumer electronic device, may be used for a broad range of applications Such applications include cell phones, tablets, mobile phones, personal computers, notebook computers, digital signage, digital white board, etc.

Aspects of the present disclosure also relate generally to glass or glass-ceramic that has a stress profile for strengthening exterior portions thereof. Glass and glass-ceramic articles, such as sheets of glass, may be used for a broad range of applications. Examples of such applications include use in windows, countertops, containers (e.g., food, chemical), use as a backplane, frontplane, cover glass, etc., for a display device (e.g., tablet, cellular phone, television), use as a high-temperature substrate or support structure, or other applications.

SUMMARY

This disclosure relates, in part, to highly strengthened thin consumer electronic glass or cover glass sheets and articles, and to methods, processes, and systems that achieve surprisingly high levels of heat strengthening of consumer electronic glass or cover glass sheets at thicknesses not achieved in the past. In various embodiments, the process and method of the current disclosure is believed to surpass the consumer electronic glass or cover glass thickness limits and heat transfer rates provided by conventional convective gas thermal strengthening processes without the need to contact the consumer electronic glass or cover glass with liquid or solid heat sinks. In such systems and processes, during quenching, the cover glass is contacted only with a gas. The systems and methods disclosed enable thermal strengthening, including up to "full temper" or dicing behavior, in cover glass sheets having thicknesses down to at least as thin as 0.1 mm (in at least some contemplated embodiments); and in some embodiments, provides this strengthening in a thin cover glass sheet that also has a low roughness and a high degree of flatness resulting from the lack of liquid or solid contact during quenching. In various embodiments, these advantageous cover glass sheet material properties are provided by a system and method with substantially lower quenching power requirements, as compared to conventional convective glass tempering systems.

One embodiment of the disclosure relates to a process for thermally strengthening a consumer electronic glass or cover glass material. The process includes providing article formed from a glass material. The process includes heating the article above a glass transition temperature of the cover glass material. The process includes moving the heated article into a cooling station. The cooling station includes a heat sink having a heat sink surface facing the heated article and a gas gap separating the heat sink surface from the heated article such that the heat sink surface does not touch the heated article. The process includes cooling the heated article to a temperature below the cover glass transition temperature such that surface compressive stresses and central tensile stresses are created within the article. The article is cooled by transferring thermal energy from the heated article to the heat sink by conduction across the gap such that more than 20% of the thermal energy leaving the heated article crosses the gap and is received by the heat sink.

Another embodiment of the disclosure relates to a system for thermally strengthening a cover glass sheet. The system includes a heating station including a heating element delivering heat to the cover glass sheet, and the cover glass sheet includes a first major surface, a second major surface and a thickness between the first and second major surfaces. The system includes a cooling station, including opposing first and second heat sink surfaces defining a channel therebetween such that during cooling the cover glass sheet is located within the channel. The system includes a gas bearing delivering pressurized gas to the channel such that the cover glass sheet is supported within the channel without touching the first and second heat sink surfaces, and the gas bearing defines a gap area. The gas bearing delivers a gas into the channel such that a total mass flow rate of gas into the channel is greater than zero and less than 2 $k/gC_p$ per square meter of gap area, where k is the thermal conductivity of a gas within the channel evaluated in the direction of heat conduction, g is the distance between the cover glass sheet and the heat sink surface, and $C_p$ is the specific heat capacity of the gas within the channel.

Another embodiment of the disclosure relates to a strengthened consumer electronic glass/cover glass or glass-ceramic article. The article includes a first major surface, a second major surface opposite the first major surface and an interior region located between the first and second major surfaces. The article includes an average thickness between the first major surface and second major surface of less than 2 mm. The article includes at least 70% silicon dioxide by weight. An ion content and chemical constituency of at least a portion of both the first major surface and the second major surface is the same as an ion content and chemical constituency of at least a portion of the interior region. The first major surface and the second major surfaces are under compressive stress and the interior region is under tensile stress, and the compressive stress is greater than 150 MPa. A surface roughness of the first major surface is between 0.2 and 2.0 nm $R_a$ roughness.

Another embodiment of the disclosure relates to a strengthened consumer electronic glass or cover glass on a consumer electronic product. In embodiments, the consumer electronic product includes an electronic display with a front surface, a back surface, and at least one side surface. In embodiments, a glass-based layer or cover glass is provided at least partially over the electronic display. In embodiments, the glass-based layer or cover glass includes a first major surface opposite a second major surface with an interior region located therebetween. In embodiments, the glass-based layer or cover glass includes an average thickness between the first major surface and second major surface of less than 2 mm. In embodiments, an ion content and chemical constituency of at least a portion of both the first major surface and the second major surface is the same as an ion content and chemical constituency of at least a portion of the interior region. In embodiments, the first major surface and the second major surfaces are under compressive stress and the interior region is under tensile stress, and the compressive stress is greater than 150 MPa. In embodiments, a surface roughness of the first major surface is between 0.2 and 2.0 nm $R_a$ roughness.

Another embodiment of the disclosure relates to a strengthened consumer electronic glass or cover glass for a consumer electronic product. In embodiments, the consumer electronic product includes a housing with a front surface, a back surface, and at least one side surface. In embodiments, electrical components, including at least a controller, a memory, and a display, are provided at least partially internal to the housing. In embodiments, a glass-based layer or back glass is provided on or over the back surface of the housing. In embodiments, the glass-based layer or back glass includes a first major surface opposite a second major surface with an interior region located therebetween. In embodiments, the glass-based layer or back glass includes an average thickness between the first major surface and second major surface of less than 2 mm. In embodiments, an ion content and chemical constituency of at least a portion of both the first major surface and the second major surface is the same as an ion content and chemical constituency of at least a portion of the interior region. In embodiments, the first major surface and the second major surfaces are under compressive stress and the interior region is under tensile stress, and the compressive stress is greater than 150 MPa. In embodiments, a surface roughness of the first major surface is between 0.2 and 2.0 nm $R_a$ roughness.

Another embodiment of the present disclosure relates to a consumer electronic product including a strengthened consumer electronic glass or cover glass. In embodiments, the consumer electronic product includes a housing with a front surface, a back surface, and at least one side surface. In embodiments, electrical components are provided at least partially internal to the housing. In embodiments, the electrical components include at least a display. In embodiments, the consumer electronic glass or cover glass is provided as or adjacent the front surface of the housing. In embodiments, the glass based layer or cover glass includes a first major surface and a second major surface separated by the thickness. In embodiments, the first major surface of the glass-based layer or cover glass is flat to 100 μm total indicator run-out (TIR) along any 50 mm or less profile of the first major surface of the glass-based layer or cover glass. In embodiments, the glass-based layer or cover glass includes a glass material having a low temperature linear CTE, expressed in 1/° C., of $\alpha^S_{CTE}$, a high temperature linear CTE, expressed in 1/° C., of $\alpha^L_{CTE}$, an elastic modulus, expressed in GPa, of E, a strain temperature, expressed in units of ° C., of $T_{strain}$, and a softening temperature, expressed in units of ° C., of $T_{soft}$. In further embodiments, the first major surface of the second glass-based layer has a thermally induced surface compressive stress of less than 600 MPa and greater than $$\frac{P_1(h)*t}{(P_2(h)+t)} \cdot E \cdot [T_{strain} \cdot \alpha^s_{CTE} + \alpha^L_{CTE} \cdot (T_{soft} - T_{strain})];$$

in units of MPa;
wherein $P_1$ is given by $$910.2 - 259.2 \cdot \exp\left(-\frac{h}{0.143}\right);$$

$P_2$ is given by $$2.53 + \frac{23.65}{\left(1 + \left(\frac{h}{0.00738}\right)^{1.58}\right)};$$

and h is greater than or equal to 0.020 cal/s·cm²·° C.

Yet another embodiment of the present disclosure relates to a consumer electronic product including a strengthened consumer electronic glass or cover glass. In embodiments, the consumer electronic product includes a housing with a front surface, a back surface, and at least one side surface. In embodiments, electrical components, including at least a controller, a memory, and a display, are provided at least partially internal to the housing. In embodiments, a glass-based layer or cover glass is provided at or adjacent the front surface of the housing. In embodiments, the glass-based layer or cover glass is provided at least partially over the display. In embodiments, the glass-based layer or cover glass includes a first major surface opposite a second major surface with an interior region located therebetween. In embodiments, the first major surface is flat to 100 μm total indicator run-out (TIR) along any 50 mm or less profile of the first major surface. In embodiments, the glass-based layer cover glass includes a glass material having a softening temperature, expressed in units of ° C., of $T_{soft}$ and an annealing temperature, expressed in units of ° C., of $T_{anneal}$, and a surface fictive temperature measured on the first major surface represented by Tfs, when expressed in units of ° C. In embodiments, the glass-based layer or cover glass having a non-dimensional surface fictive temperature parameter θs given by $(T_{fs}-T_{anneal})/(T_{soft}-T_{anneal})$. In embodiments, the parameter θs is in the range of from 0.20 to 0.9.

Additional features and advantages will be set forth in the detailed description that follows, and, in part, will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiments, and together with the description serve to explain principles and the operation of the various embodiments.

DETAILED DESCRIPTION

Figure 1:
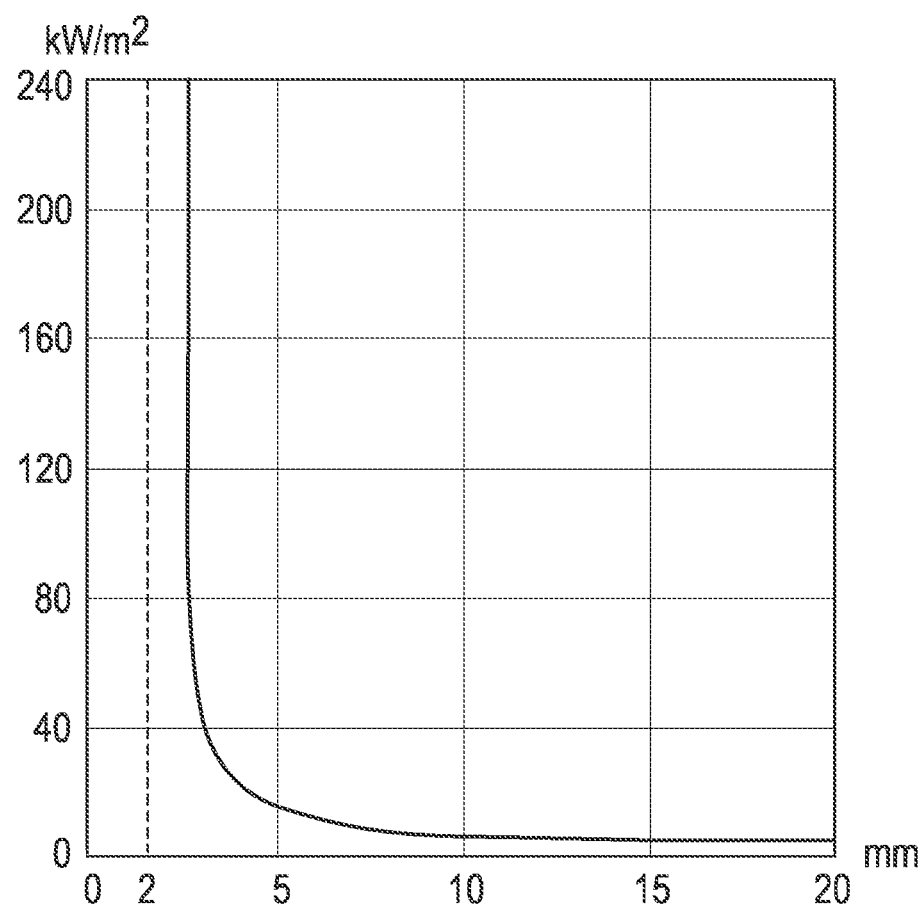
FIG. 1 (Prior Art) is a graph of blower power required for "full tempering" as a function of glass thickness.

Applicant has recognized a need for improvements in thermal processing of cover glass, both in methods and systems for thermally strengthening cover glass and the resulting thermally strengthened cover glass sheets themselves. For example, thinner, but strong optical-quality cover glass sheet materials and products comprising such cover glass sheets are useful for a number of applications, including portable electronic devices, consumer electronic products, cover glass, back glass, etc. Glass is very strong in compression but relatively weak against tension at the surface. By providing compression at the surface of a sheet, balanced by tension at the center where there is no exposed surface, the useful strength of a cover glass sheet is dramatically increased. However, while traditional thermal strengthening of cover glass is generally cheaper and faster relative to alternative methods of strengthening (e.g., chemical strengthening, lamination-based strengthening), traditional thermal strengthening of cover glass is not known to be effective for strengthening thin cover glass (e.g., cover glass sheets of 2-3 mm or less). Traditional thermal cover glass strengthening methods are typically thought to be limited to thicker cover glass sheets because the level of strengthening depends on the temperature difference created between the surface and the center of the cover glass sheet during quenching; and because of thermal conduction rate limitations of traditional strengthening methods, it is difficult to achieve significant temperature differences between the surface and the center of a thin cover glass sheet due to the relatively even cooling that typically occurs throughout a thin glass sheet.

On the other hand, strengthening thin cover glass through ion exchange can be time-consuming and cumbersome, such as requiring chemical bathing of the cover glass for extended periods of time. Laminating different types of cover glasses directly to one another may require complicated manufacturing processes, such as involving a dual-isopipe fusion draw.

Therefore, a need exists for cover glass or glass-ceramic articles having stress profiles that result in strengthening of the cover glass for a variety of uses such as in windows, countertops, devices, etc. made by processes that are less resource-intensive and/or cumbersome than conventional processes. Specifically, processes and systems discussed herein form cover glass articles having stress profiles that strengthen the exterior portions of the cover glass, which in turn act to mitigate cracking and damage while at the same time allowing for a variety of other desirable cover glass qualities (e.g., geometry, surface quality, transmittance of visible light, flexibility, etc.) to facilitate the use in various cover glass or consumer electronic product applications.

The present description provides improved methods and systems for utilizing thermal strengthening to produce highly strengthened cover glass materials, and in particular highly strengthened thin cover glass sheets. The methods and systems solve a variety of the limitations of conventional cover glass strengthening processes, allowing for high levels of strengthening in cover glass sheets with thicknesses less than about 3 mm, less than 2 mm, less than 1.5 mm, less than 1.0 mm, less than 0.5 mm, less than about 0.25 mm, and less than about 0.1 mm. In particular, Applicant has developed a system and method that provides a very high rate of thermal conduction forming a large enough temperature differential between the surface and center of a cover glass sheet to provide strengthening or tempering even in very thin cover glass sheets.

Overview of Conventional Thermal Tempering Technology and Limitations

Conventional industrial processes for thermally strengthening glass involve heating glass sheets in a radiant energy furnace or a convection furnace (or a "combined mode" furnace using both techniques) to a predetermined temperature, then gas cooling ("quenching"), typically via convection by blowing large amounts of ambient air against or along the glass surface. This gas cooling process is predominantly convective, whereby the heat transfer is by mass motion (collective movement) of the fluid, via diffusion and advection, as the gas carries heat away from the hot glass sheet.

In conventional tempering processes, certain factors can restrict the amount of strengthening typically consider possible in glass sheets, particularly thin glass sheets. Limitations exist, in part, because the amount of compressive stress on the finished sheet is related directly to the size of the temperature differential between the surface and the center of the sheet, achieved during quenching. However, the larger the temperature differential during quenching, the more likely glass is to break during quenching. Breakage can be reduced, for a given rate of cooling, by starting the quench from a higher initial glass temperature. Also, higher starting temperatures typically allow the tempered glass sheet to achieve the full strengthening potential provided by high cooling rates. However, increasing the temperature of the sheet at the start of the quench also has its own potential drawbacks. For example, high initial glass temperatures can lead to excessive deformation of the sheet as it becomes softer, again limiting the practically achievable temperature differential.

In conventional tempering processes, sheet thickness also imposes significant limits on the achievable temperature differential during quenching. The thinner the sheet, the lower the temperature differential between the surface and the center for a given cooling rate during quenching. This is because there is less glass thickness to thermally insulate the center from the surface. Accordingly, thermal strengthening of thin glass typically requires higher cooling rates (as compared to thermal strengthening of thicker glass) and, thus, faster removal of heat from the external surfaces of the glass typically requires significant energy consumption in order to generate strengthening levels of differential temperature between the inner and outer portions of the glass sheet.

By way of example, FIG. 1 shows the power required by air blowers (in kilowatts per square meter of glass sheet area) employed to blow sufficient ambient air to "fully temper" soda-lime glass ("SLG"), as a function of glass thickness in millimeters, based on industry standard thermal strengthening processes developed 35 years ago. The power required increases exponentially as the glass used gets thinner. Thus, glass sheets of about 3 mm in thickness were the thinnest fully thermally tempered commercial glass available for many years.

Further, the thinner the sheet, the greater the likelihood of deformation at a given softness (that is, at a given viscosity) of the glass. Therefore, decreasing thickness both reduces the achievable temperature differential directly and, because of increased risk of deformation of the sheet, tends to reduce the opportunity to use higher sheet temperatures to achieve the full benefits of higher cooling rates and to prevent glass breakage caused by higher cooling rates. Thus, in conventional convective gas glass strengthening processes, higher rates of cooling are achieved by increasing the rate of air flow, decreasing the distance of air nozzle openings to the glass sheet surface, increasing the temperature of the glass (at the start of cooling), and optionally, decreasing the temperature of the cooling air.

Figure 2:
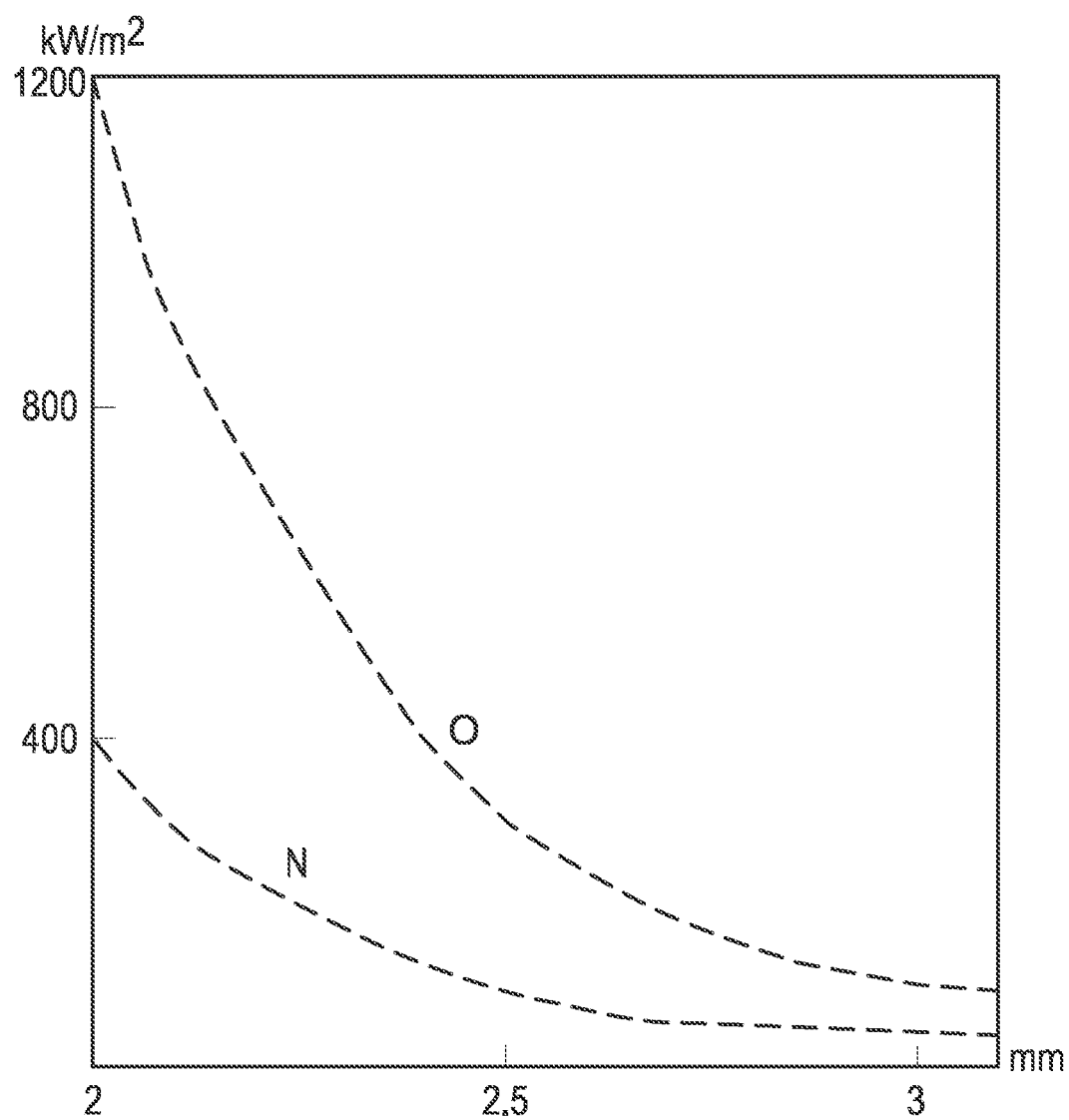
FIG. 2 (Prior Art) is a graph of blower power required for "full tempering" as a function of glass thickness for an old process or machine O and a newer process or machine N.

As a more recent example, the performance curves of FIG. 2 (Prior Art) were published using state of the art glass thermal strengthening equipment. This improved equipment continues to use traditional air blown convective processes to cool the glass, but replaces rollers used to support the glass during heating with a system that utilizes air to support the glass during at least the last stages of heating. Without roller contact, the glass can be heated to higher temperatures (and higher softness/lower viscosity) prior to quenching, reportedly allowing the production of fully tempered glass at 2 mm thickness. As shown in FIG. 2, the reported blower power required to strengthen a 2 mm thick sheet is reduced from 1200 kW/m$^2$ to 400 kW/m$^2$ at the higher temperatures enabled by using air to support the glass (curve N) as compared to using rollers (curve O).

Figure 3:
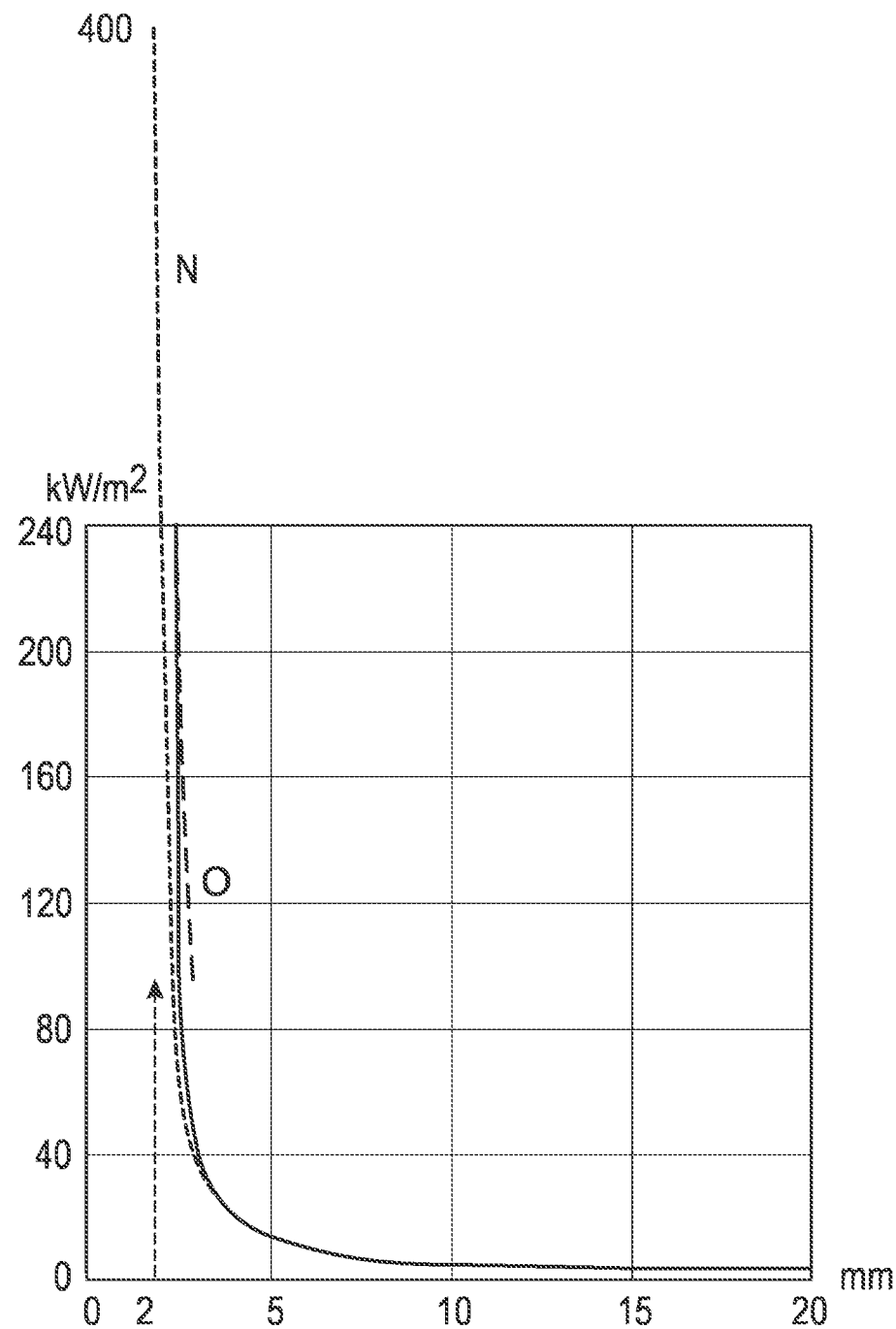
FIG. 3 (Prior Art) is a graph of the old curve O and the new curve N of FIG. 2 scaled to match and superimposed upon the graph of FIG. 1.

Although it represents progress to be able to produce fully tempered 2 mm thick glass, scaling the old and new curves O and N of FIG. 2 to match the scale of FIG. 1, as shown in FIG. 3 (Prior Art), shows that the improvement in performance achieved by the state of the art convective tempering process (shown in FIG. 2) is relatively small and simply an incremental change in the previous understanding of the energy needs in convective strengthening of glass sheets. In FIG. 3 the old and new curves O and N of FIG. 2 are scaled to match the graph of FIG. 1, and overlaid thereon (with the old curve O truncated at the top at 240 kW/m$^2$ for easier viewing of the new curve N). From FIG. 3 it is apparent that the technology represented by the curve N changes only slightly the performance curve of convective gas quenching processes as glass thickness is decreased from 3 mm to 2 mm. The high operating point (400 kW/m$^2$ of blower power for 2 mm glass) shows the extreme increase in power still required to process thinner glass by this method. The sharp increase in airflow and, thus, power needed suggests the difficulty, as a matter of both engineering practice and economics, in going below 2 mm thickness while producing fully tempered glass using conventional convective gas strengthening methods. Additionally, the very high airflows needed also could deform the shape of thinner sheets. Accordingly, to reach full temper of glass having a thickness of less than 2 mm or to reach full temper at 2 mm in glasses having coefficients of thermal expansion ("CTE") lower than that of soda-lime glasses using thermal tempering, Applicant has identified that another tempering method/system is needed.

Alternative thermal strengthening methods to current commercial convective gas strengthening have been tried as well, but each has certain drawbacks relative to convective gas strengthening. In particular, typical alternative thermal strengthening methods that achieve higher cooling rates generally require at least some liquid or solid contact with the glass surfaces, rather than gas contact only. Such contact with the glass sheet can adversely affect glass surface quality, glass flatness, and/or evenness of the strengthening process. These defects sometimes can be perceived by the human eye, particularly when viewed in reflected light. As described in more detail below, at least in some embodiments, the conductive thermal tempering system of the present disclosure reduces or eliminates such contact-related defects.

Liquid contact strengthening, in the form of immersion in liquid baths or flowing liquids, as well as in the form of spraying, has been used to achieve higher cooling rates than convective gas strengthening, but has the drawback of causing excessive thermal variations across a sheet during the cooling process. In immersion or immersion-like spraying or flowing of liquids, large thermal variations over small areas can occur due to convection currents that arise spontaneously within the liquid bath or liquid flow. In finer spraying, the discrete spray droplets and the effects of nozzle spray patterns also produce significant thermal variations. Excessive thermal variations tend to cause glass breakage during thermal strengthening by liquid contact, which can be mitigated by limiting the cooling rates, but limiting cooling rates also lowers the resulting strengths that can be achieved. Further, the necessary handling of the sheet (to position or hold it within the liquid bath or liquid flow or liquid spray) also causes physical stress and excessive thermal variations from physical contact with the sheet, tending also to cause breakage during strengthening and limiting the cooling rates and resulting strengths. Finally, some liquid cooling methods, such as high cooling rate quenching by oil immersion and various spraying techniques, can alter the glass surface during such cooling, requiring later removal of glass material from the sheet surface to produce a satisfactory finish.

Solid contact thermal strengthening involves contacting the surface of the hot glass with a cooler solid surface. As with liquid contact strengthening, excessive thermal variations, like those seen in liquid contact strengthening, can easily arise during the quenching process. Any imperfection in the surface finish of the glass sheet, in the quenching surfaces, or in the consistency of the thickness of the sheet, results in imperfect contact over some area of the sheet, and this imperfect contact may cause large thermal variations that tend to break the glass during processing and may also cause unwanted birefringence if the sheet survives. Additionally, contacting the hot glass sheet with a solid object can lead to the formation of surface defects, such as chips, checks, cracks, scratches, and the like. Achieving good physical contact over the entirety of the surfaces of a glass sheet also can become increasing difficult as the dimensions of the sheet increase. Physical contact with a solid surface also can mechanically stress the sheet during quenching, adding to the likelihood of breaking the sheet during the process. Further, the extreme high rate temperature changes at the initiation of contact can cause breakage during sheet processing and, as such, contact cooling of thin glass substrates has not been commercially viable.

Overview of Applicant's Thermally Strengthened Cover Glass and Related Conductive Cooling Process and Method The present disclosure surpasses the traditional processes described above to effectively, efficiently, and evenly thermally strengthen thin cover glass sheets at commercial scales without generating various flaws common in conventional processes, e.g., without damaging the surface of the cover glass, without inducing birefringence, without uneven strengthening, and/or without causing unacceptable breakage, etc. Previously unobtainable, thin, thermally tempered/strengthened cover glass sheets can be produced by one or more of the embodiments disclosed herein. The systems and processes discussed herein accomplish this by providing very high heat transfer rates in a precise manner, with good physical control and gentle handling of the cover glass. In particular embodiments, the processes and systems discussed herein utilize a small-gap, gas bearing in the cooling/quenching section that Applicant has identified as allowing for processing thin cover glass sheets at higher relative temperatures at the start of cooling, resulting in higher thermal strengthening levels. As described below, this small-gap, gas bearing cooling/quenching section achieves very high heat transfer rates via conductive heat transfer to heat sink(s) across the gap, rather than using high air flow based convective cooling. This high rate conductive heat transfer is achieved while not contacting the cover glass with liquid or solid material, by supporting the cover glass on gas bearings within the gap. As described below, Applicant has also identified that, in at least some embodiments, the processes and systems discussed herein form thermally strengthened cover glass, specifically thermally strengthened thin cover glass (e.g, for consumer electronic products), having one or more unique properties.

Some embodiments of cover glass sheets treated by methods and/or systems according to the present disclosure have higher levels of permanent thermally induced stresses than previously known. Without wishing to be bound by theory, it is believed that the achieved levels of thermally induced stress are obtainable for a combination of reasons. The high uniformity of the heat transfer in the processes detailed herein reduces or removes physical and unwanted thermal stresses in the cover glass, allowing consumer electronic glass sheets to be tempered at higher heat transfer rates without breaking. Further, the present methods can be performed at lower glass sheet viscosities (higher initial temperatures at the start of quench), while still preserving the desired cover glass flatness and form, which provides a much greater change in temperature in the cooling process, thus increasing the heat strengthening levels achieved.

Thermally Tempered Cover Glass Sheet

As noted above, Applicant has developed a system and process for forming thermally strengthened cover glass sheets, particularly thin cover glass sheets, and as discussed in this section, the thermally strengthened, thin cover glass sheets formed as discussed herein have one or more unique properties and/or combinations of properties, previously unachievable through conventional thermal or other tempering methods. The thermally tempered cover glass or consumer electronic glass of the present disclosure may be used in a variety of consumer electronic products (e.g., computers, tablets, personal handheld devices, touch sensitive displays, household appliances, mobile phones, portable media players, televisions, notebook computers, watches, tablet computers, etc.).

Thermally Tempered Cover Glass Sheet Structure and Dimensions

Figure 4:
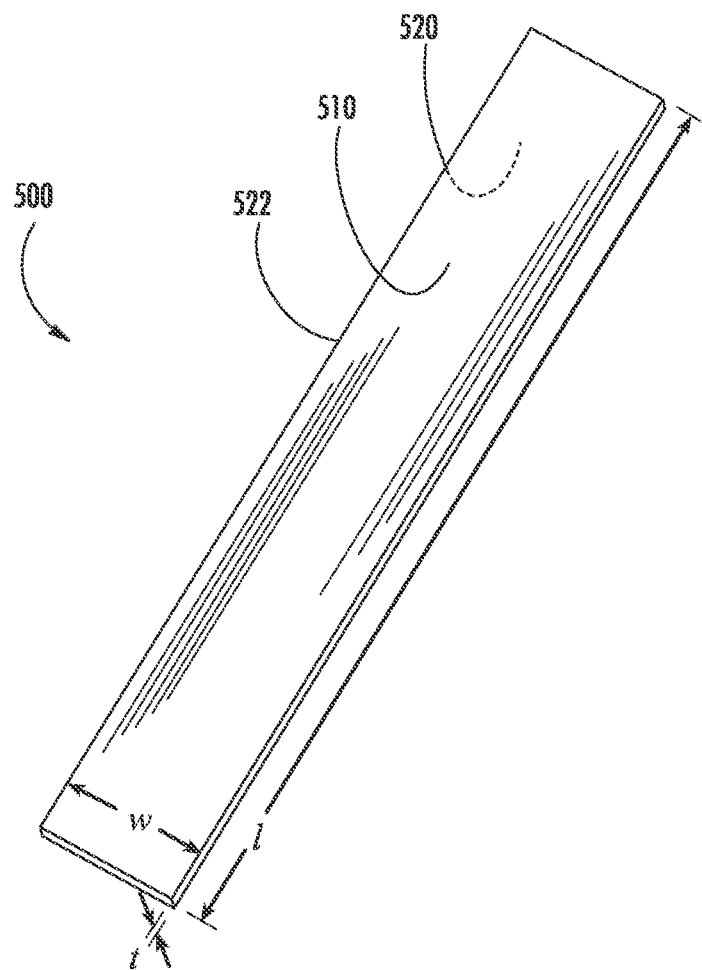
FIG. 4 is a perspective view of a consumer electronic/cover glass or glass-ceramic article or sheet according to an exemplary embodiment.
Figure 5:
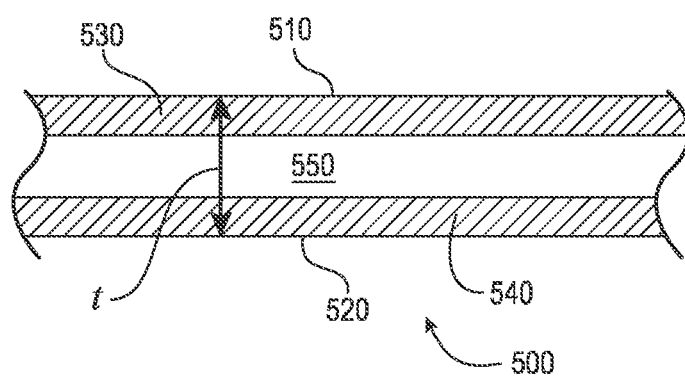
FIG. 5 is a diagrammatic partial cross-section of a thermally strengthened consumer electronic glass sheet or cover glass of FIG. 4 according an exemplary embodiment.

Referring to FIG. 4 and FIG. 5, a thermally strengthened cover glass sheet having a high surface compressive stress and/or a high central tension is shown according to an exemplary embodiment. FIG. 4 shows a perspective view of a thermally strengthened cover glass or glass-ceramic article or sheet 500, and FIG. 5 is a diagrammatic partial cross-section of thermally strengthened cover glass sheet 500 according to one or more embodiments.

As shown in FIG. 4, a strengthened cover glass or glass-ceramic article 500 (e.g., sheet, beam, plate), includes a first major surface 510, a second major surface 520 (dotted line to back side of the sheet 500, which may be translucent as disclosed herein), and a body 522 extending therebetween. The second major surface 520 is on an opposite side of the body 522 from the first major surface 510 such that a thickness t of the strengthened cover glass or glass-ceramic sheet 500 is defined as a distance between the first and second major surfaces 510, 520, where the thickness t is also a dimension of depth. A width, w, of the strengthened cover glass or glass-ceramic sheet 500 is defined as a first dimension of one of the first or second major surfaces 510, 520 orthogonal to the thickness t. A length, l, of the strengthened cover glass or glass-ceramic sheet 500 is defined as a second dimension of one of the first or second major surfaces 510, 520 orthogonal to both the thickness t and the width w.

In exemplary embodiments, thickness t of cover glass sheet 500 is less than length l of cover glass sheet 500. In other exemplary embodiments, thickness t of cover glass sheet 500 is less than width w of cover glass sheet 500. In yet other exemplary embodiments, thickness t of cover glass sheet 500 is less than both length l and width w of cover glass sheet 500. As shown in FIG. 5, cover glass sheet 500 further has regions of permanent thermally induced compressive stress 530 and 540 at and/or near the first and second major surfaces 510, 520, balanced by a region of permanent thermally induced central tensile stress 550 (i.e., tension) in the central portion of the sheet.

The methods and systems may be used to form strengthened cover glass sheets having a wide variety of thickness ranges. In various embodiments, thickness t of cover glass sheet 500 ranges from 0.1 mm to 5.7 or 6.0 mm, including, in addition to the end point values, 0.2 mm, 0.28 mm, 0.4 mm, 0.5 mm, 0.55 mm, 0.7 mm, 1 mm, 1.1 mm, 1.5 mm, 1.8 mm, 2 mm, and 3.2 mm. Contemplated embodiments include thermally strengthened cover glass sheets 500 having thicknesses tin ranges from 0.1 to 20 mm, from 0.1 to 16 mm, from 0.1 to 12 mm, from 0.1 to 8 mm, from 0.1 to 6 mm, from 0.1 to 4 mm, from 0.1 to 3 mm, from 0.1 to 2 mm, from 0.1 to less than 2 mm, from 0.1 to 1.5 mm, from 0.1 to 1 mm, from 0.1 to 0.7 mm, from 0.1 to 0.5 mm and from 0.1 to 0.3 mm.

In some embodiments, cover glass sheets of 3 mm or less in thickness are used. In some embodiments, the cover glass thickness is about (e.g., plus or minus 1%) 8 mm or less, about 6 mm or less, about 3 mm or less, about 2.5 mm or less, about 2 mm or less, about 1.8 mm or less, about 1.6 mm or less, about 1.4 mm or less, about 1.2 mm or less, about 1 mm or less, about 0.8 mm or less, about 0.7 mm or less, about 0.6 mm or less, about 0.5 mm or less, about 0.4 mm or less, about 0.3 mm or less, or about 0.28 mm or less.

In some embodiments, thermally strengthened cover glass sheets have high aspect ratios—i.e., the length and width to thickness ratios are large. Because the thermal tempering processes discussed herein do not rely on high pressures or large volumes of air, various cover glass sheet properties, such as surface roughness and flatness, can be maintained after tempering by the use of gas bearings and high thermal transfer rate systems discussed herein. Similarly, the thermal tempering processes discussed herein allow high aspect ratio cover glass sheets (i.e., cover glass sheets with high ratio of length to thickness, or of width to thickness, or both) to be thermally strengthened while retaining the desired or necessary shape. Specifically, sheets with length to thickness and/or width to thickness ratios ("aspect ratios") of approximately at least 10:1, at least 20:1, and up to and over 1000:1 can be strengthened. In contemplated embodiments, sheets with aspect ratios of at least 200:1, at least 500:1, at least 1000:1, at least 2000:1, at least 4000:1 can be strengthened.

According to an exemplary embodiment, the length l of the strengthened cover glass or glass-ceramic sheet 500 is greater than or equal to the width w, such as greater than twice the width w, greater than five times the width w, and/or no more than fifty times the width w. In some such embodiments, the width w of the strengthened cover glass or glass-ceramic sheet 500 is greater than or equal to the thickness t, such as greater than twice the thickness t, greater than five times the thickness t, and/or no more than fifty times the thickness t.

In some embodiments, such as for applications disclosed with regard to FIGS. 27-30 discussed below, for example, the length l of the cover glass or glass-ceramic sheet 500 is at least 1 cm, such as at least 3 cm, at least 5 cm, at least 7.5 cm, at least 20 cm, at least 50 cm, and/or no more than 50 m, such as no more than 10 m, no more than 7.5 m, no more than 5 m. In some such embodiments, the width w of the cover glass or glass-ceramic sheet 500 is at least 1 cm, such as at least 3 cm, at least 5 cm, at least 7.5 cm, at least 20 cm, at least 50 cm, and/or no more than 50 m, such as no more than 10 m, no more than 7.5 m, no more than 5 m. Referring to FIG. 4, cover glass or glass-ceramic is in the form a sheet 500 has a thickness t that is thinner than 5 cm, such as 2.5 cm or less, 1 cm or less, 5 mm or less, 2.5 mm or less, 2 mm or less, 1.7 mm or less, 1.5 mm or less, 1.2 mm or less, or even 1 mm or less in contemplated embodiments, such as 0.8 mm or less; and/or the thickness t is at least 10 μm, such as at least 50 μm, at least 100 μm, at least 300 μm.

In other contemplated embodiments, the cover glass or glass-ceramic article may be sized other than as disclosed herein. In contemplated embodiments, the length l, width w, and/or thickness t of the cover glass or glass-ceramic articles may vary, such as for more complex geometries (see generally FIG. 30), where dimensions disclosed herein at least apply to aspects of the corresponding cover glass or glass-ceramic articles having the above-described definitions of length l, width w, and thickness t with respect to one another.

In some embodiments, at least one of the first or second surfaces 510, 520 of cover glass sheet 500 has a relatively large surface area. In various embodiments, first and/or second surfaces 510, 520 having areas of at least 100 mm$^2$, such as at least 900 mm$^2$, at least 2500 mm$^2$, at least 5000 mm$^2$, at least 100 cm$^2$, at least 900 cm$^2$, at least 2500 cm$^2$, at least 5000 cm$^2$, and/or no more than 2500 m$^2$, such as no more than 100 m$^2$, no more than 5000 cm$^2$, no more than 2500 cm$^2$, no more than 1000 cm$^2$, no more than 500 cm$^2$, no more than 100 cm$^2$. As such, the cover glass or glass-ceramic sheet 500 may have a relatively large surface area; which, except by methods and systems disclosed herein, may be difficult or impossible to thermally strengthen particularly while having the thicknesses, surface qualities, and/or strain homogeneities of the cover glass sheets discussed herein. Further, except by methods and systems disclosed herein, it may be difficult or impossible to achieve the stress profile, particularly the negative tensile stress portion of the stress profile (see generally FIG. 6), without relying upon ion-exchange or a change in the type of cover glass.

Thermally Strengthened Cover Glass Sheet Compressive and Tensile Stresses

Figure 6:
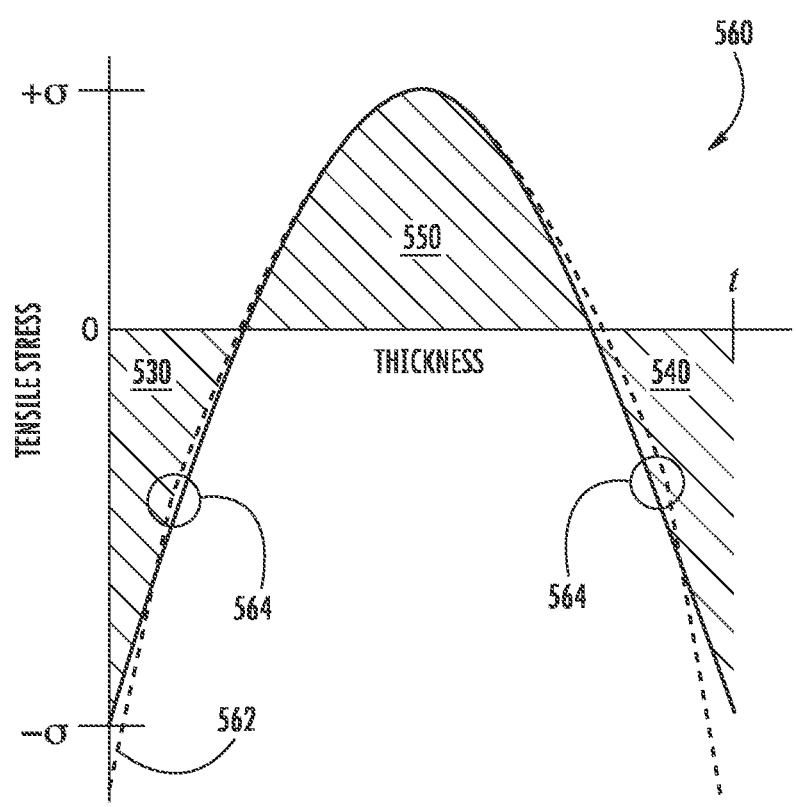
FIG. 6 is a graphical representation of estimated tensile stress versus thickness for a glass or glass-ceramic article according to an exemplary embodiment.

As noted above, the thermally strengthened cover glass sheets discussed herein may have surprisingly high surface compressive stresses, e.g., in regions 530, 540 shown in FIG. 5, surprisingly high central tensile stresses, e.g., in region 550 shown in FIG. 5, and/or unique stress profiles (see FIG. 6). This is particularly true considering the low thickness and/or other unique physical properties (e.g., very low roughness, high degree of flatness, various optical properties, fictive temperature properties, etc.) of cover glass sheet 500 as discussed herein.

Compressive stresses of cover glasses (e.g., in regions 530, 540 shown in FIG. 5) formed by the processes and systems disclosed herein can vary as a function of thickness t of the cover glasses. In various embodiments, cover glasses, e.g., cover glass sheet 500, having a thickness of 3 mm or less have a compressive stress (e.g., surface compressive stress) of at least 80 MPa, at least 100 MPa, at least 150 MPa, at least 200 MPa, at least 250 MPa, at least 300 MPa, at least 350 MPa, at least 400 MPa, and/or no more than 1 GPa. In contemplated embodiments, cover glasses having a thickness of 2 mm or less have a compressive stress of at least 80 MPa, at least 100 MPa, at least 150 MPa, at least 175 MPa, at least 200 MPa, at least 250 MPa, at least 300 MPa, at least 350 MPa, at least 400 MPa, and/or no more than 1 GPa. In contemplated embodiments, cover glasses having a thickness of 1.5 mm or less have a compressive stress of at least 80 MPa, at least 100-MPa, at least 150 MPa, at least 175 MPa, at least 200 MPa, at least 250 MPa, at least 300-MPa, at least 350 MPa, and/or no more than 1 GPa. In contemplated embodiments, cover glasses having a thickness of 1 mm or less have a compressive stress of at least 80 MPa, at least 100 MPa, at least 150 MPa, at least 175 MPa, at least 200 MPa, at least 250 MPa, at least 300 MPa, and/or no more than 1 GPa. In contemplated embodiments, cover glasses having a thickness of 0.5 mm or less have a compressive stress of at least 50 MPa, at least 80 MPa, at least 100 MPa, at least 150 MPa, at least 175 MPa, at least 200 MPa, at least 250 MPa, and/or no more than 1 GPa.

In some embodiments, the thermally induced central tension in cover glasses formed by the processes and systems disclosed herein (e.g., in the region 550 shown in FIG. 5) may be greater than 40 MPa, greater than 50 MPa, greater than 75 MPa, greater than 100 MPa. In other embodiments, the thermally induced central tension may be less than 300 MPa, or less than 400 MPa. In some embodiments, the thermally induced central tension may be from about 50 MPa to about 300 MPa, about 60 MPa to about 200 MPa, about 70 MPa to about 150 MPa, or about 80 MPa to about 140 MPa. In some embodiments, the thermally strengthened cover glass sheets have high thinness i.e., are particularly thin. Because very high-heat transfer rates can be applied via the systems and methods discussed herein, significant thermal effects, for example central tensions of at least 10 or even at least 20 MPa, can be produced in sheets of SLG of less than 0.3 mm thickness. In fact, very thin sheets, sheets at least as thin as 0.1 mm, can be thermal strengthened. Specific levels of thermal stresses achieved and achievable, considered as a function of thickness and other variables, are described in further detail herein.

Referring to FIG. 6, a conceptual stress profile 560, at room temperature of 25° C. and standard atmospheric pressure, of the strengthened cover glass or glass-ceramic sheet 500 of FIG. 4, shows an interior portion 550 of the strengthened cover glass or glass-ceramic sheet 500 under positive tensile stress and portions 530, 540 of the strengthened cover glass or glass-ceramic sheet 500 exterior to and adjoining the interior portion 550 under negative tensile stress (e.g., positive compressive stress). Applicant believes that the negative tensile stress at least in part fortifies the strengthened cover glass or glass-ceramic sheet 500 by limiting initiation and/or propagation of cracks therethrough.

Believed unique to the present inventive technology, given relatively large surface areas and/or thin thicknesses of the strengthened cover glass or glass-ceramic sheet 500 as disclosed herein, tensile stress in the stress profile 560 sharply transitions between the positive tensile stress of the interior portion 550 and the negative tensile stress of the portions 530, 540 exterior to and adjoining the interior portion 550. This sharp transition may be understood as a rate of change (i.e., slope) of the tensile stress which may be expressed as a magnitude of stress (e.g., 100 MPa, 200 MPa, 250 MPa, 300 MPa, 400 MPa, a difference in peak values of the positive and negative tensile stresses +σ, −σ) divided by a distance of thickness over which the change occurs, such as a distance of 1 mm, such as a distance of 500 µm, 250 µm, 100 µm (which is the distance used to quantify a rate of change, which may be a portion of article thickness, and not necessarily a dimension of the article geometry). In some such embodiments, the rate of change of the tensile stress does not exceed 7000 MPa divided by 1 mm, such as no more than 5000 MPa divided by 1 mm. In contemplated embodiments, the difference in peak values of the positive and negative tensile stresses is at least 50 MPa, such as at least 100 MPa, at least 150 MPa, at least 200 MPa, at least 250 MPa, at least 300 MPa, at least 400 MPa, at least 500 MPa, and/or no more than 50 GPa. In contemplated embodiments, the cover glass or glass-ceramic sheet 500 has a peak negative tensile stress of at least 50 MPa in magnitude, such as at least 100 MPa, at least 150 MPa, at least 200 MPa, at least 250 MPa, at least 300 MPa, at least 400 MPa, at least 500 MPa. The steep tensile curve transitions generated by the system and method discussed herein are believed to be indicative of the ability to achieve higher magnitudes of negative tensile stress at a surface of a cover glass sheet for a given thickness and/or to manufacture thinner cover glass articles to a higher degree of negative tensile stress, such as to achieve a fragmentation potential for dicing as disclosed herein. Conventional thermal tempering approaches may be unable to achieve such steep tensile stress curves.

According to an exemplary embodiment, the high rate of change of tensile stress is at least one of the above-described magnitudes or greater sustained over a thickness-wise stretch of the stress profile 560 that is at least 2% of the thickness, such as at least 5% of the thickness, at least 10% of the thickness, at least 15% of the thickness, or at least 25% of the thickness of cover glass sheet 500. In contemplated embodiments, the strengthening extends deep into the strengthened cover glass or glass-ceramic sheet 500 such that the thickness-wise stretch with the high rate of change of tensile stress is centered at a depth of between 20% and 80% into the thickness from the first surface, which may further distinguish chemical tempering for example.

In at least some contemplated embodiments, the strengthened cover glass or glass-ceramic article includes a change in the composition thereof in terms of ion content, conceptually shown as dotted line 562 in FIG. 6. More specifically, the composition of the strengthened cover glass or glass-ceramic article 500 in such embodiments includes exchanged or implanted ions that influence the stress profile 560. In some such embodiments, the exchanged or implanted ions do not extend fully through the portions 530, 540 of the strengthened cover glass or glass-ceramic article 500 under the negative tensile stress because the negative tensile stress is also a result of the thermal tempering as disclosed herein.

Accordingly, the curve of the tensile stress profile 560 with ion exchange strength augmentation includes a discontinuity or sudden change 564 in direction where tangents of the curve differ from one another on either side of the discontinuity or sudden change 564. The sudden change 564 is located within the portions 530, 540 under negative tensile stress such that the tensile stress is negative on either side immediately adjacent to the discontinuity or sudden change 564. The discontinuity or sudden change 564 may correspond to the depth of the different ion content, however in some such embodiments other parts of the portions 530, 540 under negative tensile stress still have the same composition in terms of ion content as the portion 550 under positive tensile stress.

Put another way, for at least some strengthened cover glass or glass ceramic articles 500, with or without ion-exchange or implantation, the composition of at least a part of the portions 530, 540 of the strengthened cover glass or glass-ceramic sheet 500, which is under the negative tensile stress and is exterior to and adjoining the interior portion 550, is the same as the composition of at least a part of the interior portion 550, which is under the positive tensile stress. In such embodiments, at least some of the negative tensile stress of the stress profile is independent of a change in the composition (e.g., ion composition) of the strengthened cover glass or glass-ceramic sheet 500. Such structure may simplify the composition of the strengthened cover glass or glass-ceramic sheet 500 at least to a degree by providing sufficient strength without and/or with less chemical tempering. Further, such structure may reduce stress concentrations within the strengthened cover glass or glass-ceramic sheet 500 due to discontinuity/changes in composition, possibly reducing chances of delamination and/or cracking at the composition discontinuity.

Thermally Tempered Cover Glass Sheet Break Performance

If sufficient energy is stored in the region of tensile stress 550, the cover glass will break like safety glass or "dice" when sufficiently damaged. As used herein, a cover glass sheet is considered to dice when an area of the cover glass sheet 25 cm² breaks into 40 or more pieces. In some embodiments, dicing is used as a qualitative measure of showing that the cover glass sheet is "fully tempered" (i.e., for 2 mm or thicker cover glass, where the cover glass sheet has a compressive stress of at least 65 MPa or an edge compression of at least 67 MPa). In various embodiments, cover glass sheet 500 has sufficient tensile stress in region of tensile stress 550 such that a 25 cm² piece of cover glass sheet 500 breaks into 40 or more pieces.

Figure 7:
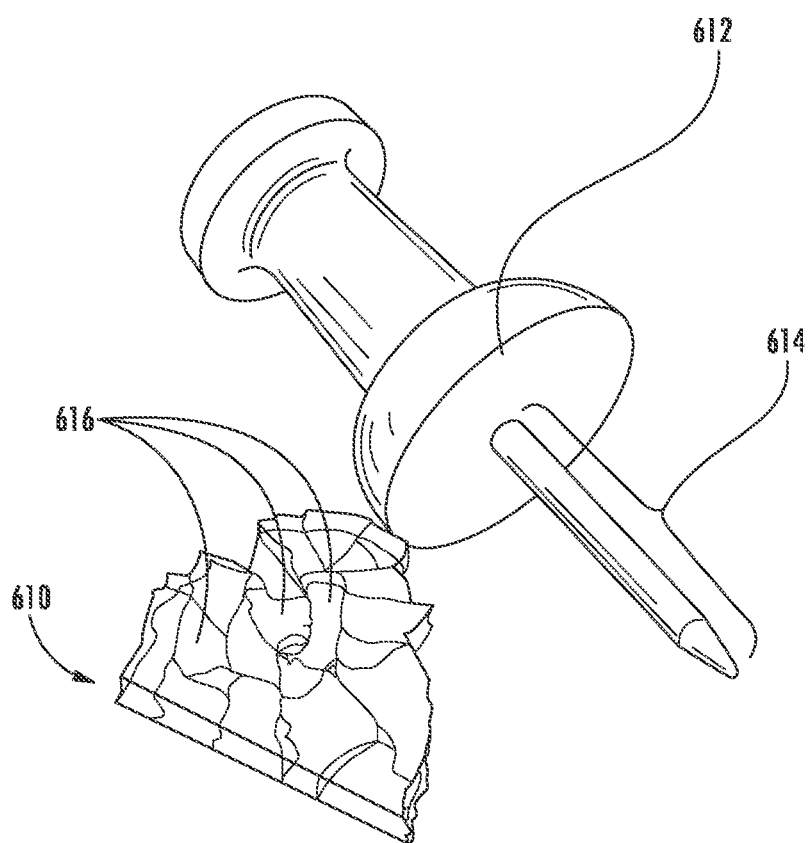
FIG. 7 shows a portion of a fractured cover glass or glass-ceramic article according to an exemplary embodiment.

Referring to FIG. 7, a cover glass or glass-ceramic article 610, having properties as disclosed herein with respect to the cover glass or glass-ceramic sheets, such as sheet 500, has been fractured, such as using a prick punch or other instrument and/or generally in accordance with American National Standards Institute (ANSI) Z97.1 (impact test) and the ASTM 1048 standard. According to an exemplary embodiment, the cover glass or glass ceramic article 610 has been strengthened to a degree that dicing has occurred upon the fracture, forming a plurality of small granular chunks 616 (e.g., fragments, pieces). In some embodiments, the cover glass or glass-ceramic article 610 has a thermally-induced stress sufficient to produce a number of granular chunks 616 that is not less than 40 within an area of 50-by-50 mm of the cover glass or glass-ceramic article 610 in a fragmentation test in which an impact is applied with a hammer or a punch to initiate cracking of the cover glass into granular pieces. A standard office thumb tack 612, with a metal pin length 614 of about 1 cm is shown for reference.

According to various contemplated embodiments, despite the thin thickness of the strengthened cover glass or glass-ceramic article 610, the stress profile (see generally FIG. 6) imparts a high fragmentation potential of the strengthened cover glass or glass-ceramic article 610 such that when fractured the strengthened cover glass or glass-ceramic article 610 shatters into particularly small granular chunks 616, those having an area on either the first or second surface of less than 90 mm², such as less than 50 mm², such as less than 20 mm², such as less than 10 mm², such as less than 5 mm², and/or at least 10 µm². In some such embodiments, the fragmentation potential of the strengthened cover glass or glass-ceramic article 610 is such that at least 20% (e.g., at least 50%, at least 70%, at least 95%) of the granular chunks 616 have an area of at least one of the first or second surfaces of one of the above-described amounts when the strengthened cover glass or glass-ceramic article is fractured.

Due at least in part to the particularly thin geometry of the cover glass or glass-ceramic article 610 that may be manufactured with the tensile stresses as disclosed herein using the inventive technology in some embodiments, the fragmentation potential of the strengthened cover glass or glass-ceramic article 610 is such that, when fractured, the strengthened cover glass or glass-ceramic article 610 shatters into particularly low-volume granular chunks, those having a volume of less than 50 mm³, such as less than 40 mm³, such as less than 30 mm³, such as less than 25 mm³, and/or at least a volume of 50 µm³.

Due at least in part to the particularly large area of the cover glass or glass-ceramic article 610 that may be manufactured with the tensile stresses as disclosed herein using the inventive technology in some embodiments, the fragmentation potential of the strengthened cover glass or glass-ceramic article 610 is such that, when fractured, the strengthened cover glass or glass-ceramic article 610 shatters into at least 100 granular chunks 616 of at least of 50 µm³ in volume, such as at least 200, at least 400, at least 1000, at least 4000 granular chunks 616 of at least of 50 µm³ in volume.

Figure 8:
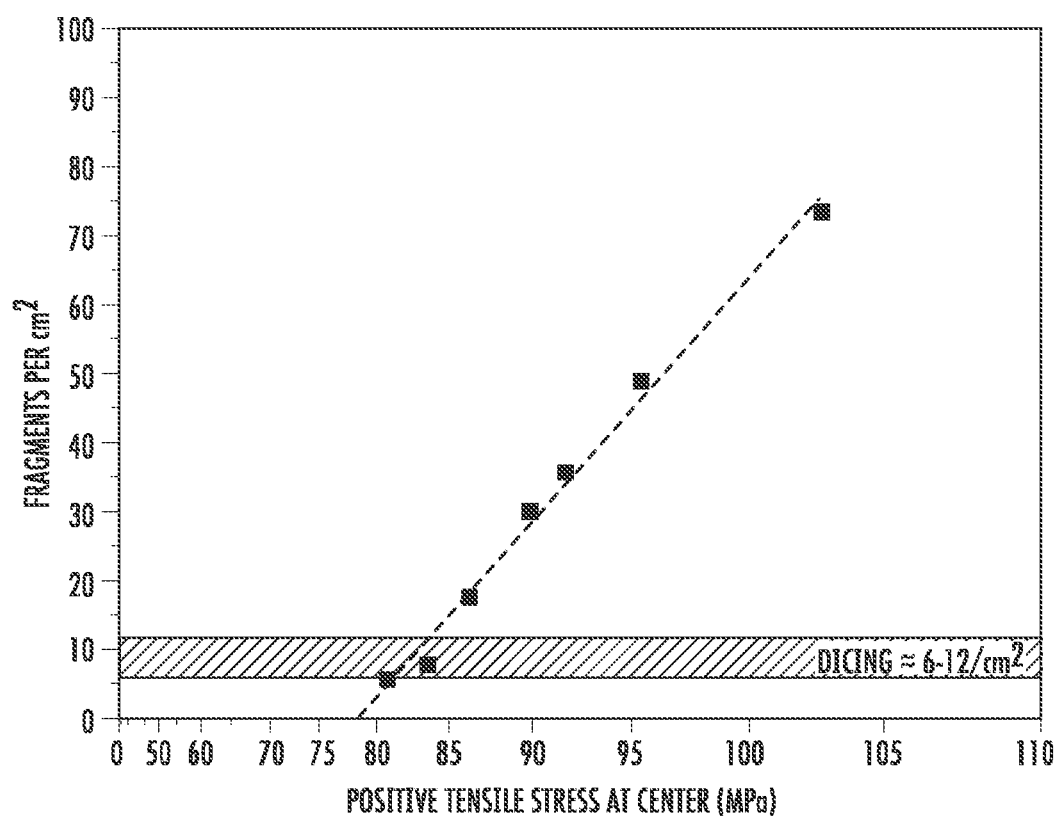
FIG. 8 is a plot of fragmentation per square centimeter as a function of positive tensile stress from experiment.
Figure 9:
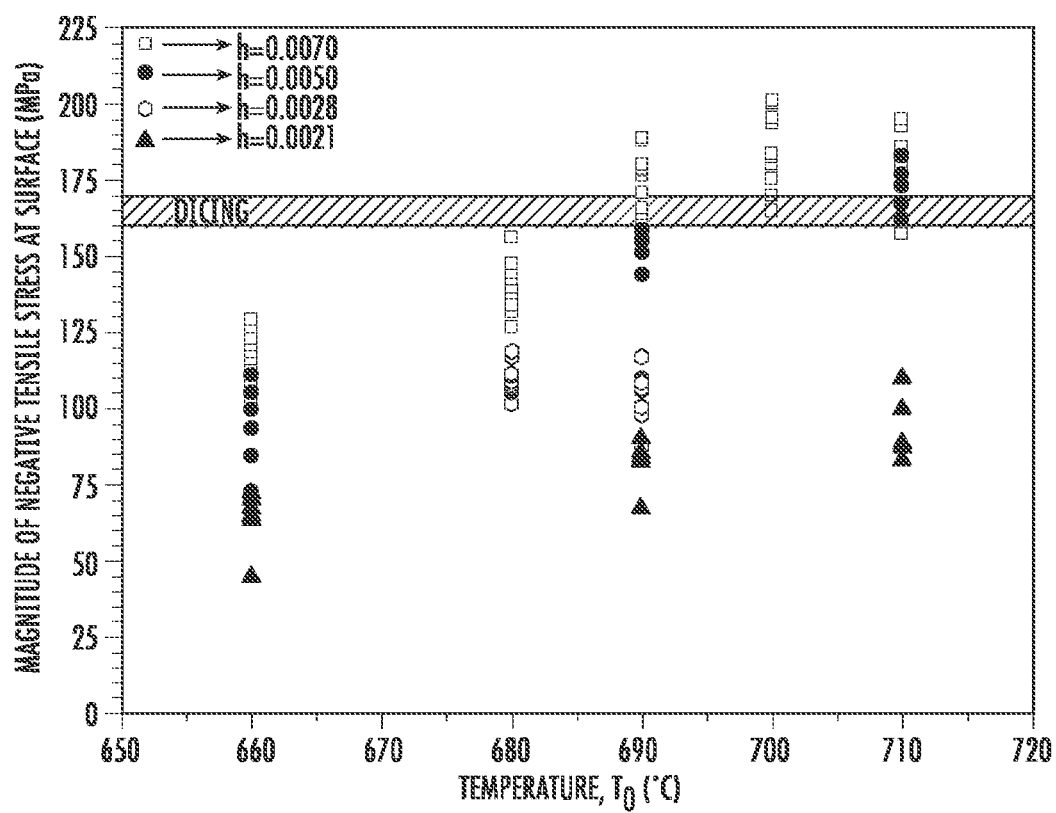
FIG. 9 is a plot of the magnitude of negative tensile stress at the surface as a function of initial hot zone temperature from experiment, showing a threshold to achieve dicing.

Referring now to FIG. 8 and FIG. 9, experiments were performed on 1.1 mm thick glass sheets of glass comprising at least 70% silicon dioxide by weight, and/or at least 10% sodium oxide by weight, and/or at least 7% calcium oxide by weight, and strengthened using the equipment and processes disclosed herein. As shown in FIG. 8, the number of granular chunks 616 per square centimeter of the glass has been found to be generally related to the magnitude of positive tensile stress at the center of the respective cover glass or glass-ceramic article 610. Similarly, as shown in FIG. 9, the fragmentation potential of the respective cover glass or glass-ceramic article 610 has also been found to be related to temperature of the glass in the hot zone (see e.g., FIG. 21, FIG. 22 and FIG. 23) and the calculated expected heat transfer coefficient (h) in units of cal/cm²·s·° C. (SI units watt/m²·° K) effectively applied to the cover glass surfaces during quenching, based on size of the gap between the glass sheet surfaces and the heat sink/gas bearing during quenching and on the thermal conductivity of the gas used in the gap.

Thermally Tempered Cover Glass Sheet Fictive Temperature

In various embodiments, the thermally strengthened cover glass sheets formed by the systems and methods discussed herein (e.g., cover glass sheet 500) have high fictive temperatures. It will be understood that in various embodiments, high fictive temperatures of the cover glass materials discussed herein relate to the high level of tempering, high central tensile stresses and/or high compressive surface stress of cover glass sheet 500. Surface fictive temperatures may be determined by any suitable method, including differential scanning calorimetry, Brillouin spectroscopy, or Raman spectroscopy.

According to an exemplary embodiment, the cover glass or glass-ceramic sheet 500 has a portion thereof, such as at or near the first and/or second surfaces 510, 520, that has a particularly high fictive temperature, such as at least 500° C., such as at least 600° C., or even at least 700° C. in some embodiments, such as for soda-lime glass. According to an exemplary embodiment, the cover glass or glass-ceramic sheet 500 has a portion thereof, such as at or near the first and/or second surfaces 510, 520, that has a particularly high fictive temperature relative to annealed glass of the same chemical composition, such as at least 10° C. greater, at least 30° C. greater, at least 50° C. greater, at least 70° C. greater, or even at least 100° C. greater. High fictive temperature may be achieved by the presently disclosed inventive technology at least in part due to the rapid transition from the hot to the cooling zones in the strengthening system (see e.g., FIG. 21, FIG. 22 and FIG. 23). Applicant believes that high fictive temperature may correspond or relate to increased damage resistance of glass.

In some methods of determining surface fictive temperatures, it may be necessary to break the glass to relieve the "temper stresses" induced by the heat strengthening process in order to measure fictive temperature with reasonably accuracy. It is well known that characteristic structure bands measured by Raman spectroscopy shift in a controlled manner both with respect to the fictive temperature and with respect to applied stress in silicate glasses. This shift can be used to non-destructively measure the fictive temperature of a thermally strengthened cover glass sheet if the temper stress is known.

Figure 10:
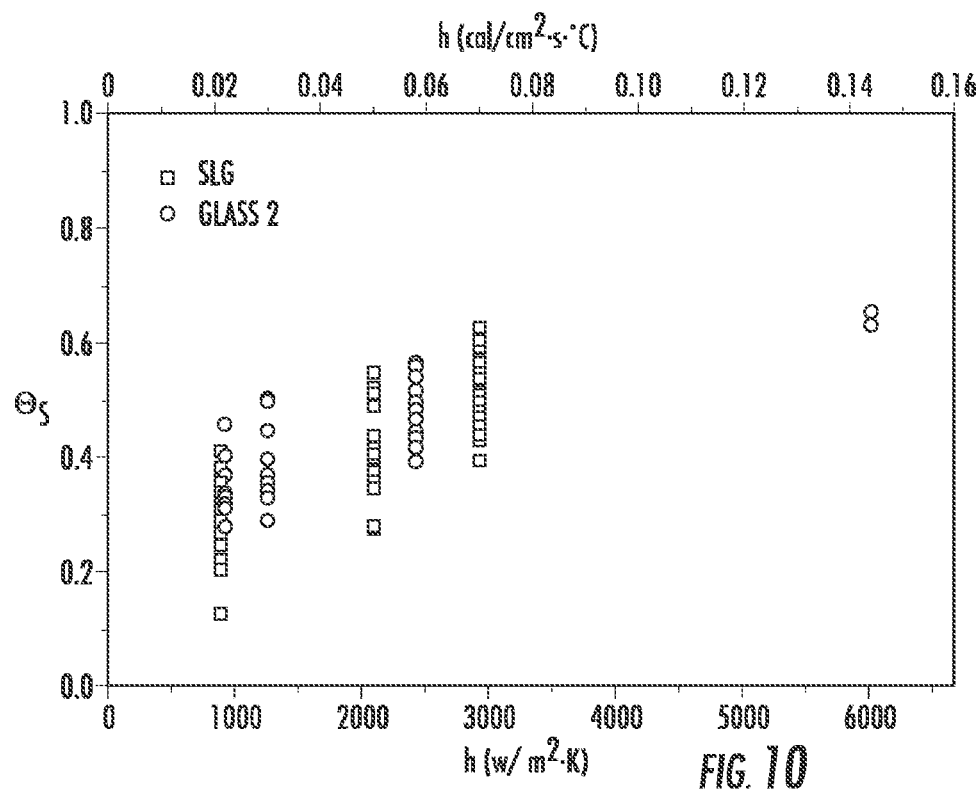
FIG. 10 is a plot of the non-dimensional surface fictive temperature parameter θs for fictive temperatures obtained by one or more embodiments of methods and systems of the present invention.

Referring generally to FIG. 10, determination of fictive temperature for several exemplary cover glass articles is shown. Stress effects on the Raman spectrum of silica glass are reported in D. R. Tallant, T. A. Michalske, and W. L. Smith, "The effects of tensile stress on the Raman spectrum of silica glass," *J. Non-Cryst. Solids*, 106 380-383 (1988). Commercial glasses of 65 wt. % silica or more have substantially the same response. Although the reported stress response is for uniaxial stress, in the case of a unibiaxial stress state such as that which is observed in tempered glass, $\sigma_{xx}=\sigma_{yy}$, the peak can be expected to shift by twice that expected by a uniaxial stress. The peak near 1090 cm$^{-1}$ in soda-lime glass and in glass 2 corresponds to the 1050 cm$^{-1}$ peak observed in silica glass. The effects of stress on the 1050 cm$^{-1}$ peak in silica, and on the corresponding peak in SLG and other silicate glasses can be expressed, as a function of stress σ in MPa, by equation a) $\omega(cm^{-1})=1054.93-0.00232\cdot\sigma$.

A calibration curve was produced of Raman band positions as a function of the fictive temperature for SLG and another glass, glass 2. Glass samples were heat-treated for various times, 2-3 times longer than the structural relaxation times calculated by τ=10*η/G, where η is the viscosity, and G the shear modulus. After heat-treatment, the glasses were quenched in water to freeze the fictive temperature at the heat-treatment temperature. The glass surfaces were then measured by micro Raman at 50× magnification and a 1-2 μm spot size using a 442 nm laser, 10-30 s exposure time, and 100% power, over the range of 200-1800 cm$^{-1}$. The position of the peak at 1000-1200 cm$^{-1}$ was fit using computer software, Renishaw WiRE version 4.1, in this case. A good fit of the 1090 cm$^{-1}$ Raman peak measured in SLG on the air side as a function of fictive temperature Tf (in ° C.) is given by equation b) $\omega(cm^{-1})=1110.66-0.0282\cdot Tf$. For glass 2, a good fit is given by equation c) $\omega(cm^{-1})=1102.00-0.0231\cdot Tf$.

Using the relationships established in equations a), b), and c), it is possible to express the fictive temperature of the cover glass as a function of a measured Raman peak position with a correction factor due to surface compressive stress. A compressive stress of 100 MPa, $\sigma_c$, shifts the Raman band position equivalent to approximately a 15 to 20 degree Celsius reduction in the fictive temperature. The following equation is applicable to SLG:

$$T_f(°C.) = \left[\frac{\omega(cm^{-1}) - 1110.66(cm^{-1})}{-0.0282\left(\frac{cm^{-1}}{°C.}\right)}\right] + 2[0.082 * \sigma_c(MPa)] \quad (1)$$

The equation applicable to glass 2 is:

$$T_f(°C.) = \left[\frac{\omega(cm^{-1}) - 1102(cm^{-1})}{-0.0231\left(\frac{cm^{-1}}{°C.}\right)}\right] + 2[0.0996 * \sigma_c(MPa)] \quad (2)$$

In these equations, ω is the measured peak wavenumber for the peak near 1090 cm$^{-1}$, $\sigma_c$ is the surface compressive stress measured by any suitable technique, yielding stress-corrected measurement of fictive temperature in ° C. As a demonstration of increased damage resistance related to the determined fictive temperature, four glass sheet samples were prepared, two 6 mm soda-lime glass (SLG) sheets by conventional tempering methods to approximately 70 and 110 MPa surface compressive stress (CS), and two 1.1 mm SLG sheets by the methods and systems disclosed herein to about the same levels of CS. Two additional sheets, one of each thickness were used as controls. The surfaces of each test sheet were subjected to standard Vickers indentation. Various levels of force were applied, for 15 seconds each, and after a 24 hour wait, indentations were each examined. As shown in Table I, the 50% cracking threshold (defined as the load at which the average number of cracks appearing is two out of the four points of the indenter at which cracks tend to initiate) was determined for each sample.

Table I shows that the Vickers crack initiation threshold for SLG processed by conventional convective gas tempering (as reflected in the 6 mm sheet) is essentially the same as that for annealed or as-delivered SLG sheets, rising from between zero and one newton (N) to about one to less than two newtons. This correlates with the relatively modest rise in surface fictive temperature ($T_{fs}$ or $Tf_{surface}$) of ~25 to 35° C. relative to glass transition temperature ($T_g$=550° C. for SLG, defined as η=10$^{12-13.3}$ Poise) that was provided by conventional tempering. In contrast, by tempering using the present methods and systems, the Vickers crack initiation threshold improved to greater than 10 N, a 10-fold increase over the Vickers damage resistance imparted by conventional tempering. In the embodied glasses, the $T_{fs}$ minus $T_g$ was at least 50° C., or at least 75° C., or at least 90° C., or in the range of from approximately 75° C. to 100° C. Even in embodiments comprising lower levels of heat strengthening, the embodied glasses can still provide increased resistance, at levels such as 5 N, for instance. In certain contemplated embodiments, the 50% cracking threshold after a 15 second Vickers crack initiation test may be equal to or greater than 5 N, 10 N, 20 N, or 30 N.

TABLE I

| Sample | Thickness (mm) | CS (MPa) | Surface $T_f$ (° C.) | Cracking Threshold (N) |
|---|---|---|---|---|
| Control | 1.1 | Annealed | ~$T_g$ (550) | 0-1 |
| Control | 6 | Annealed | ~$T_g$ (550) | 0-1 |
| Thin low strength | 1.1 | −72 | 626 | 10-20 |
| Thick low strength | 6 | −66 | 575 | 1-2 |
| Thin medium strength | 1.1 | −106 | 642 | 10-20 |
| Thick medium strength | 6 | −114 | 586 | 1-2 |

The following non-dimensional fictive temperature parameter θ can be used to compare the relative performance of a thermal strengthening process in terms of the fictive temperature produced. Given in terms of surface fictive temperature θs in this case:

$$\theta s = (T_{fs} - T_{anneal})/(T_{soft} - T_{anneal}) \quad (3)$$

where $T_{fs}$ is the surface fictive temperature, $T_{anneal}$ (the temperature of the glass at a viscosity of η=10$^{13.2}$ Poise) is the annealing point and $T_{soft}$ (the temperature of the glass at a viscosity of η=10$^{7.6}$ Poise) is the softening point of the glass of the sheet. FIG. 10 is a plot of θs for measured surface fictive temperatures as a function of heat transfer rate, h, applied during thermal strengthening for two different glasses. As shown in FIG. 10, the results for the two different glasses overlie each other fairly closely. This means that parameter θ provides a means to compare the fictive temperatures of different glasses compared directly, in relation to the heat transfer rate h required to produce them. The vertical range of results at each h corresponds to variation in the value of $T_0$, the initial temperature at the start of quenching. In embodiments, parameter θs comprises from about (e.g., plus or minus 10%) 0.2 to about 0.9, or 0.21 to 0.09, or 0.22 to 0.09, or 0.23 to 0.09, or 0.24 to 0.09, or 0.25 to 0.09, or 0.30 to 0.09, or 0.40 to 0.09, or 0.5 to 0.9, or 0.51 to 0.9, or 0.52 to 0.9, or 0.53 to 0.9, or 0.54 to 0.9, or 0.54 to 0.9, or 0.55 to 0.9, or 0.6 to 0.9, or even 0.65 to 0.9.

Thermally Tempered Cover Glass Sheet Temperability Parameter

In various embodiments, the thermally strengthened cover glass sheets formed by the systems and methods discussed herein (e.g., cover glass sheet 500) have a high temperability and/or heat transfer value. The "specific thermal stress" of a glass is given by:

$$\frac{\alpha \cdot E}{1-\mu} \quad (4)$$

where $\alpha$ is the (low temperature linear) CTE of the glass, E is the modulus of elasticity of the glass material and $\mu$ is Poisson's ratio of the glass material. This value is used to indicate the level of stress produced within a given glass composition when subjected to a temperature gradient. It may also be used as an estimator of thermal "temperability." At higher thermal transfer rates (such as at about 800 W/m²K and above, for example), however, the high temperature or "liquidus" CTE of the glass begins to affect tempering performance. Therefore, under such conditions, the temperability parameter Ψ, based on an approximation of integration over the changing CTE values across the viscosity curve, is found to be useful:

$$\Psi = E \cdot [T_{strain} \cdot \alpha C_{CTE}^S + \alpha_{CTE}^L \cdot (T_{soft} - T_{strain})] \quad (5)$$

where $\alpha_{CTE}^S$ is the low temperature linear CTE (equivalent to the average linear expansion coefficient from 0-300° C. for the glass), expressed in 1/° C. (° C.$^{-1}$), $\alpha_{CTE}^L$ is the high temperature linear CTE (equivalent to the high-temperature plateau value which is observed to occur somewhere between the glass transition and softening point), expressed in 1/° C. (° C.$^{-1}$), E is the elastic modulus of the glass, expressed in GPa (not MPa) (which allows values of the (non-dimensional) parameter to range generally between 0 and 1), $T_{strain}$ is the strain point temperature of the glass, (the temperature of the glass at a viscosity of $\eta=10^{14.7}$ Poise) expressed in ° C., and $T_{soft}$ is the softening point of the glass (the temperature of the glass at a viscosity of $\eta=10^{7.6}$ Poise), expressed in ° C.

The thermal strengthening process and resulting surface compressive stresses were modeled for glasses having varying properties to determine the tempering parameter, Ψ. The glasses were modeled at the same starting viscosity of $10^{8.2}$ Poise and at varying heat transfer coefficients. The properties of the various glasses are shown in Table II, together with the temperature for each glass at $10^{8.2}$ Poise and the calculated value of the temperability parameter Ψ for each.

TABLE II

| Glass | Modulus | CTE low | CTE high | 10$^{8.2}$ Poise ° C. | Softening Point ° C. | Strain Point ° C. | Ψ |
| --- | --- | --- | --- | --- | --- | --- | --- |
| SLG | 72 | 8.8 | 27.61 | 705 | 728 | 507 | 0.76 |
| 2 | 73.3 | 8.53 | 20.49 | 813 | 837 | 553 | 0.77 |
| 3 | 65.5 | 8.26 | 26 | 821 | 862 | 549 | 0.83 |
| 4 | 65 | 8.69 | 20.2 | 864 | 912 | 608 | 0.74 |
| 5 | 63.9 | 10.61 | 22 | 849 | 884 | 557 | 0.84 |
| 6 | 58.26 | 3.5 | 20.2 | 842 | 876 | 557 | 0.49 |
| 7 | 73.6 | 3.6 | 13.3 | 929 | 963 | 708 | 0.44 |
| 8 | 81.1 | 3.86 | 12.13 | 968 | 995 | 749 | 0.48 |

Figure 11:
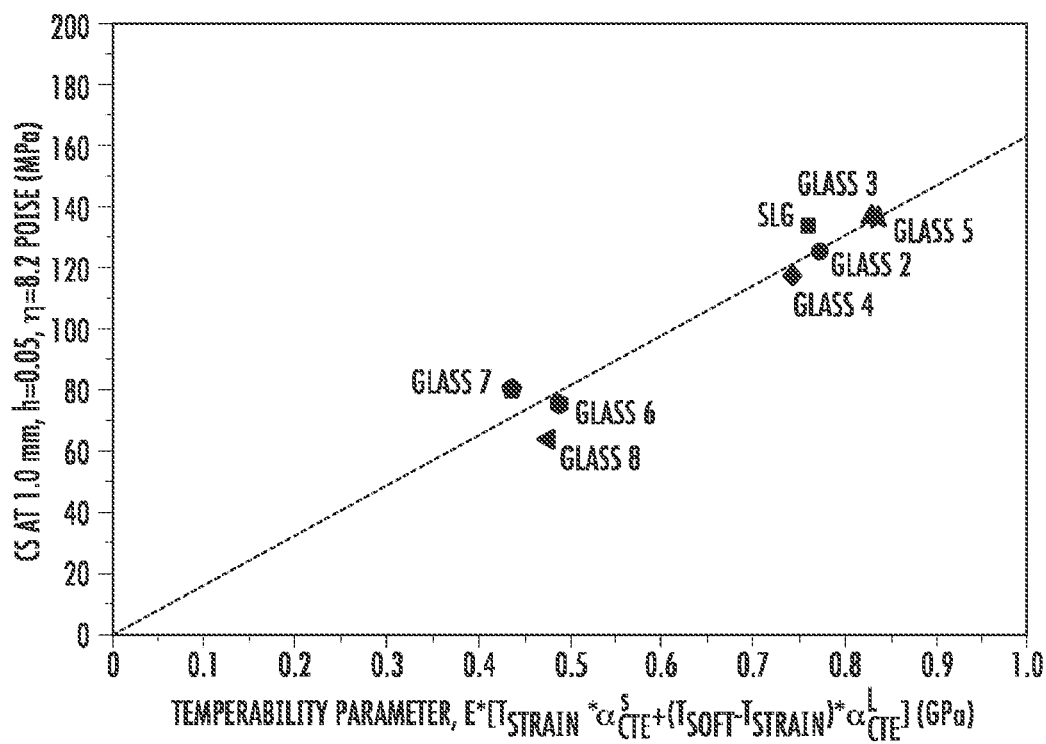
FIG. 11 is a plot of surface compression stresses calculated by simulation for differing glass compositions, plotted against a proposed temperability parameter Ψ for the various compositions shown.

The results in Table II show that is proportional to the thermal strengthening performance of the glass. This correlation is further shown in FIG. 11, which provides an embodied example for a high heat transfer rate (a heat transfer coefficient of 2093 W/m²K (0.05 cal/s·cm²·° C.)) and a glass sheet thickness of only 1 mm. As seen in the figure, the variation in the seven differing glasses' resulting compressive stress correlates well with the variation in the proposed temperability parameter Ψ.

Thermally Tempered Cover Glass Sheet Heat Transfer Coefficient and Relation to Surface Compressive Stress and Central Tension Stress In another aspect, it has been found that for any glass, at any given value of the heat transfer coefficient, h (expressed in cal/cm²–s–° C.), the curves of surface compressive stress ($\sigma_{CS}$, in MPa) vs. thickness (t, in mm) can be fit (over the range of t from 0 to 6 mm) by the hyperbola, where $P_1$ and $P_2$ are functions of h such that:

$$\sigma_{CS}(\text{Glass}, h, t) = C(h, t) * \Psi(\text{Glass}) = \frac{P_1(h) * t}{(P_2(h) + t)} * \Psi(\text{Glass}) \quad (6)$$

or with the expression for Ψ substituted in, the curve of compressive stress $\sigma_{CS}$ (Glass,h,t) is given by:

$$\frac{P_1(h) * t}{(P_2(h) + t)} \cdot E \cdot [T_{strain} \cdot \alpha_{CTE}^S + \alpha_{CTE}^L \cdot (T_{soft} - T_{strain})] \quad (7)$$

where the constants $P_1$, $P_2$, in either (6) or (7) above, are each continuous functions of the heat transfer value, h, given by:

$$P_1 = 910.2 - 259.2 \cdot \exp\left(-\frac{h}{0.143}\right) \quad (8)$$

and $$P_2 = 2.53 + \frac{23.65}{\left(1 + \left(\frac{h}{0.00738}\right)^{1.58}\right)} \quad (9)$$

Figure 12:
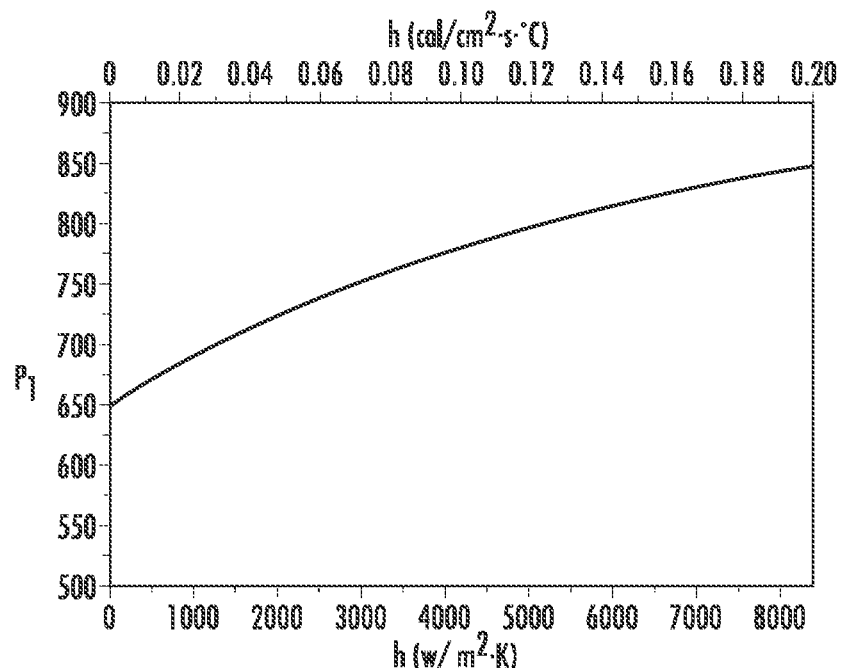
FIGS. 12 and 13 are graphs of two parameters $P_1$ and $P_2$ as functions of heat transfer coefficient h.
Figure 13:
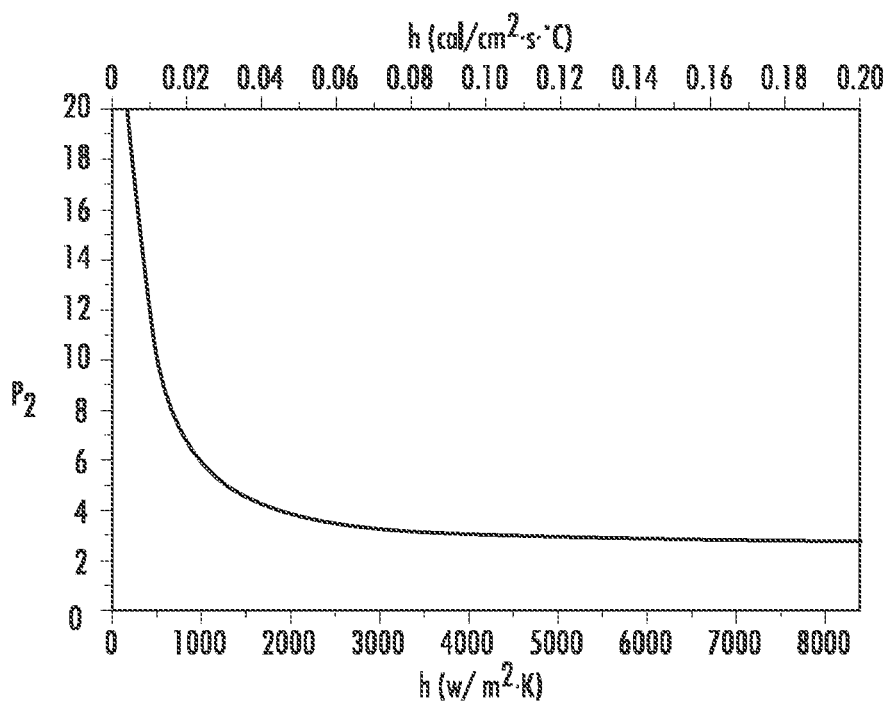

The constants $P_1$, $P_2$, are graphed as functions of h in FIGS. 12 and 13, respectively. Accordingly, by using a value of $P_1$, for a given h and the corresponding $P_2$, for that same h in expression (6) or (7) above, a curve is specified corresponding to the surface compressive stress (CS) obtainable at that h, as a function of thickness t.

In some embodiments, a similar expression may be used to predict the central tension (CT) of a thermally strengthened cover glass sheet, particularly at a thickness of 6 mm and less, and the thermal transfer coefficient, such as 800 W/m²K and up, by simply dividing the compressive stress predicted under the same conductions by 2. Thus, expected central tension may be given by $$\frac{P_{1CT}(h_{CT}) * t}{(P_{2CT}(h_{CT}) + t)} \cdot E \cdot [T_{strain} \cdot \alpha_{CTE}^S + \alpha_{CTE}^L \cdot (T_{soft} - T_{strain})] \quad (10)$$

Where $P_{1CT}$ and $P_{2CT}$ are given as follows:

$$P_{1CT} = 910.2 - 259.2 \cdot \exp\left(-\frac{h_{CT}}{0.143}\right) \quad (11)$$

and

-continued $$P_{2CT} = 2.53 + \frac{23.65}{\left(1 + \left(\frac{h_{CT}}{0.00738}\right)^{1.58}\right)} \quad (12)$$

In some embodiments, h and $h_{CT}$, may have the same value for a given physical instance of thermal strengthening. However, in some embodiments, they may vary, and providing separate variables and allowing variation between them allows for capturing, within descriptive performance curves, instances in which the typical ratio of 2:1 CS/CT does not hold.

One or more embodiments of the currently disclosed processes and systems have produced thermally strengthened SLG sheets at all of the heat transfer rate values (h and $h_{CT}$) shown in Table III.

TABLE III h and $h_{CT}$ values according to exemplary embodiments

| cal/s · cm² · ° C. | W/m²K |
| --- | --- |
| 0.010 | 418.68 |
| 0.013 | 544.284 |
| 0.018 | 753.624 |
| 0.019 | 795.492 |
| 0.020 | 837.36 |
| 0.021 | 879.228 |
| 0.022 | 921.096 |
| 0.023 | 962.964 |
| 0.027 | 1130.436 |
| 0.028 | 1172.304 |
| 0.029 | 1214.172 |
| 0.030 | 1256.04 |
| 0.031 | 1297.908 |
| 0.033 | 1381.644 |
| 0.034 | 1423.512 |
| 0.038 | 1590.984 |
| 0.040 | 1674.72 |
| 0.041 | 1716.588 |
| 0.042 | 1758.456 |
| 0.045 | 1884.06 |
| 0.047 | 1967.796 |
| 0.048 | 2009.664 |
| 0.049 | 2051.532 |
| 0.050 | 2093.4 |
| 0.051 | 2135.268 |
| 0.052 | 2177.136 |
| 0.053 | 2219.004 |
| 0.054 | 2260.872 |
| 0.055 | 2302.74 |
| 0.060 | 2512.08 |
| 0.061 | 2553.948 |
| 0.062 | 2595.816 |
| 0.063 | 2637.684 |
| 0.065 | 2721.42 |
| 0.067 | 2805.156 |
| 0.069 | 2888.892 |
| 0.070 | 2930.76 |
| 0.071 | 2972.628 |
| 0.078 | 3265.704 |
| 0.080 | 3349.44 |
| 0.081 | 3391.308 |
| 0.082 | 3433.176 |
| 0.095 | 3977.46 |
| 0.096 | 4019.328 |
| 0.102 | 4270.536 |
| 0.104 | 4354.272 |
| 0.105 | 4396.14 |
| 0.127 | 5317.236 |
| 0.144 | 6028.992 |
| 0.148 | 6196.464 |
| 0.149 | 6238.332 |
| 0.184 | 7703.712 |

In some embodiments, the heat transfer value rates (h and $k_{CT}$) may be from about 0.024 to about 0.15, about 0.026 to about 0.10, or about 0.026 to about 0.075 cal/s·cm²·° C.

Figure 14:
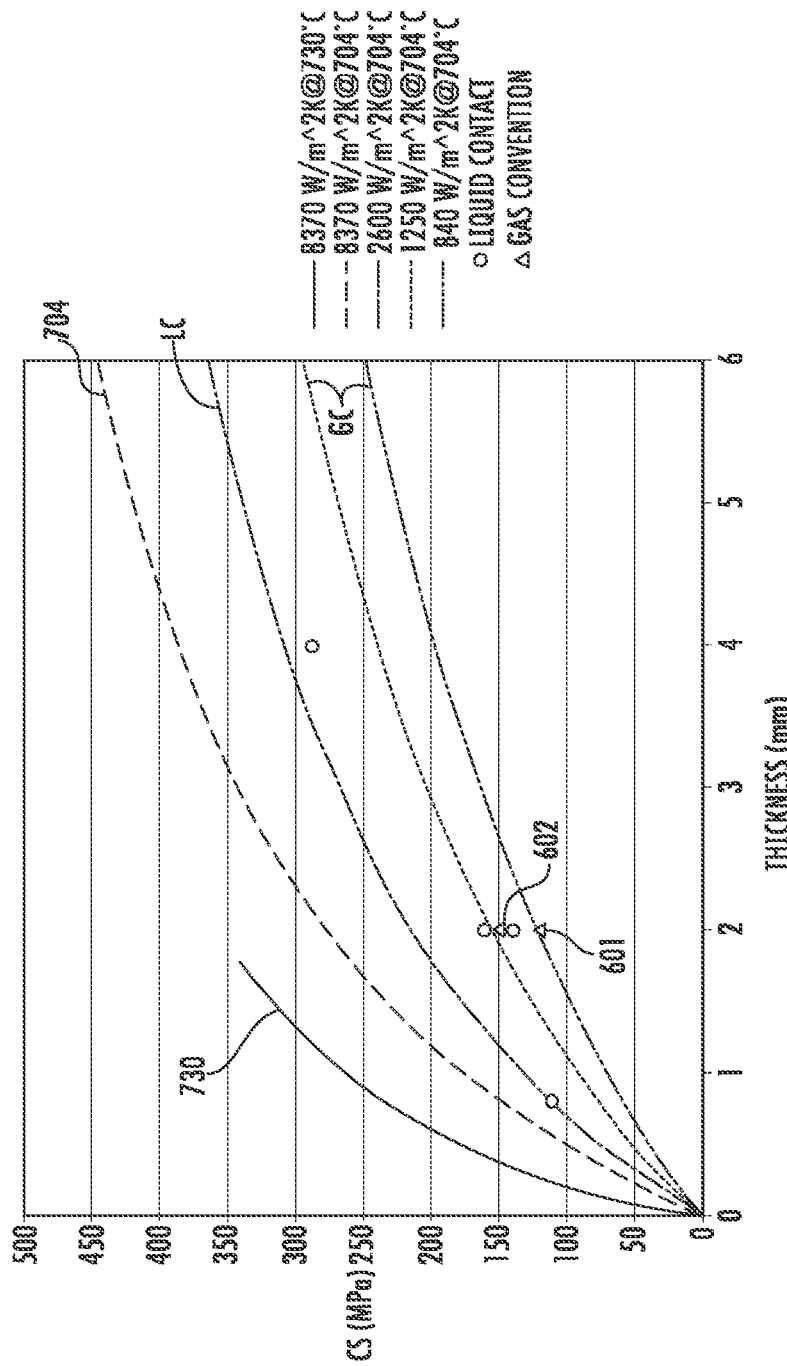
FIG. 14 is a graph of MPa of surface compression of a glass sheet as a function of thickness t of the sheet in millimeters, showing regions of performance newly opened by one or more embodiments of the systems and methods of the present disclosure.

FIG. 14 shows the newly opened performance space in MPa of surface compression of a glass sheet as a function of thickness t (in mm), by a graph of C(h,t)·Ψ(SLG) for selected values of h according to equations 6-9 above, with Ψ(SLG) corresponding to the value of Ψ for SLG in Table II. The traces labeled GC represent the estimated range of maximum stresses versus thinness of SLG sheets achievable by gas convective tempering, from 0.02 cal/scm²° C. (or 840 W/m²K) to 0.03 cal/s·cm²·° C. or 1250 W/m²K, assuming that these levels of heat transfer coefficient can be employed in that process at a heated glass viscosity of $10^{8.2}$ Poises or about 704° C., a temperature above the capability of convective gas processes.

Examples of highest reported sheet CS values based on gas convective tempering processes are shown by the triangle markers labeled Gas in the legend. The value 601 represents advertised product performance capability of commercial equipment, while the value 602 is based on an oral report at a glass processing conference. The trace labeled LC represents the curve of maximum stresses versus thinness of SLG sheets estimated to be achievable by liquid contact tempering, given by a heat transfer rate h of 0.0625 cal/s·cm²·° C. (or about 2600 W/m²K), also assuming processing at an initial heated glass viscosity of $10^{8.2}$ Poises or about 704° C. Examples of highest reported sheet CS values based on liquid contact tempering processes are shown by the circle markers labeled Liquid in the legend. The higher of the two values at 2 mm thickness is based on a report of tempering of a borosilicate cover glass sheet, and the stress achieved has been scaled for the figure by ($Ψ_{SLG}$)/ ($Ψ_{borosilicate}$) for scaled direct comparison.

The trace labeled 704 represents stresses achievable by one or more embodiments of the presently disclosed methods and systems at a heat transfer rate of 0.20 cal/s·cm²·° C. (or about 8370 W/m²K) and an initial temperature, just before quenching, of 704° C. The level of stress on the cover glass sheet thus achievable represents almost the same scope of improvement over liquid tempering strength levels as liquid tempering represents over state of the art gas convective tempering. But the trace labeled 704 is not an upper limit—embodiments have been shown to be viable above this value due to the good control of form and flatness achievable in a small-gap gas bearing thermal strengthening at even higher temperatures (at lower viscosities of the cover glass). The trace labeled 730 shows some of the additional strengthening performance achieved by a heat transfer rate of 0.20 cal/s·cm²° C. (or about 8370 W/m²K) at a starting temperature for a SLG sheet of 730° C., very near or above the softening point of the cover glass. Significant improvements in compressive stress and thus in cover glass sheet strength are thus achieved particularly by the combination of high heat transfer rate and the use of high initial temperatures enabled by the good handling and control of sheet flatness and form in a tight gas bearing—and the improvements are particularly striking at thickness 2 mm and below.

Figure 15:
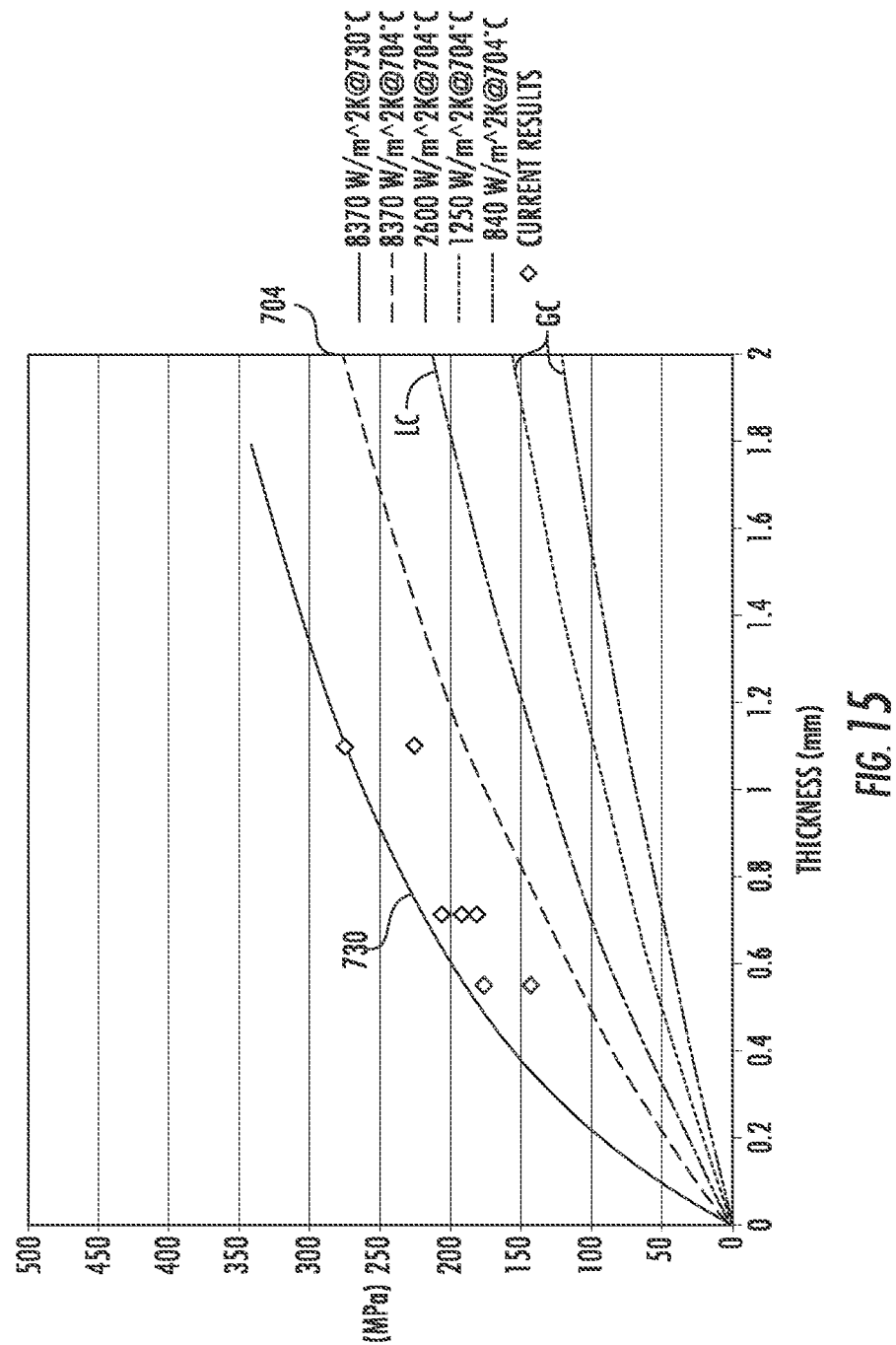
FIG. 15 is a graph showing compressive stress as a function of thickness plotted for selected exemplary embodiments of tempered glass sheets of the present disclosure.

FIG. 15 shows the traces of FIG. 14 explained above, at 2 mm and below, but with compressive stress as a function of thickness plotted for selected examples of tempered cover glass sheets produced by one or more embodiments of the present disclosure, showing the extreme combination of thermal strengthening levels and thinness enabled by the present disclosure.

Thermally Tempered Cover Glass Sheet with Low Surface Roughness and High Degree of Flatness In various embodiments, thermally strengthened cover glass sheets disclosed herein, such as sheet 500, have both high thermal stresses and low, as-formed surface roughness. The processes and methods disclosed herein can thermally strengthen a sheet of cover glass without increasing the surface roughness of the as-formed surfaces. For example, incoming float cover glass air-side surfaces and incoming fusion formed cover glass surfaces were characterized by atomic force microscopy (AFM) before and after processing. $R_a$ surface roughness was less than 1 nm (0.6-0.7 nm) for incoming 1.1 mm soda-lime float cover glass, and the $R_a$ surface roughness was not increased by thermal strengthening according to the present processes. Similarly, an $R_a$ surface roughness of less than 0.3 nm (0.2-0.3) for 1.1 mm sheets of fusion-formed cover glass was maintained by thermal strengthening according to this disclosure. Accordingly, thermally strengthened cover glass sheets have a surface roughness on at least a first surface in the range from 0.2 to 1.5 nm $R_a$ roughness, 0.2 to 2.0 nm $R_a$ roughness, 0.2 to 0.7 nm, 0.2 to 0.4 nm or even such as 0.2 to 0.3 nm, over at least an area of 10×10 μm. Surface roughness may be measured over an area of 10×10 μm in exemplary embodiments, or in some embodiments, 15×15 μm.

In some contemplated embodiments, thermally strengthened cover glass sheets disclosed herein have both high thermal stresses and low, as-formed surface roughness and/or coated surfaces. The processes and methods disclosed herein can thermally strengthen a sheet of cover glass without increasing the surface roughness of smooth as-formed or as-delivered surfaces of cover glass sheets, and likewise without damaging sensitive low-E or anti-reflective or other coatings. Incoming float cover glass air-side surfaces, and incoming fusion-formed cover glass surfaces, were characterized by atomic force microscopy (AFM) before and after processing. $R_a$ surface roughness was less than 1 nm (such as 0.6 to 0.7 nm) for incoming on the air side of 1.1 mm soda-lime float cover glass and was not increased by thermal strengthening according to the present disclosure. $R_a$ surface roughness was less than 0.3 nm (such as 0.2 to 0.3 nm) incoming on 1.1 mm sheets of fusion-formed cover glass and likewise was not increased by thermal strengthening according to this disclosure. Accordingly, in contemplated embodiments, thermally strengthened cover glass sheets, according to this disclosure, have surface roughness on at least a first surface in the range of at least 0.2 nm and/or no more than 1.5 nm $R_a$ roughness, such as no more than 0.7 nm, such as no more than 0.4 nm or even such as no more than 0.3 nm, or have thermally strengthened sheets having coatings thereon of the type that may be applied before strengthening, or have combinations of these low roughness values and coatings, are obtained from the present process used with corresponding cover glass sheets as starting material. It is Applicant's understanding that such preservation of surface quality and/or surface coating(s) previously required use of convective gas tempering or perhaps a low heat transfer liquid tempering process, which produces limited thermal strengthening effects relative to the total range available with the present processes and methods.

In another embodiment, the thermally strengthened cover glass sheets described herein have high flatness. In various embodiments, the strengthening system discussed herein utilizes controlled gas bearings to support the glass material during transporting and heating, and in some embodiments, can be used to assist in controlling and/or improving the flatness of the cover glass sheet, resulting in a higher degree of flatness than previously obtainable, particularly for thin and/or highly strengthened cover glass sheets. For example, sheets at least 0.6 mm can be strengthened with improved post-strengthening flatness. The flatness of thermally strengthened cover glass sheets embodied herein can comprise 100 μm or less total indicator run-out (TIR) along any 50 mm length along one of the first or second surfaces thereof, 300 μm TIR or less within a 50 mm length on one of the first or second surfaces, 200 μm TIR or less, 100 μm TIR or less, or 70 μm TIR or less within a 50 mm length on one of the first or second surfaces. In exemplary embodiments, flatness is measured along any 50 mm or less profile of the glass sheet. In contemplated embodiments, sheets with thickness disclosed herein have flatness 200 μm TIR or less within a 20 mm length on one of the first or second surfaces, such as flatness 100 μm TIR or less, flatness 70 μm TIR or less, flatness 50 μm TIR or less.

According to contemplated embodiments, the strengthened cover glass or glass-ceramic articles discussed herein (e.g., cover glass sheet 500 shown in FIG. 4) have a high-degree of dimensional consistency such that the thickness t thereof along a 1 cm lengthwise stretch of the body 522 does not change by more than 50 μm, such as, by not more than 10 μm, not more than 5 μm, not more than 2 μm. Such dimensional consistency may not be achievable for given thicknesses, areas, and/or magnitudes of negative tensile stress, as disclosed herein, by solid quenching due to practical considerations, such as cooling plate alignment and/or surface irregularities that may distort the dimensions.

According to contemplated embodiments, the strengthened cover glass or glass-ceramic articles discussed herein have at least one major surface (e.g., first and second surfaces 510, 520 of the strengthened cover glass or glass-ceramic sheet 500 in FIG. 4) that is flat such that a 1 cm lengthwise profile therealong stays within 50 μm of a straight line, such as within 20 μm, 10 μm, 5 μm, 2 μm; and/or a 1 cm widthwise profile therealong stays within 50 μm of a straight line, such as within 20 μm, 10 μm, 5 μm, 2 μm. Such high flatness may not be achievable for given thicknesses, areas, and/or magnitudes of negative tensile stress, as disclosed herein, by liquid quenching due to practical considerations, such as warping or bending of the cover glass strengthened in these processes due to convective currents and associated forces of the liquid.

Thermally Strengthened Cover Glass Sheet CTE

Another aspect comprises thermally strengthened low coefficient of thermal expansion (CTE) cover glass sheets. As discussed above (see e.g., equations 7 and 10), thermal strengthening effects are significantly dependent upon the CTE of the glass of which the cover glass sheet is comprised. However, thermal strengthening of low CTE glasses may provide strengthened glass compositions having advantageous properties, such as increased chemical resistance, or better compatibility with electronic devices due to low alkali content. Cover glass sheets having CTEs of 65, 60, 55, 50, 45, 40, and even $35 \times 10^{-6\circ}$ $C.^{-1}$ and below are capable of safety-glass like break patterns ("dicing") at thicknesses of less than 4 mm, less than 3.5 mm, less than 3 mm, and even at 2 mm or less. Cover glasses having CTE values of $40 \times 10^{-6\circ}$ $C.^{-1}$ and below can be strengthened using the processes described herein. Such low CTE glasses strengthened by the systems and methods discussed herein can have similar surface compressions to SLG sheets strengthened by convention commercial (gas convective) processes at the same thickness. In some embodiments, the compressive stress of low CTE glasses can comprise at least 50 MPa, at least 100 MPa, at least 125 MPa, at least 150 MPa, at least 200 MPa, at least 250 MPa, at least 300 MPa, or at least 400 MPa for cover glass sheets having a thickness of no more than 1 cm, no more than 5 mm, no more than 3 mm, no more than 2 mm, no more than 1.5 mm, no more than 1 mm, no more than 0.75 mm, no more than 0.5 mm, no more than 0.3 mm, no more than 0.2 mm, or no more than 0.1 mm.

Cover glass sheets formed according to the present disclosure have a multitude of applications in consumer electronic devices, for example in electronic devices, mobile phones, portable media players, televisions, notebook computers, watches, household appliances, tablet computer displays and in laminates, such as glass-interlayer-glass laminates used in various consumer electronic devices. Stronger and thinner laminates can be produced, resulting in weight and cost savings and fuel efficiency increases. Desirably, a thermally strengthened thin sheet may be cold bent and laminated to a formed thicker glass, providing an easy and reliable manufacturing process not requiring any hot forming of the thin sheet.

Alpha of Thermally Tempered Cover Glass Sheet

Table IV below shows results obtained by the methods of the present disclosure (indicated as "Source of Method" I in the table), and a figure of merit, Alpha, that is a rough measure of the coefficient of heat exchange obtained within the tempering process. Alpha is given by:

$$\text{Alpha} = \frac{CS}{(t \cdot CTE \cdot E)} \quad (13)$$

where CS is physical compressive stress (in MPa), t is thickness in millimeters, CTE is the coefficient of thermal expansion in ° $C.^{-1}$, and E is the elasticity of the glass in (MPa), and yields units in ° C./mm.

TABLE IV

| Sample No. | Source of Method | Glass | Thickness (mm) | CS (MPa) | CTE (1/C) | E (MPa)** | Alpha (C/mm) |
|---|---|---|---|---|---|---|---|
| 1 | I | SLG | 1.84 | 150 | 9.20E−06 | 68900 | 129 |
| 2 | I | SLG | 1.84 | 172 | 9.20E−06 | 68900 | 147 |
| 3 | I | SLG | 1.07 | 190 | 9.20E−06 | 68900 | 230 |

Samples 1 and 3 are repeatable values obtained from the disclosed processes, sample 1 using air and sample 3 using helium as the gas in the process. Sample 2 represents a "champion" value using air within the present process, that is, not reliably repeatable to date. Cover glass samples processed by the processes of the present disclosure (samples 1-3) all exceeded an Alpha at 117° C./mm. Applicant believes that the slope of Alpha with thickness may have an inherent trend lower with lower glass thickness. Glass disclosed herein has an Alpha of greater than 20t+77, where t is thickness of the cover glass, in mm, in some embodiments.

Thermal Strengthening System and Process

In various embodiments, a process for strengthening a cover glass sheet comprises supporting or guiding at least a portion of a cover glass sheet, such as cover glass sheet 500, into a cool or quenching zone in which the sheet is rapidly cooled creating a strengthened cover glass sheet having one or more of the properties discussed herein. In various embodiments, the cover glass sheet is supported at least in part by a flow or a pressure of a gas delivered to a gap between the surfaces of the cover glass sheet and one or more heat sinks. In general, the temperature of the glass sheet is above the transition temperature of the glass when the sheet is moved into the cool zone, and in various embodiments, the cover glass sheet is cooled within the cooling zone by thermal conduction more than by convection. Conduction is a process of heat transfer where energy is transmitted through interactions between adjacent molecules, and convection is a process of heat transfer where energy is communicated via motion of a fluid (e.g., air, helium, etc.), such as where heated fluid moves away from a heat source and is replaced by cooler fluid. Thus, the present system is markedly different from conventional convection-based glass strengthening/tempering systems in which the primary mode of heat transfer during cooling of the glass sheet is convective.

In some embodiments, an overall process for strengthening a cover glass sheet comprises heating a cover glass sheet in a hot zone and then cooling the cover glass sheet in a cooling zone. The cover glass sheet has a transition temperature, which is the temperature at which the viscosity of the cover glass has a value of $\eta=10^{12}$-$10^{13.3}$ Poise. The cover glass is heated sufficiently to bring the cover glass sheet above the transition temperature, and then moved into a cooling zone. Optionally, the cover glass can be transitioned from the hot zone to a cool zone through a transition zone. In the cooling zone, the surfaces of the cover glass sheet are positioned adjacent to heat sinks, one on either side of the cover glass sheet, each with a gap in between one of the cover glass surfaces and an opposing surface of the heat sink. Gas is delivered into the gaps through multiple apertures in the heat sinks, and in some embodiments, this delivered gas forms an air bearing which supports the cover glass between the heat sinks such that the cover glass surfaces are not in contact with the heat sinks. Within the cooling zone, the cover glass sheet is cooled by conduction more than by convection and is cooled sufficiently to fix or create a thermally induced surface compression and a thermally induced central tension of the sheet which provides the increased strength as discussed herein. In various embodiments, primarily cooling via conduction is achieved by having a very low gap size within the cooling zone such that the cover glass sheet is close to, but not touching, the opposing surfaces of the heat sinks.

An apparatus for enabling the processes described can include a heating zone for heating a cover glass sheet to a temperature above the transition temperature and a cooling zone for cooling the heated cover glass sheet to provide a strengthened cover glass sheet. The apparatus can include an optional transition zone between the heating zone and the cooling zone. The cooling zone may include a heat sink having a pair of opposing surfaces defining a gap, within which the heated cover glass sheet is received. The cooling zone can comprise a pair of gas bearings disposed on opposite sides of that gap that acts to support the cover glass sheet within the gap. The gap can be configured to cool the heated cover glass sheet by conduction more than by convection. In some embodiments, the gas bearings can include a plurality of apertures for delivering the gas to the gap, and the gas bearing surfaces act as the heat sinks, capable of conducting heat away from the heated cover glass sheet by conduction more than by convection.

Strengthening processes and equipment disclosed herein (see generally FIGS. 21-25) allow for strengthening of cover glass or glass-ceramic articles (see generally FIGS. 4-7 and 27-30) by an inventive form of thermal tempering. The processes allow for steep, tensile stress versus thickness/depth curves (see generally FIG. 6), particularly steep in slope near the surface of the cover glass or glass-ceramic articles, which enable strengthening of the cover glass or glass ceramic articles to particularly high levels of negative tensile stress for a given thickness near the surface of the respective articles, without requiring strengthening by ion-exchange or laminating different glasses. However, in some embodiments, the thermal tempering processes disclosed herein may be augmented with ion-exchange or applied to glass-to-glass laminations. The thermal tempering processes disclosed herein enable particularly high levels of strengthening in large-area articles (e.g., sheets) that may be too large for strengthening via conventional thermal tempering methods, such as due to alignment limitations of contact quench equipment, cooling rate limitations of conventional convection systems, and/or warping damage associated with liquid quench tempering. The processes disclosed herein uniquely allow high levels of strengthening in particularly thin sheets that may be too thin for strengthening via conventional tempering methods, such as due sensitivity to breakage or fracture of the thin cover glass or glass ceramic articles during the strengthening process and associated contact forces with solid or liquid quenching and/or due to the cooling rate limitations of conventional convection tempering. However, in other contemplated embodiments, cover glass or glass ceramic articles as disclosed herein may be manufactured with at least some solid or liquid quenching, such as in combination with the unique strengthening processes disclosed herein.

Figure 16:
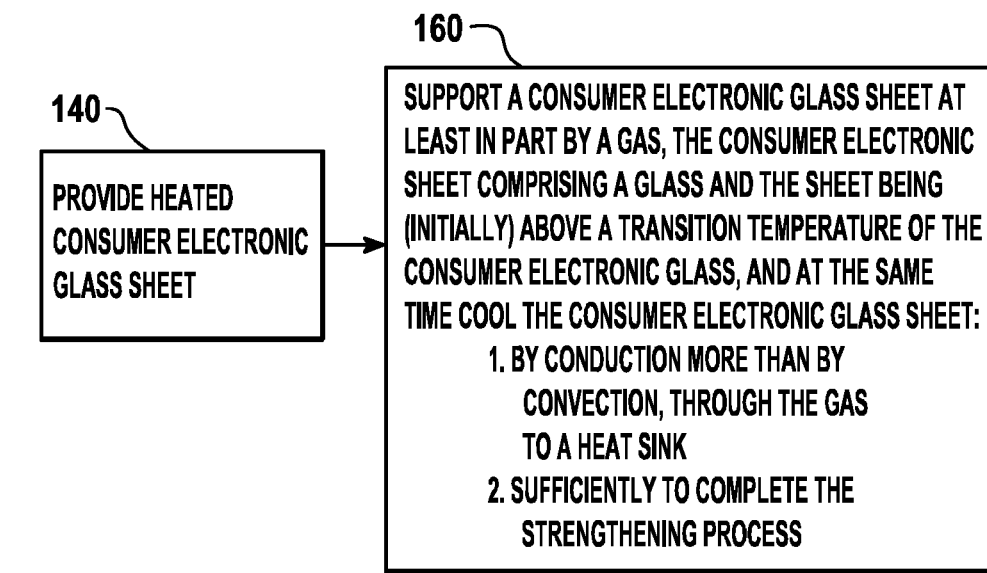
FIG. 16 is a flow chart illustrating some aspects of a method according to the present disclosure.

One embodiment of a method according to this disclosure is illustrated in the flow chart of FIG. 16. The method or process 100 includes a step 140 of providing a cover glass sheet that is at a temperature above a transition temperature of the glass sheet. The method or process 100 also includes the step 160 of supporting a cover glass sheet at least in part by a gas (through gas flow and pressure). Step 160 includes, while the cover glass sheet is support by the gas, cooling the sheet: 1) by conduction more than by convection through the gas to a heat sink, and 2) sufficiently to create or fix a thermally-induced surface compression stress and a thermally-induced central tension stress, of the sheet when at ambient temperature.

Figure 17:
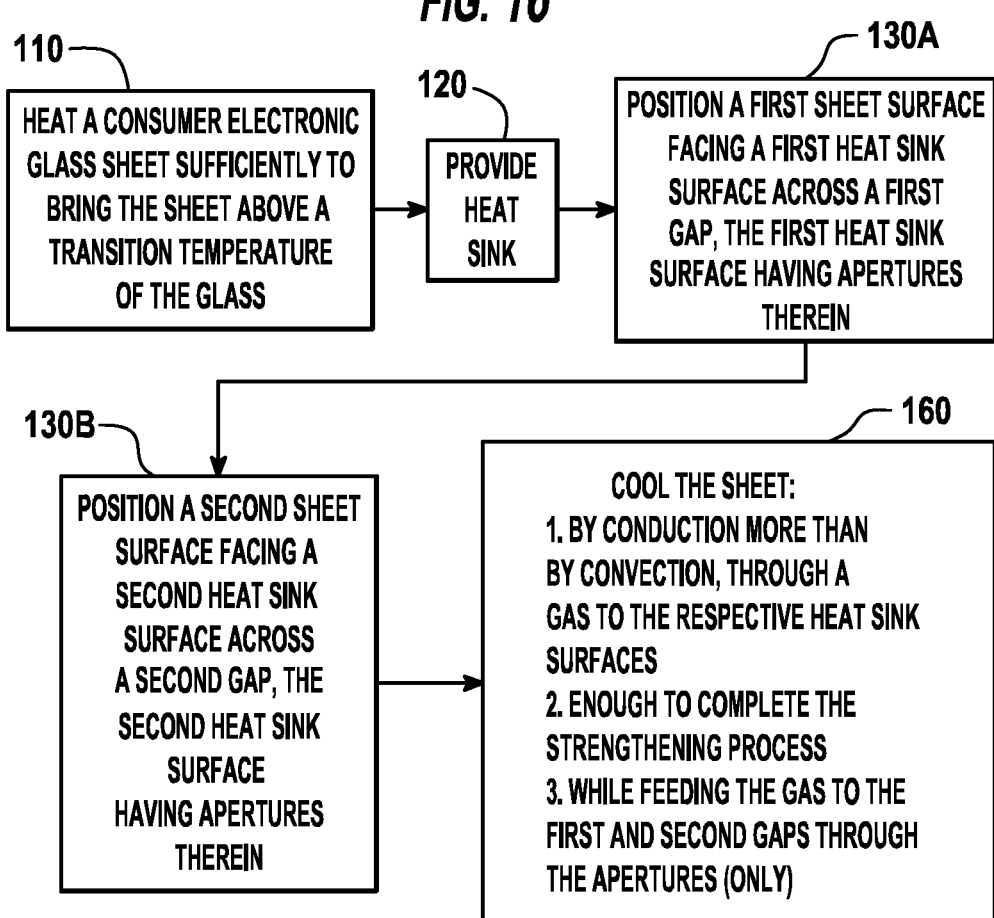
FIG. 17 is a flow chart illustrating some aspects of another method according to the present disclosure.

According to a variation on the embodiment of FIG. 16, depicted as method 100' in the flow chart of FIG. 17, the method can include the step 110 of heating a cover glass sheet sufficiently such that the sheet is above a transition temperature of the glass. As part of, or as preparation for, the cooling step 160, the method 100' further comprises, in step 120, providing a heat sink (whether as a single piece or in separate pieces) having first and second heat sink surfaces (see generally FIGS. 21-25), each having apertures therein. In step 130A the method further includes positioning a first sheet surface facing a first heat sink surface across a first gap and, in step 130B, positioning the second sheet surface facing a second heat sink surface across a second gap. The heat sink surfaces can include apertures and/or can be porous. The method 100' can further include, in step 160, cooling the sheet, by conduction more than by convection through a gas to the respective heat sink surfaces, sufficiently to strengthen the cover glass (e.g., to sufficiently create or fix in the sheet a thermally-induced surface compression stress and a thermally-induced central tension stress). The step 160 also can include delivering the gas to the first and second gaps through the apertures or porous heat sink, and in some such embodiments, the gas is delivered to form air bearings that support the cover glass sheet adjacent the heat sinks. In some embodiments, the gas is delivered only through the apertures of the heat sink or only through the pores or pores and apertures of the porous heat sink.

These and other related methods of this disclosure go against the currently dominant technique of gas-convection-cooling by using conduction as the dominant mode of cooling, instead of convection. Instead of a solid-to-gas (glass to air) heat exchange, methods described herein use a solid-to-solid (glass to heat sink) heat exchange, mediated across a small gap by a small amount of gas (e.g., without physical contact between glass surfaces and heat sink), both to begin and to complete the cooling that produces thermal strengthening. Although some convection is present as gas (e.g., air bearing gas) flows into the small gap, conduction directly across the gap through the gas and into the heat sink is the principal mode of cooling. Applicant has determined that dominance of conductive heat transfer increases the rate of heat transfer relative to convection dominant cooling processes.

Because solid-to-solid conduction (even across the gap) allows for more rapid heat flow than convection, the cooling rate increases needed for thinner cover glass sheets are not tied to gas velocity and volume. According to various embodiments, without the constraints typically imposed by gas flow and gap size in a convective system, gas flow and gap size can be selected, controlled or optimized for other purposes, such as for controlling stiffness of the gas cushion in the gap, for supporting the sheet, for flattening or otherwise shaping a sheet, for optimizing heat conduction, for maintaining sheet flatness and/or shape during thermal strengthening, and/or for balancing ease of sheet handling with high cooling rates. For example, in some embodiments, because cooling is not via convection, helium becomes an economically viable alternative to air in the system of the present disclosure due to the very low gas flow rates that support the gas bearing, and in such embodiments, helium offers thermal conductivity about five times that of air. Even helium with prices assumed at multiples of those available today becomes an economically viable alternative at the low flow rates of the system of the present disclosure.

Further, because the system of the present disclosure decreases the volume of air flowing over a cover glass sheet during cooling (relative to convective systems), the systems and methods discussed herein decrease the potential risk of deformation of hot thin sheets of cover glass typically caused by the high speed, high volume air flows needed in conventional convection based tempering systems. This also allows softer, higher temperature cover glass sheets to be handled with no or minimal distortion, further improving the achievable degree of strengthening. Eliminating high air flow rates also eases problems sometimes seen in transporting the sheet into the quenching chamber (moving against the high air flow) and in keeping the high-flow, cooler air from entering into and cooling the adjacent parts of the furnace used to heat the sheet.

Further the use of conduction, through a gas, may mitigate contact damage, warping, shaping, etc. associated with conventional liquid contact or solid contact quench tempering. Use of a gas as an intermediate conductor preserves the surface quality of the processed articles by avoiding solidto-solid contact. Mediating the high conduction rates through a gas also avoids liquid contact. Some types of liquid quenching can introduce unwanted distortions, spatial variation in tempering and contamination of the cover glass surfaces. These embodiments essentially provide non-contact (except by a gas) but very high-rate cooling. In other embodiments, as discussed above, solid- or liquid-contact may be included.

Power Consumption of Thermal Tempering System/Process

Figure 18:
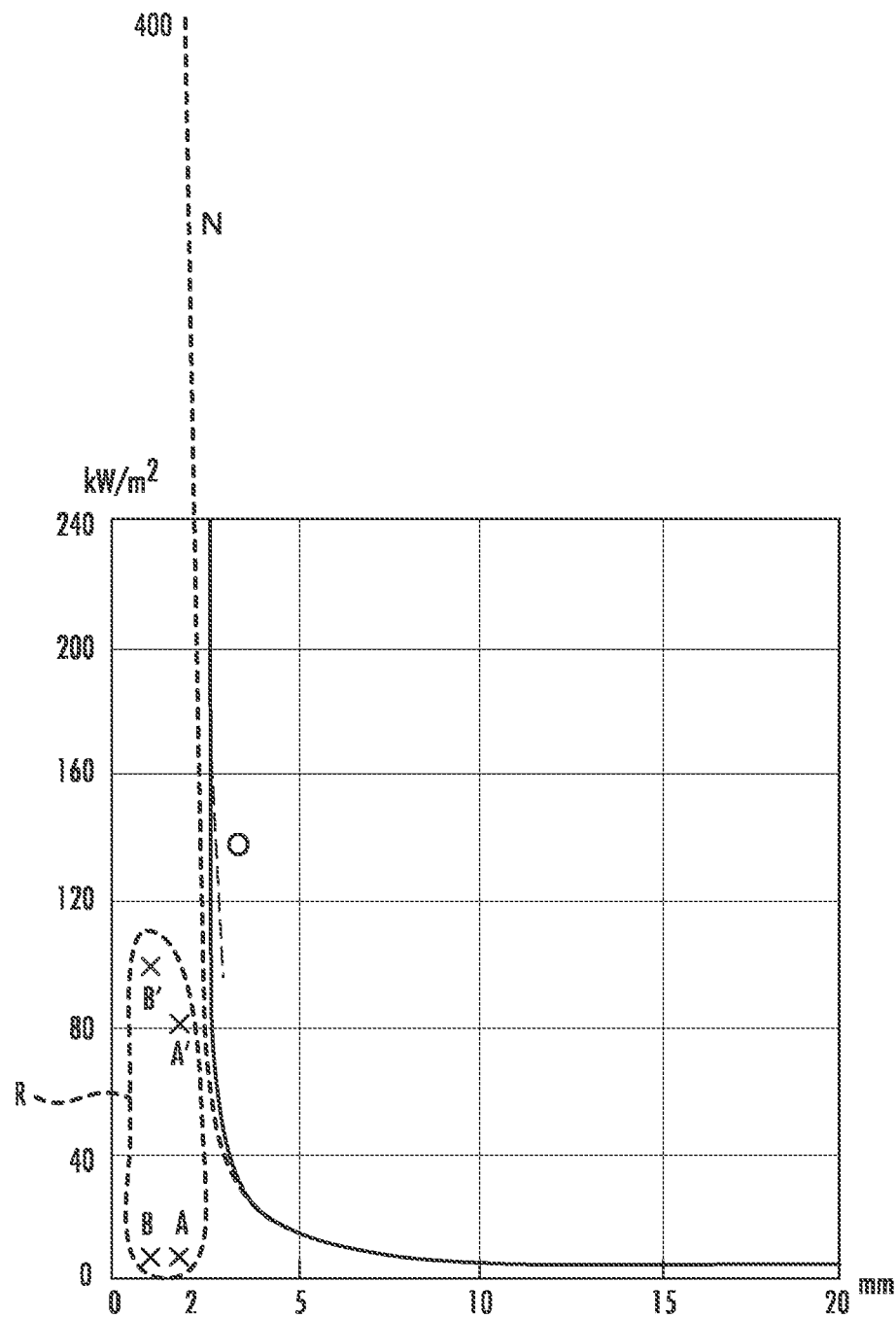
FIG. 18 is the graph of FIG. 3 with a region R and points A, B, A' and B' marked thereon to show a region in which the methods and systems of the present disclosure allow operation, in contrast to the prior art.
Figure 19:
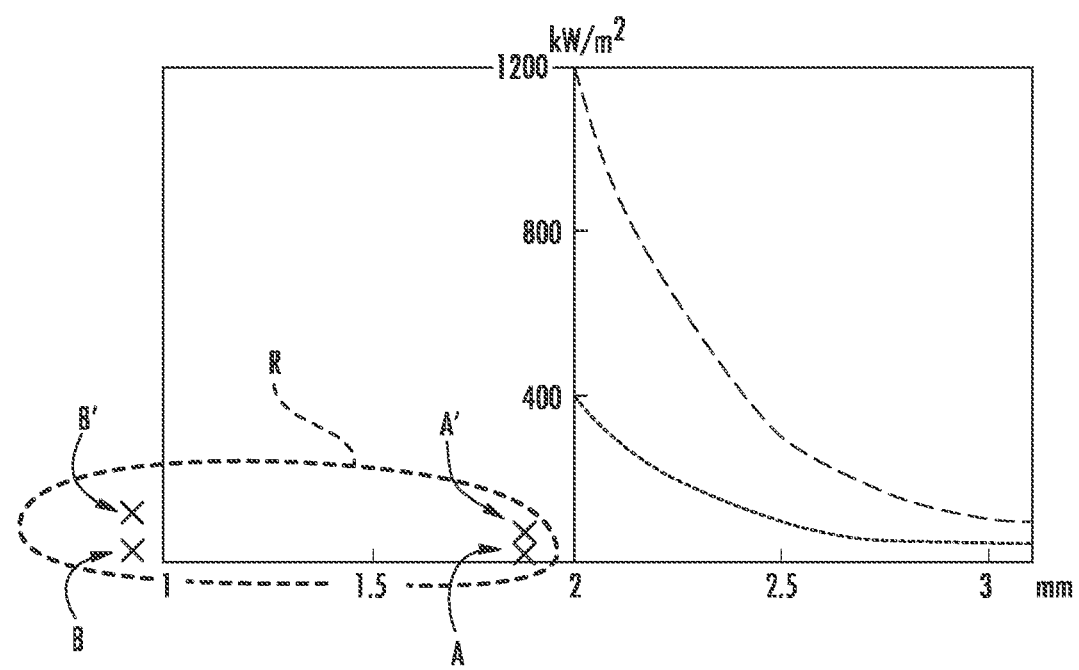
FIG. 19 is another representation of the region R and points A, B, A' and B' of FIG. 18, but shown adjacent to (and positioned relative to the scale) of a reduced size copy of FIG. 2.

Another advantage of avoiding high air flow rates lies in the power and energy savings achieved by using solid-gas-solid conduction as the primary cover glass cooling mechanism. Points A and B of FIG. 18 and FIG. 19 represent a high-end estimate of peak power use of the air bearing, per square meter of cover glass sheet, by a compressed air supply at relatively high flow. Practical low-end peak power use of compressed air could be as little as 1/16 of the values shown. Points A and B do not include active cooling of the heat sink, however, which can be included in some embodiments, especially where a machine is in continuous, quasi-continuous or high frequency operation.

Referring again to FIG. 18 and FIG. 19, points A' and B' represent the conservatively estimated peak power levels for operation of the air bearing at points A and B when active cooling of the heat sink surfaces is factored in, assuming the thermal load equivalent of a 300° C. drop in cover glass sheet temperature is accomplished by an active cooling system having a thermal-to-mechanical (or electrical) efficiency ratio of 7.5 to 1, within a time limit of 2.1 seconds for point A' and within 1 second for point B'. (These points correspond approximately to cover glass sheets actually tempered in the apparatus described herein.)

Although the four points within region R of FIG. 18 and FIG. 19 illustrate the significance of the improvement obtainable by the methods and systems of the present disclosure (at least to some degree), it should be noted that the full benefits are likely significantly understated in the figures because power demand is the quantity represented. For example, peak power of air blowers, as represented by the curve N, is not efficiently turned on and off, typically requiring gated airways to block off large fans, which still rotate (but at reduced load), when air is not needed. Peak power demands of fluid cooling systems such as chilled water plants, represented by the points A' and B' as examples easily achievable according to the present disclosure, can generally be much more efficiently accommodated, and effective peak power would be significantly lower, approaching A' and B' only as fully continuous operation is approached. Thus, the difference in total energy demands would tend to be greater than the difference for peak power demand, which is represented in the figure. In some embodiments, the processes described herein have peak powers of less than 120 KW/m², less than 100 KW/m², less than 80 KW/m² to thermally strengthen a cover glass sheet of 2 mm thickness or less.

Heat Transfer from Thin Cover Glass Sheet During Thermal Tempering

In general, heat transfer from the thin cover glass sheet in the system and process of the present disclosure includes a conduction component, a convection component and a radiant component. As noted above and explained in detail herein, the thermal tempering system of the present disclosure provides for thin cover glass tempering by utilizing conductive heat transfer as the primary mechanism for quenching the thin cover glass sheets.

The following is Applicant's understanding of the underlying theory. It may well occur to one of ordinary skill in the art of glass tempering, in which conduction effects are normally so small as to be commonly ignored in favor of analysis of convection and radiation alone, to ask whether sufficiently high cooling rates for thin cover glass sheets (such as at 2 millimeters and below) are actually achievable by conduction through a gas such as air—and if so, whether such rates are achievable at practical gap sizes.

The amount of thermal conduction at conditions embodied in processes using systems described herein can be determined via the following. First, in the context of thermal strengthening by conduction as in the present disclosure, the thermal conductivity of the gas within the gap must be evaluated in the direction of conduction, which is along a thermal slope. Air at high temperature, at or near the surface of the sheet being cooled, has significantly higher thermal conductivity than air at a lower temperature, such as air at or near room temperature at or near the surface of the heat sink (the nominal thermal conductivity of (dry) room temperature air (25° C.) is approximately 0.026 W/m·K). An approximation that assumes air over the whole gap to be at the average temperature of the two facing surfaces at the start of cooling is used. At the start of cooling, a cover glass sheet may be at a temperature of 670° C., for example, while the heat sink surface may start at 30° C., for example. Accordingly, the average temperature of the air in the gap would be 350° C., at which dry air has a thermal conductivity of about 0.047 W/m·K; more than 75% higher than its thermal conductivity at room temperature and sufficiently high to conduct large amounts of heat energy through gaps of the sizes within the system of the present disclosure, as discussed below, assuming the sheet is finished to a reasonably high degree of surface and thickness consistency.

To illustrate, $Q_{cond}$, the conductive component of the rate of heat transfer through a gap of distance g which gap has an area $A_g$ (in a direction everywhere perpendicular to the direction of the gap distance g) may be given by:

$$Q_{cond} = \frac{A_g k (T_S - T_{HS})}{g} \quad (14)$$

where k is the thermal conductivity of the material (gas) in the gap evaluated in the direction of (or opposite of) heat conduction, $T_S$ is the temperature of the cover glass surface and $T_{HS}$ is the temperature of the heat sink surface (or the heat source surface, for other embodiments). As mentioned above, to evaluate k rigorously would require integrating the thermal conductivity of the gas along (or against) the direction of conductive heat flow, as the thermal conductivity of the gas varies with temperature—but as a good approximation, k may be taken as the value of k for the gas in the gap when at the average of the temperatures of the two surfaces, $T_S$ and $T_{HS}$.

Reframing equation (14) in units of heat transfer coefficient (units of heat flow power per meter squared per degree Kelvin) gives:

$$\frac{Q_{cond}}{A_g (T_S - T_{HS})} = \frac{k}{g} \quad (15)$$

so the effective heat transfer coefficient for conduction across the gap is the thermal conductivity of the medium in the gap (air in this case) (in units of W/mK) divided by the length of the gap (in meters), giving a value of Watts per meter squared per degree of temperature difference. Table V shows the heat transfer coefficients (k/g), due to conduction alone, for air and helium filled gaps of gap sizes from 10 µm up to 200 µm in steps of 10 µm each.

TABLE V

| Air conductivity (W/m/K) 0.047 | | | Helium conductivity (W/m/K) 0.253 | | |
|---|---|---|---|---|---|
| | heat trans coeff. | | | heat trans coeff. | |
| Gap (m) | W/m²/K | cal/s/cm² | Gap (m) | W/m²/K | cal/s/cm² |
| 0.00001 | 4700 | 0.11226 | 0.00001 | 25300 | 0.604291 |
| 0.00002 | 2350 | 0.05613 | 0.00002 | 12650 | 0.302145 |
| 0.00003 | 1566.67 | 0.03742 | 0.00003 | 8433.33 | 0.20143 |
| 0.00004 | 1175 | 0.028065 | 0.00004 | 6325 | 0.151073 |
| 0.00005 | 940 | 0.022452 | 0.00005 | 5060 | 0.120858 |
| 0.00006 | 783.333 | 0.01871 | 0.00006 | 4216.67 | 0.100715 |
| 0.00007 | 671.429 | 0.016037 | 0.00007 | 3614.29 | 0.086327 |
| 0.00008 | 587.5 | 0.014032 | 0.00008 | 3162.5 | 0.075536 |
| 0.00009 | 522.222 | 0.012473 | 0.00009 | 2811.11 | 0.067143 |
| 0.0001 | 470 | 0.011226 | 0.0001 | 2530 | 0.060429 |
| 0.00011 | 427.273 | 0.010205 | 0.00011 | 2300 | 0.054936 |
| 0.00012 | 391.667 | 0.009355 | 0.00012 | 2108.33 | 0.050358 |
| 0.00013 | 361.538 | 0.008635 | 0.00013 | 1946.15 | 0.046484 |
| 0.00014 | 335.714 | 0.008019 | 0.00014 | 1807.14 | 0.043164 |
| 0.00015 | 313.333 | 0.007484 | 0.00015 | 1686.67 | 0.040286 |
| 0.00016 | 293.75 | 0.007016 | 0.00016 | 1581.25 | 0.037768 |
| 0.00017 | 276.471 | 0.006604 | 0.00017 | 1488.24 | 0.035547 |
| 0.00018 | 261.111 | 0.006237 | 0.00018 | 1405.56 | 0.033572 |
| 0.00019 | 247.368 | 0.005908 | 0.00019 | 1331.58 | 0.031805 |
| 0.0002 | 235 | 0.005613 | 0.0002 | 1265 | 0.030215 |

Figure 20:
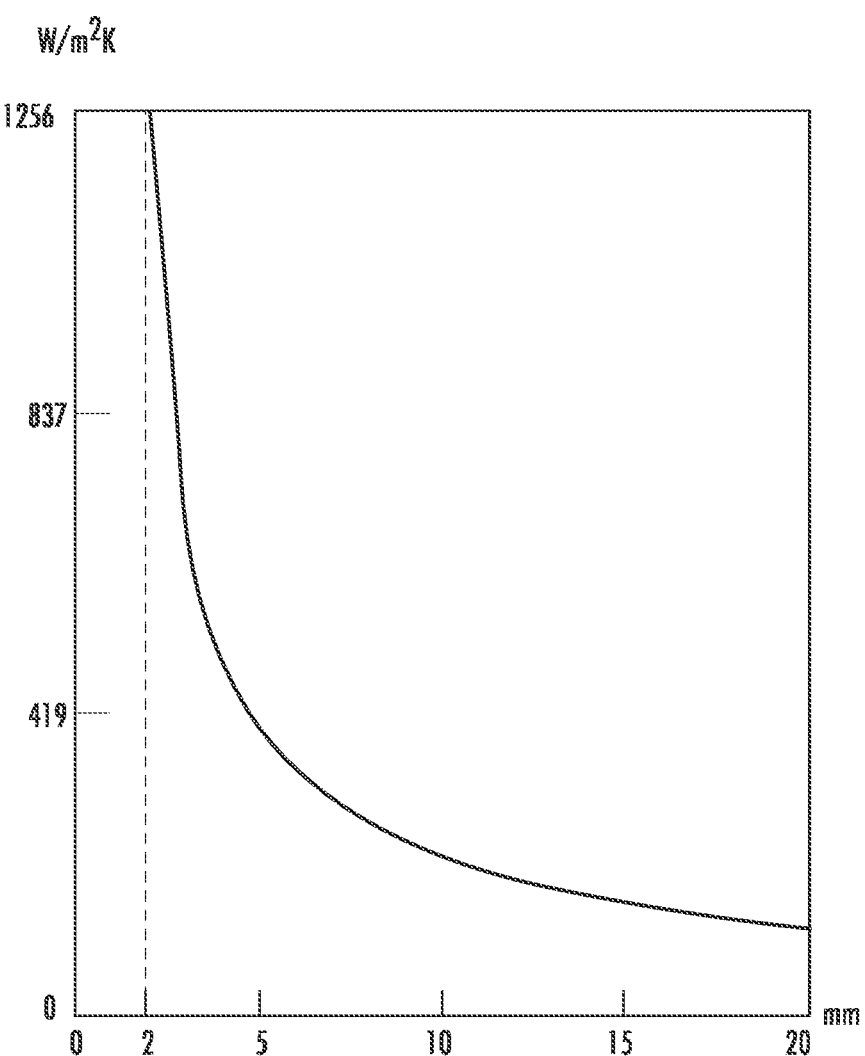
FIG. 20 (Prior Art) is a graph of the required heat transfer coefficient needed for tempering as a function of glass thickness.

FIG. 20 (Prior Art) shows an industry-standard curve from about 35 years ago (with reference line at 2 mm added) showing the heat transfer coefficient required to fully temper a sheet of glass, as a function of thickness in mm, under certain assumed conditions. As may be seen from a comparison of Table V with FIG. 20, an air-filled gap of approximately 40 µm can allow full tempering of 2 mm thick cover glass by conduction. While slightly less than 40 micrometers is a rather small gap, planar porous air bearings in conveyor applications may generally be reliably run with gaps of as low as 20 micrometers. Thus 37 micrometers is achievable for an air gap fed by pores in the heat sink surface. Using helium (or hydrogen, with similar thermal conductivity) as the gas, a gap of about 200 µm can be used to fully temper 2 mm thick cover glass. Using helium or hydrogen as the gas allows for a gap size about 5 times larger for the same heat transfer coefficient. In other words, using helium or hydrogen as the gas in the gap increases the heat transfer coefficient available for quenching by about 5 times at the same gap size. So even with air the spacing is not impractical, and with high conductivity gases, the gap spacing is relatively easy to achieve, even for sheet thicknesses smaller than 2 millimeters.

In addition to cooling through a gas by conduction more than by convection, another embodiment includes heating (or heating and/or cooling) through a gas by conduction more than by convection. Regarding the relative contributions of conduction and convection, whether for heating or cooling, the convective $Q_{conv}$, component of the rate of heat transfer across the gap (or gaps) may be given by:

$$Q_{conv} = e\dot{m}C_p\left(\frac{T_S + T_{HS}}{2} - T_i\right) \quad (16)$$

where $\dot{m}$ is the mass flow rate of the gas, Cp is the specific heat capacity of the gas, $T_i$ is the inlet temperature of the gas as it flows into the gap, and e is the effectiveness of the heat exchange between the gas flowing in the gap, the sheet surface and the surface of the heat sink/source (the "walls" of the gap). The value of e varies from 0 (representing zero surface-to-gas heat exchange) to 1 (representing the gas fully reaching the temperature of the surfaces). The value of e can be computed by those skilled in the art of heat transfer using, for example, the e-NTU method.

Typically, however, if the gap between the surface of the sheet and the surface of the heat sink/source is small, the value of e will be very nearly equal to 1, meaning the gas heats nearly completely—to equal, on average, the average of the temperatures of the two surfaces on either side— before it leaves the gap. Assuming e=1 (a slight overestimate of the rate of convective heat transfer), and the gas being supplied to the gap through the surface of the heat sink/source, it can be assumed that the initial temperature of the gas in the gap is the same as the temperature of the surface of the heat sink/source ($T_i=T_{HS}$). The rate of heat transfer due to convection may then be simplified to:

$$Q_{conv} = \dot{m}C_p\left(\frac{T_S - T_{HS}}{2}\right) \quad (17)$$

At the temperatures typically useful for heat strengthening or heat treating of glass and similar materials, radiative heat transfer out of the sheet under treatment is relatively small. To cool (or heat, assuming the amount of radiation from the heat source when heating is not too high) the sheet (e.g., sheet 200 shown in FIG. 21) principally by conduction, in the area of the gap (e.g., gaps 204a, 204b shown in FIG. 21), thus requires only that:

$$Q_{cond} > Q_{conv} \quad (18)$$

Combining (18) with equations (14) and (17) gives the following conditional:

$$\frac{k}{g} > \frac{\dot{m}C_p}{2A_g} \quad (19)$$

which, when held, will essentially ensure that the sheet, in the area of the gap at issue, is cooled (or heated) principally by conduction. Accordingly, the mass flow rate $\dot{m}$ of the gas should be less than 2 $kA_g/gC_p$, or 2 $k/gC_p$ per square meter of gap area. In an embodiment, $\dot{m}<B\cdot(2\ kA_g/gC_p)$, where B is the ratio of convective cooling to conductive cooling. As used herein, B is a positive constant less than one and greater than zero, specifically having a value of ⅔ or less, or even ⅕ or 9/10 or less. Generally, m should be kept as low as possible, consistent with the needs of using the gas flow to control the position of the cover glass sheet (e.g., sheet 200 shown in FIG. 21 relative to the heat sink surface(s)) (e.g., heat sink surfaces 201b, 202b, shown in FIG. 21) or the position of the heat exchange surfaces themselves. The ratio of convective cooling to conductive cooling can be any value from less than one to $1\times10^{-8}$. In some embodiments, B is less than 0.9, 0.8, 0.7, 0.6, 0.5, 0.4, 0.1, $5\times10^{-2}$, $1\times10^{-2}$, $5\times10^{-3}$, $1\times10^{-3}$, $5\times10^{-4}$, $1\times10^{-4}$, $5\times10^{-5}$, $1\times10^{-5}$, $5\times10^{-6}$, $1\times10^{-6}$, $5\times10^{-7}$, $1\times10^{-7}$, $5\times10^{-8}$, or $1\times10^{-8}$. In some embodiments, m is minimized, consistent with the needs of using the gas flow to support and control the sheet position relative to the heat sink surface(s). In other embodiments, m should be selected to control the position of the heat exchange surfaces themselves, relative to the sheet.

In various embodiments, the mass flow rate m of the gas within the conductive-based cooling system of the present disclosure is substantially lower as compared to the conventional convection-based tempering systems. This substantially lower gas flow rate allows the conductive system to be operated at substantially reduced power usage, as discussed herein. Further, in at least some embodiments, the reduced gas flow rate also results in a substantially quieter cooling system as compared to a conventional convective cooling system. In such embodiments, the decrease in noise may increase operator safety by reducing the potential for hearing damage and even reducing or eliminating the need for operators to use hearing protection.

As will be understood, in embodiments in which a sheet of cover glass material is supported on air bearings between opposing heat sink surfaces, conductive heat transfer will occur from both sides of the cover glass sheet to both heat sink surfaces Thus, in such embodiments, the cover glass sheet has first and second sheet surfaces, and cooling of the cover glass sheet is performed by positioning the first sheet surface (e.g., a lower surface of the cover glass sheet) adjacent to a first heat sink surface (e.g., a surface of a lower heat sink) such that a first gap is located between the first sheet surface and the first heat sink surface and by positioning the second sheet surface (e.g., an upper surface of the cover glass sheet) adjacent to a second heat sink surface (e.g., a surface of an upper heat sink) such that a second gap is located between the second sheet surface and the second heat sink surface. In such embodiments, thermal conduction from the first sheet surface to the first heat sink surface and from the second sheet surface to the second heat sink surface is permitted to occur. In such embodiments, the first gap has a length across the first gap of $g_1$ and an area of the first gap of $A_{g1}$, and the second gap has a length across the second gap of $g_2$ and an area of the second gap of $A_{g2}$. In such embodiments, a first flow of a first gas to the first gap is provided, and a second flow of a second gas to the second gap is provided. As will be understood, similar to the discussion above, the first gas has a heat capacity $C_{p1}$ and a thermal conductivity $k_1$, and the first flow is provided at a mass flow rate $\dot{m}_1$. In such embodiments, $\dot{m}_1$ is greater than zero and less than $(2 k_1 A_{g1})/(g_1 C_{p1})$. Further, the second gas has a heat capacity $C_{p2}$ and a thermal conductivity $k_2$, and the second flow is provided at a mass flow rate $\dot{m}_2$. In such embodiments, $\dot{m}_2$ is greater than zero and less than $(2 k_2 A_{g2})/(g_2 C_{p2})$. In such embodiments, the first and second flows contact the cover glass sheet such that the cover glass sheet is supported without touching the heat sink surfaces. In this manner, the sheet is cooled by conduction more than by convection in a manner to create a surface compressive stress and a central tension of the sheet.

Cover Glass Strengthening System Including High
Conduction Cooling Zone

Figure 21:
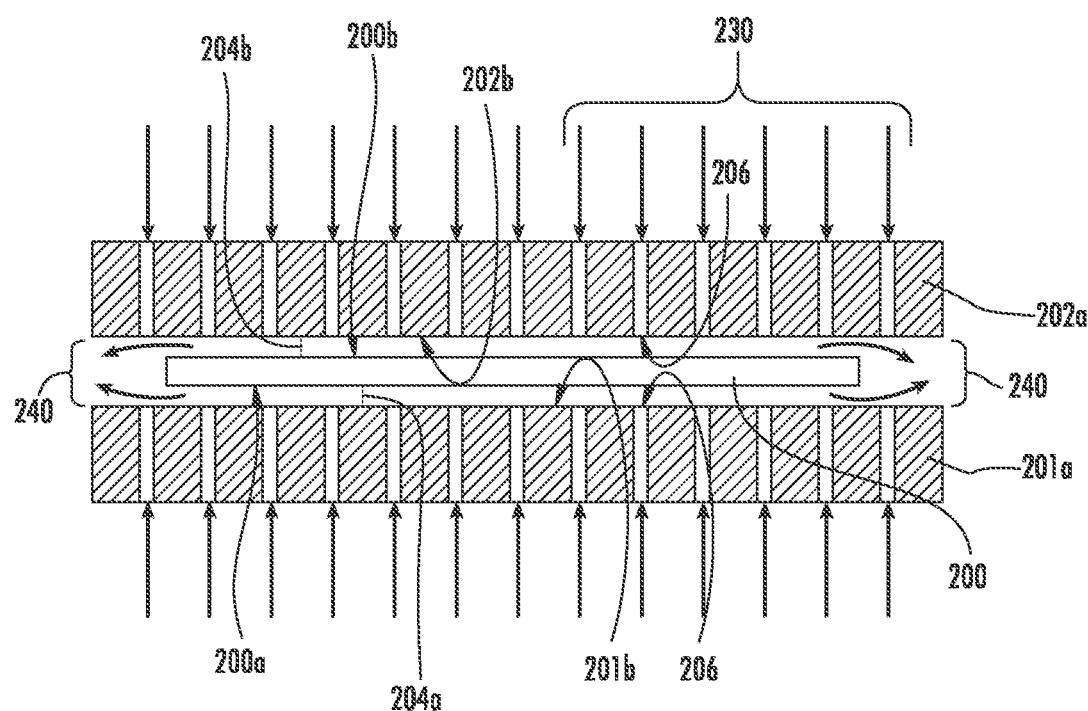
FIG. 21 is a diagrammatic cross-section of a glass sheet being cooled by conduction more than by convection, according to an exemplary embodiment.

Referring to FIG. 21, a diagrammatic cross-section of a high conduction glass cooling/quenching station and of a glass sheet being cooled by conduction more than by convection is shown. A hot glass sheet 200 has its first and second (major) surfaces 200a, 200b each facing a respective first and second surface 201b, 202b of respective first and second heat sinks 201a, 202a across respective gaps 204a and 204b. Gas 230 is fed through the first and second surfaces 201b, 202b as represented by the arrows, to supply the gaps 204a, 204b, and to assist in keeping the cover glass sheet centered or otherwise positioned between the heat sinks 201a, 202a. The air or other gas may leave passing by the edges of the heat sinks 201a, 202a as shown by arrows 240. By choosing the size of the gaps 204a, 204b and the gas and the flow rate of the gas 230 in accordance with the discussion herein, the cover glass sheet 200 will be cooled more by conduction than convection. In specific embodiments, cover glass sheet 200 is cooled by heat sinks 201a and 202a such that more than 20%, specifically more than 50%, and more specifically more than 80%, of the thermal energy leaving a heated article, such as cover glass sheet 200, crosses the gaps, such as gaps 204a and 204b, and is received by the heat sink 201a and 202a.

In some embodiments, the gaps 204a, 204b are configured to have a thickness or distance across the gap sufficient such that the heated cover glass sheet is cooled by conduction more than by convention. As will be understood, size of gaps 204a, 204b generally is the distance between the major cover glass surfaces and the opposing heat sink surfaces.

In some embodiments, gaps 204a and 204b may have a thicknesses of about (e.g., plus or minus 1%) 100 μm or greater (e.g., in the ranges from about 100 μm to about 200 μm, from about 100 μm to about 190 μm, from about 100 μm to about 180 μm, from about 100 μm to about 170 μm, from about 100 μm to about 160 μm, from about 100 μm to about 150 μm, from about 110 μm to about 200 μm, from about 120 μm to about 200 μm, from about 130 μm to about 200 μm, or from about 140 μm to about 200 μm). In other embodiments, gaps 204a and 204b may have a thicknesses of about (e.g., plus or minus 1%) 100 μm or less (e.g., in the ranges from about 10 μm to about 100 μm, from about 20 μm to about 100 μm, from about 30 μm to about 100 μm, from about 40 μm to about 100 μm, from about 10 μm to about 90 μm, from about 10 μm to about 80 μm, from about 10 μm to about 70 μm, from about 10 μm to about 60 μm, or from about 10 μm to about 50 μm).

Heat sinks 201a, 202a may be solid or porous configurations. Suitable materials include, but are not limited to, aluminum, bronze, carbon or graphite, stainless steel, etc. Heat sink dimensions may be designed to be sufficient to address the size of the cover glass sheet and to efficiently and effectively transfer heat without changing the heat sink temperature significantly. In the case where heat sinks 201a and/or 202a are porous, they may still include additional apertures or holes for flowing gas or may use the porous structure to provide flow, or both. In some embodiments, the heat sinks further comprise passages to allow fluid flow for controlling the temperature of the heat sink, described in more detail in FIGS. 23-25 and below.

Eliminating high gas flow rates of the prior art may enable use of very small apertures or pores 206, as shown in FIG. 21, in the heat sink face to provide the gas to the gap(s). In some embodiments, apertures may be less than 2 mm, less than 1.5 mm, less than 1 mm, less than 0.5 mm, less than 0.25 mm, or less than or equal to 200, 150, 100, 50, 30, 20, or 10 μm, when measured in the smallest direction (e.g., diameter in the case of circular apertures). In some embodiments, the apertures are from about (e.g., plus or minus 1%) 10 μm to about 1 mm, about 20 μm to about 1 mm, or about 50 μm to about 1 mm.

Spacing between adjacent apertures 206 can be from about (e.g., plus or minus 1%) 10 μm to about 3 mm, about 20 μm to about 2 mm, or about 50 μm to about 1 mm, measured edge-to-edge of apertures. Small apertures or pores may function as individual flow restrictors, providing high-performance, gas-bearing-type dynamics, such as high levels of stiffness and consistency of support of the sheet to position the sheet and control gap size, allowing for high homogeneity of thermal strengthening effects to avoid or reduce stress birefringence. Further, because very small pores or apertures may be used, the relative amount of solid matter at the surface of the heat sink facing the sheet surface across the gap(s) can be maximized, thereby increasing conductive heat flow.

According to various embodiments, use of such apertures 206 as the only path for providing gas to the gaps 204a, 204b, and desirably using apertures 206 that lie in directions close to normal to the heat sink surface 201b, 202b, ensures that air-bearing type dynamics are optimized, and not compromised by gas flows from larger apertures, or from sources other than through the heat sink surface(s) 201b, 202b adjacent to the sheet 200, or by other excessive lateral flow. In other embodiments gas may be provided to the gaps 204a, 204b via other sources, such as in addition to the apertures 206 or pores. Accordingly, aspects of the present disclosure allow for power and energy savings by use of low gas flows and solid-gas-solid conduction, such as relative to conventional convective tempering processes.

Figure 22:
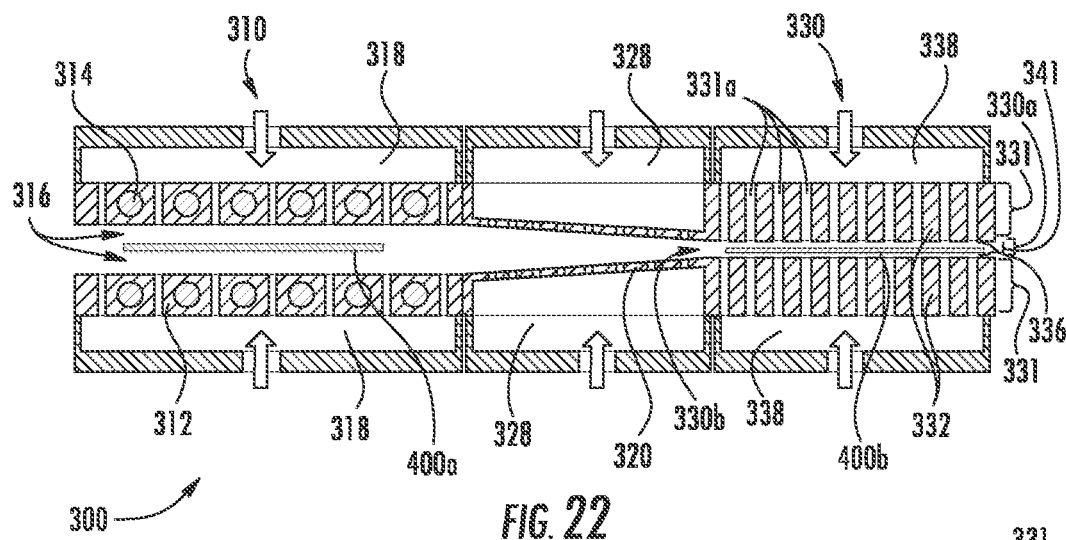
FIG. 22 is a schematic cross-sectional diagram of a conductive strengthening system according to an exemplary embodiment.

FIGS. 22-25 show an exemplary embodiment of a cover glass strengthening system 300 according to this disclosure. FIG. 22 shows a schematic cross-sectional diagram of the system 300, in which a cover glass sheet can be cooled via conduction of heat from the cover glass sheet, through a gas into a conductive heat sink. The apparatus includes a hot zone 310, a cold zone 330, and a transition gas bearing 320. Transition gas bearing 320 moves or directs a cover glass article (e.g., cover glass sheet 400a) from the hot zone 310 to the cold zone 330 such that no contact or substantially no contact occurs between the cover glass and the bearings. The hot zone 310 has gas bearings 312 each fed from a hot zone plenum 318, and the bearings 312 have cartridge heaters 314 inserted into holes through the bearings 312, which serve to heat the hot zone gas bearings 312 to a desired starting process temperature. A cover glass sheet (hot zone) 400a is kept between the hot zone gas bearings 312 for a duration long enough to bring it to a desired pre-cooling temperature (e.g., above the transition temperature).

In some embodiments, heating the sheet in the hot zone may be done predominantly via conduction of heat from a heat sink through a thin gas barrier. The conductive heating processes used in the hot zone can be similar to, but the reverse of the cooling processes described herein (e.g., pushing heat into the cover glass sheet).

In some embodiments, gaps 316, between the hot zone gas bearings 312 and the cover glass sheet 400a, may be relatively large, on the order of 0.05" (1.27 mm) to 0.125" (3.175 mm) or greater, since the cover glass sheet 400a may be heated up relatively slowly and thermal radiation from the hot gas bearings 312 into the cover glass sheet 400a is adequate for this purpose. In other embodiments, hot zone gap size may be as small as 150 microns per side or 500 microns per side. Smaller gaps may be advantageous, in some embodiments, because they enable the bearings to have better "stiffness"—i.e., ability to centralize the cover glass and therefore flatten it while it is in its softened state. In some embodiments, the process may re-form the cover glass sheets—flattening them—in the initial heating step, for example via the pressure supplied by the gas bearings 312. In some embodiments, the top and bottom hot zone bearings may be on actuators, allowing for changing the gap width in a continuous manner or, alternatively, allowing the cover glass to be brought into the hot zone when the gap is large and then compressing the gap to flatten the cover glass while it is still soft.

Process temperatures are dependent on a number of factors, including cover glass composition, cover glass thickness, cover glass properties (CTE, etc.), and desired level of strengthening. Generally, the starting process temperature may be any value between the cover glass transition temperature and the Littleton softening point, or in some embodiments, even higher. For SLG, for example, system 300 heats the cover glass sheet 400a to a temperature between about (e.g., plus or minus 1%) 640 to about 730° C. or between about 690 to about 730° C. In some embodiments, system 300 heats the glass sheet 400a to a temperature from about (e.g., plus or minus 1%) 620 to about 800° C., about 640 to about 770° C., about 660 to about 750° C., about 680 to about 750° C., about 690 to about 740° C., or about 690 to about 730° C.

The cover glass sheet 400a is heated to its desired starting process temperature (e.g., above the cover glass transition temperature), and it is then moved from the hot zone 310 to the cold zone 330 using any suitable means. In some embodiments, moving the cover glass sheet 400a from the hot zone 310 to the cold zone 330 may be accomplished by, for example (1) tilting the entire assembly such that gravity acting on the cover glass sheet forces it to move to the cold zone, (2) blocking off the gas flow from the leftmost exit of the hot zone 310 (the sides are enclosed in this embodiment), thereby forcing all of the gas emanating from all of the gas bearings to exit from the rightmost exit of the cold zone, causing fluid forces to be exerted on the cover glass sheet 400a and causing it to move to the cold zone 330, or (3) by a combination of (1) and (2))

The transition gas bearings 320 may be supplied with gas by transition bearing plenums 328. The solid material thickness behind the surfaces of the transition gas bearings 320 may be thin, of low thermal mass and/or low thermal conductivity, allowing for reduced heat conduction from the hot zone 310 to the cold zone 330. The transition gas bearings 320 may serve as a thermal break or transition between the two zones 310 and 330 and may serve to transition from the larger gaps 316 of the hot zone down to small gaps 336 of the cold zone 330. Further, the low thermal mass and/or low thermal conductivity of transition gas bearings 320 limit(s) the amount of heat transfer and therefore cooling experienced by cover glass sheet 400a while passing past transition gas bearings 320.

Once the cover glass sheet (cold zone) 400b moves into the cold zone 330 and into the channel 330a, it is stopped from exiting the right side exit by a mechanical stop or any other suitable blocking mechanism, shown as stop gate 341. Once the consumer electronic glass or cover glass sheet 400b cools sufficiently that the center has passed the glass transition (in the case, for example, of 1 mm thick SLG, to below about 490° C., corresponding in this example to about 325° C. at the surface), the stop gate 341 may be moved, unblocking cold zone channel 330a, and then the cover glass sheet 400b may be removed from the system 300. If desired, the cover glass sheet 400b may be left in the cold zone 330 until somewhere near room temperature before removal.

As noted above, within hot zone 310, cover glass sheet 400 is heated to a temperature above the cover glass transition temperature of the cover glass sheet. In the embodiment shown in FIG. 22, the cold zone 330 includes a channel 330a for receiving heated cover glass sheet 400b through an opening 330b, conveying the cover glass sheet 400b, and cooling the cover glass sheet 400*b* in the cold zone. In one or more embodiments, the channel 330*a* includes a conveyance system that may include gas bearings, roller wheels, conveyor belt, or other means to physically transport the cover glass sheet through the cold zone. As shown in FIG. 22, cold zone 330 includes gas bearings 332 which are fed plenums 338 that are separate from hot zone plenums 318 and transition plenums 328.

As shown in FIG. 22, the cold zone 330 includes one or more heat sinks 331 disposed adjacent to the channel 330*a*. Where two heat sinks are utilized, such heat sinks may be disposed on opposite sides of the channel 330*a*, facing each other across a channel gap 330*a*. In some embodiments, the heat sinks include a plurality of apertures 331*a* which form part of the gas bearing 332, and the surfaces of the cold gas bearings 332 of the cold zone 330 serve as the two heat sink surfaces. Due to the low air flow rate within channel 330*a* and the small size of channel gap 330*a*, cover glass sheet 400*b* is cooled within cold zone 330 primarily by conduction of heat from the cover glass sheet across the gap and into the solid heat sinks 331, without the cover glass sheet 400*b* touching the heat sink surfaces.

In some embodiments, the heat sinks and/or the surfaces thereof may be segmented. As noted above, in some embodiments, the heat sinks may be porous, and in such embodiments, the apertures through which the gas for gas bearings 332 is delivered are the pores of the porous heat sinks. The plurality of apertures 332*b*, a gas source and the channel gap 330*a* may be in fluid communication. In some embodiments, the gas flows through the apertures 331*a* to form gas cushions, layers or bearings in the channel gap 330*a*. The gas cushions of some embodiments prevent the cover glass sheet 400*b* from contacting the heat sink 331 surfaces. The gas also serves as the gas through which the cover glass sheet 400*b* is cooled by conduction more than by convection.

Because cooling occurs essentially by solid-to-solid heat conduction across the gaps, issues not present in convection-dominated cooling may need to be addressed. For example, for tempering of a large, thin sheet, the sheet may be (1) introduced quickly into the cold zone, optionally at higher speeds than those typically used in convection-based quenching and/or (2) the process is operated in a quasi-continuous mode, in which multiple sheets are heated and cooled one after the other in a continuous stream with little space between them, and where the heat sink is actively cooled such that it reaches a thermal equilibrium so that the front and trailing edges of the large sheets have similar thermal history.

In some embodiments, the gas flowed through the apertures 331*a* cools the heat sinks. In some embodiments, the gas flowed through the apertures both facilitates heat conduction, from the cover glass, across the gap, into the heat sinks, and also cools the heat sinks 331. In some instances, a separate gas or fluid may be used to cool the heat sinks 331. For instance, the heat sinks 331 may include passages 334, for flowing a cooling fluid therethrough to cool the heat sinks 331, as is more fully described with respect to FIG. 23. The passages 334 can be enclosed.

Where two heat sinks are used (i.e., a first heat sink and the second heat sink), one or more gas sources may be used to provide a gas to the channel gap 330*a*. The gas sources may include the same gas as one another or different gases. The channel gap 330*a* may, therefore, include one gas, a mixture of gases from different gas sources, or the same gas source. Exemplary gases include air, nitrogen, carbon dioxide, helium or other noble gases, hydrogen and various combinations thereof. The gas may be described by its thermal conductivity when it enters the channel 330*a* just before it begins to conductively cool the cover glass sheet 400*b*. In some instances, the gas may have a thermal conductivity of about (e.g., plus or minus 1%) 0.02 W/(m·K) or greater, about 0.025 W/(m·K) or greater, about 0.03 W/(m·K) or greater, about 0.035 W/(m·K) or greater, about 0.04 W/(m·K) or greater, about 0.045 W/(m·K) or greater, about 0.05 W/(m·K) or greater, about 0.06 W/(m·K) or greater, about 0.07 W/(m·K) or greater, about 0.08 W/(m·K) or greater, about 0.09 W/(m·K) or greater, about 0.1 W/(m·K) or greater, about 0.15 W/(m·K) or greater, or about 0.2 W/(m·K) or greater).

The processes and systems described herein allow for high heat transfer rates which, as discussed above, allow for a strengthening degree of temperature differential to form within even a very thin cover glass sheet. Using air as the gas, with gaps between the cover glass sheet and the heat sinks, heat transfer rates as high as 350, 450, 550, 650, 750, 1000, and 1200 kW/m$^2$ or more are possible through conduction alone. Using helium or hydrogen, heat transfer rates of 5000 kW/m$^2$ or more can be achieved.

The heat sinks 331 of one or more embodiments may be stationary or may be movable to modify the thickness of the channel gap 330*a*. The thickness of the cover glass sheet 400*b* may be in a range from about 0.4 times the thickness to about 0.6 times the thickness of channel gap 300*a*, which is defined as the distance between the opposing surfaces of the heat sinks 331 (e.g., upper and lower surface of heat sinks 331 in the arrangement of FIG. 22). In some instances, the channel gap is configured to have a thickness sufficient such that the heated cover glass sheet is cooled by conduction more than by convection.

In some embodiments, the channel gap may have a thickness such that when cover glass sheet 400*b* is being conveyed through or located within the channel 330*a*, the distance between the major surfaces of the cover glass sheet 400*b* and the heat sink surface (e.g., the gap size discussed above) is about (e.g., plus or minus 1%) 100 µm or greater (e.g., in the range from about 100 µm to about 200 µm, from about 100 µm to about 190 µm, from about 100 µm to about 180 µm, from about 100 µm to about 170 µm, from about 100 µm to about 160 µm, from about 100 µm to about 150 µm, from about 110 µm to about 200 µm, from about 120 µm to about 200 µm, from about 130 µm to about 200 µm, or from about 140 µm to about 200 µm). In some embodiments, the channel gap may have a thickness such that when cover glass sheet 400*b* is being conveyed through the channel, the distance between the cover glass sheet and the heat sink surface (the gap or gaps 336) is about (e.g., plus or minus 1%) 100 µm or less (e.g., in the range from about 10 µm to about 100 µm, from about 20 µm to about 100 µm, from about 30 µm to about 100 µm, from about 40 µm to about 100 µm, from about 10 µm to about 90 µm, from about 10 µm to about 80 µm, from about 10 µm to about 70 µm, from about 10 µm to about 60 µm, or from about 10 µm to about 50 µm). The total thickness of the channel gap 330*a* is dependent on the thickness of the cover glass sheet 400*b*, but can be generally characterized as 2 times the distance between the heat sink surface and the cover glass sheet, plus the thickness of the cover glass sheet. In some embodiments, the distance or gaps 336 between the cover glass sheet and the heat sinks may not be equal. In such embodiments, the total thickness of the channel gap 330*a* may be characterized as the sum of the distances between the cover glass sheet and each heat sink surface, plus the thickness of the cover glass sheet.

In some instances, the total thickness of the channel gap may be less than about (e.g., plus or minus 1%) 2500 μm (e.g., in the range from about 120 μm to about 2500 μm, about 150 μm to about 2500 μm, about 200 μm to about 2500 μm, about 300 μm to about 2500 μm, about 400 μm to about 2500 μm, about 500 μm to about 2500 μm, about 600 μm to about 2500 μm, about 700 μm to about 2500 μm, about 800 μm to about 2500 μm, about 900 μm to about 2500 μm, about 1000 μm to about 2500 μm, about 120 μm to about 2250 μm, about 120 μm to about 2000 μm, about 120 μm to about 1800 μm, about 120 μm to about 1600 μm, about 120 μm to about 1500 μm, about 120 μm to about 1400 μm, about 120 μm to about 1300 μm, about 120 μm to about 1200 μm, or about 120 μm to about 1000 μm). In some instances, the total thickness of the channel gap may be about 2500 μm or more (e.g., in the range from about 2500 μm to about 10,000 μm, about 2500 μm to about 9,000 μm, about 2500 μm to about 8,000 μm, about 2500 μm to about 7,000 μm, about 2500 μm to about 6,000 μm, about 2500 μm to about 5,000 μm, about 2500 μm to about 4,000 μm, about 2750 μm to about 10,000 μm, about 3000 μm to about 10,000 μm, about 3500 μm to about 10,000 μm, about 4000 μm to about 10,000 μm, about 4500 μm to about 10,000 μm, or about 5000 μm to about 10,000 μm).

The apertures 331a in the heat sink 331 may be positioned to be perpendicular to the heat sink surface or may be positioned at an angle of 20 degrees or less, such as about (e.g., plus or minus 1%) 15 degrees or less, about 10 degrees or less or about 5 degrees or less) from perpendicular to the heat sink surface.

In some embodiments, the material behind the heat sink (cold bearing 332) surfaces can be any suitable material having high heat transfer rates, including metals (e.g., stainless steel, copper, aluminum), ceramics, carbon, etc. This material may be relatively thick compared to the material behind the surfaces of the transition bearings 320, as shown in FIG. 22, such that heat sink can easily accept relatively large amounts of thermal energy. In an exemplary embodiment, the material of the heat sinks 331 is stainless steel.

Figure 23:
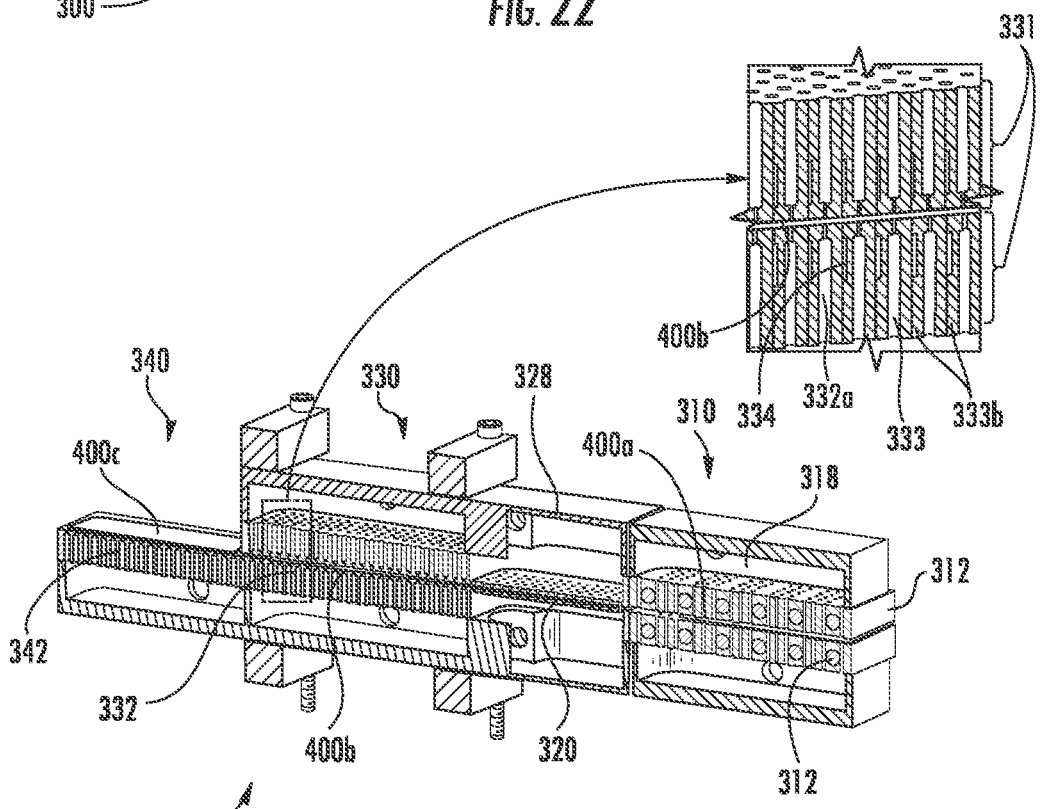
FIG. 23 is a perspective cut-away view of another embodiment of a system similar to that of FIG. 22 according to an exemplary embodiment.

FIG. 23 is a cut-away perspective cross-section of an apparatus similar to that of FIG. 22, albeit reversed from right to left, and comprising additionally a load/unload zone 340, next to cold zone 330 of system 300, including a load/unload gas bearing 342 with a cover glass sheet 400c positioned thereon. Also, the apparatus of FIG. 23 uses tight channel gaps (not indicated on the figure) in hot zone 310, transition bearing 320, and cold zone 330.

The inset in FIG. 23 shows an alternative embodiment of a cold zone gas bearing 332a, in which the gas bearing 322a is actively cooled by coolant channels 334, between gas bearing feed holes 333, where the feed holes feed the apertures in the surface of the bearing 322a. The cooling channels 334 are defined between heat sink segments 333b, which are assembled together to form the heat sink 331 and the surface thereof facing the cover glass sheet 400b.

The cooling channels 334 may be positioned very near the surface of the heat sink 331, in the solid material of the gas bearing 332, with a region of solid bearing material between the heat sink/gas bearing surface and the nearest-the-surface edge of the coolant channel 334, having the same width as the nearest-the-surface edge of the coolant channel 334. Accordingly, in some embodiments there is no region of reduced cross section in the solid material of the heat sink 331/gas bearing 332a between a coolant channel 334 and the surface facing the cover glass 400b. This differs from the typical convective gas cooling equipment, because the high gas flow rates mandate that significant space be provided in the middle of the array of gas nozzles for the gas flows to escape. Where active cooling is used, heat sink 331/gas bearing 332a has a region of reduced cross section in the solid material of the gas nozzle design, relative to the solid material nearest the cover glass surface. The reduced cross section region is generally positioned between the active cooling fluid and cover glass sheet under treatment, in order to give a high-volume path for the large volume of heated gas returning from the sheet.

Figure 24:
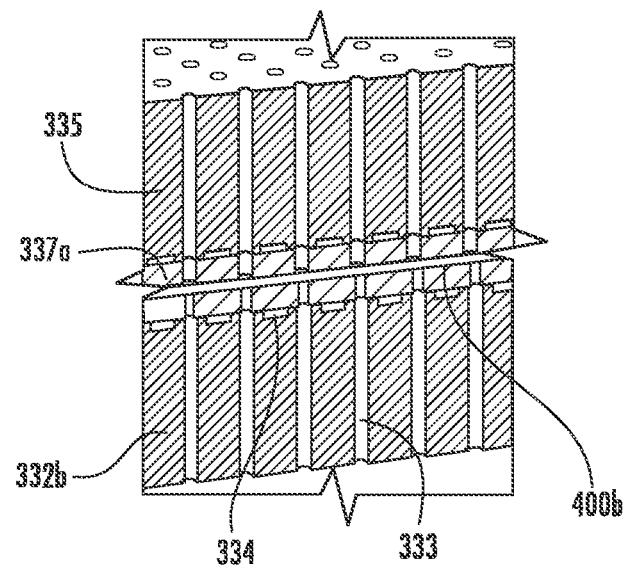
FIG. 24 is a perspective cut-away view of an alternative embodiment of the inset feature of FIG. 23 according to an exemplary embodiment.
Figure 25:
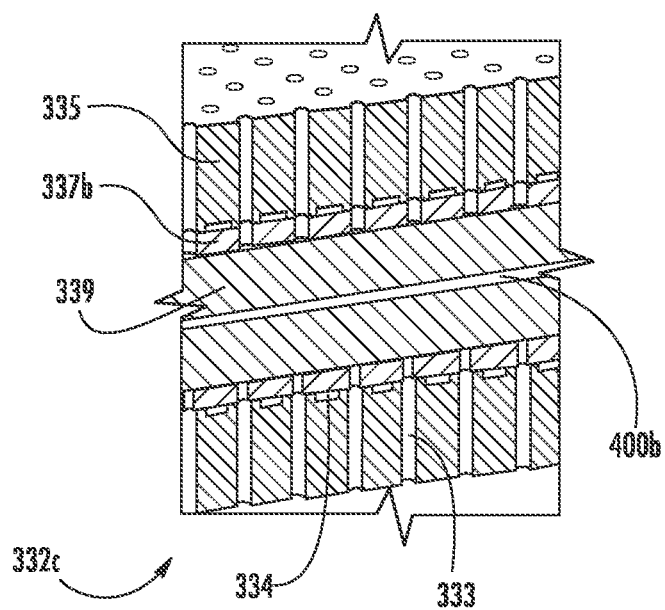
FIG. 25 is a perspective cut-away view of yet another alternative embodiment of the inset feature of FIG. 23 according to an exemplary embodiment.
Figure 26:
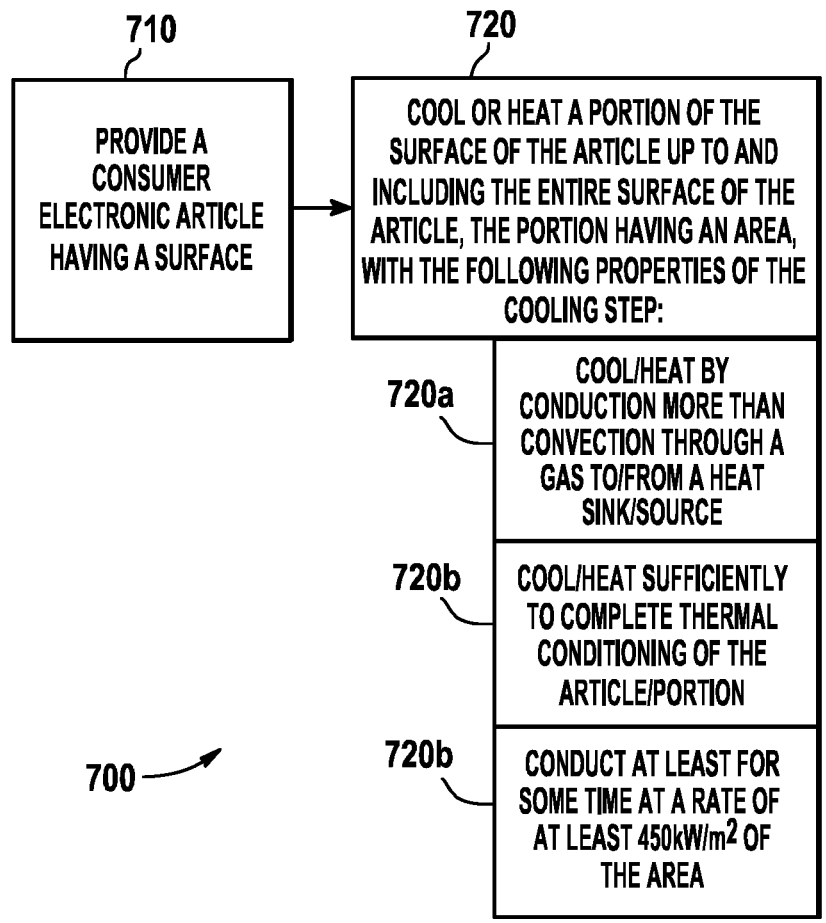
FIG. 26 is a flow chart illustrating some aspects of yet another method according to an exemplary embodiment.

FIG. 24 shows yet another alternative embodiment of a cold zone gas bearing 332, like that of the inset of FIG. 23. In this embodiment, coolant channels 334 are formed between a gas bearing feed member 335, containing gas bearing feed holes 333, and a gas bearing face member 337a, which provides the cover glass sheet 400b facing surface of the gas bearing 332. FIG. 25 shows yet another alternative cold zone gas bearing 332c having a similar structure to the embodiment of FIG. 24, but having a porous member 339 between a bearing plate member 337b and cover glass sheet 400b, such that porous member 339 forms the surface facing the cover glass sheet 400b.

It should be understood that in various embodiments, the cover glass strengthening processes and systems described herein in relation to FIGS. 16-26 may be used or operated to form a cover glass or glass ceramic article (such as cover glass sheet 500) having any combination of features, characteristics, dimensions, physical properties, etc. of any of the cover glass article embodiments discussed herein.

Cover glass sheets having undergone the thermal strengthening processes described herein may be further processed by undergoing ion exchange to further enhance their strength. Ion-exchanging the surface of cover glasses heat strengthened as described herein may increase the above-described compressive stresses by at least 20 MPa, such as at least 50 MPa, such as at least 70 MPa, such as at least 80 MPa, such as at least 100 MPa, such as at least 150 MPa, such as at least 200 MPa, such as at least 300 MPa, such as at least 400 MPa, such as at least 500 MPa, such as at least 600 MPa and/or no more than 1 GPa, in some such contemplated embodiments.

Systems and Processes for Thermal Conditioning and/or Heating Cover Glass Sheet

In addition to thermally strengthening thin cover glass sheets, the processes and systems described herein can be used for additional thermal conditioning processes as well. While cooling is specifically discussed herein, the systems and processes can be used to transfer heat into the cover glass sheet via a conductive method. Accordingly, additional embodiments of the processes of the current disclosure, including heating through a gas by conduction more than convection. Such a process or method 700 is illustrated in the flow chart of FIG. 26.

The method 700 includes two main steps. The first step, step 710, involves providing an article, such as a cover glass sheet, having at least one surface. The second step, step 720, involves heating or cooling a portion of the surface of the article, up to and including the entire surface of the article. Step 720 is performed by conduction more than by convection through a gas from or to a heat source or a heat sink source as shown in sub-part 720a, and is performed sufficiently to complete thermal conditioning of the article or the portion of the surface of the article in sub-part 720b, and the conduction of the cooling/heating of step 720 is performed at a high rate of heat transfer, at least 450 kW/m$^2$ of the area of the portion in sub-part 720b.

For example, an article can be thermally conditioned—i.e., either heated or cooled—by cooling or heating a portion of the surface of the article, up to and including the entire surface of the article (the portion having an area), by conduction more than by convection, the conduction mediated through a gas to or from a heat sink or a heat source and not through solid-to-solid contact, sufficiently to complete a thermal conditioning of the article or of the portion of the surface of the article, and the conduction being performed, during at least some time of the heating or cooling, at a rate of at least 450, 550, 650, 750, 800, 900, 1000, 1100, 1200, 1500, 2000, 3000, 4000 or even 5000 or more kW per square meter.

In addition to tempering, the high rates of thermal power transfer provided by the systems and methods discussed herein allow for thermal processing or conditioning of all kinds, including heating and cooling during tempering, edge strengthening of cover glass, firing or sintering of ceramics, glasses, or other materials, and so forth. Additionally, since the heat is extracted or delivered primarily by conduction, tight control is provided over the thermal history and the heat distribution in the treated article while preserving surface smoothness and quality. Accordingly, in yet another aspect of the present disclosure, tight control is provided over the thermal history and the heat distribution in the treated article, since the heat is extracted or delivered primarily by conduction, yet surface smoothness and quality are preserved. Accordingly, it will be possible to use the systems and methods of the present disclosure to intentionally vary the stress profile from the strengthening process, both in the thickness direction and in the directions in which the plane of the sheet lies, by varying gaps, varying heat sink/source materials, varying heat sink/source temperatures, varying the gas mixture—and all these may be varied by position along the path of the sheet as it moves, or across the path of the sheet, or potentially in time also, not merely with position (for most of the variables).

Devices, Products and Structures Incorporating Strengthened Cover Glass Sheets

The strengthened cover glass or glass-ceramic articles and sheets discussed herein have a wide range of uses in a wide range of articles, devices, products, structures, etc. Discussion of cover glass or glass-ceramics herein is also referred to as consumer electronic glass. The cover glass or glass-ceramic of according to the present disclosure may be used on any surface of electronic devices, mobile phones, portable media players, televisions, notebook computers, watches, user wearable devices (e.g., Fitbit), cameras lenses, camera displays, household appliances, tablet computer displays, and any other electronic devices which may require a surface according to the properties and dimensions described herein.

Figure 27:
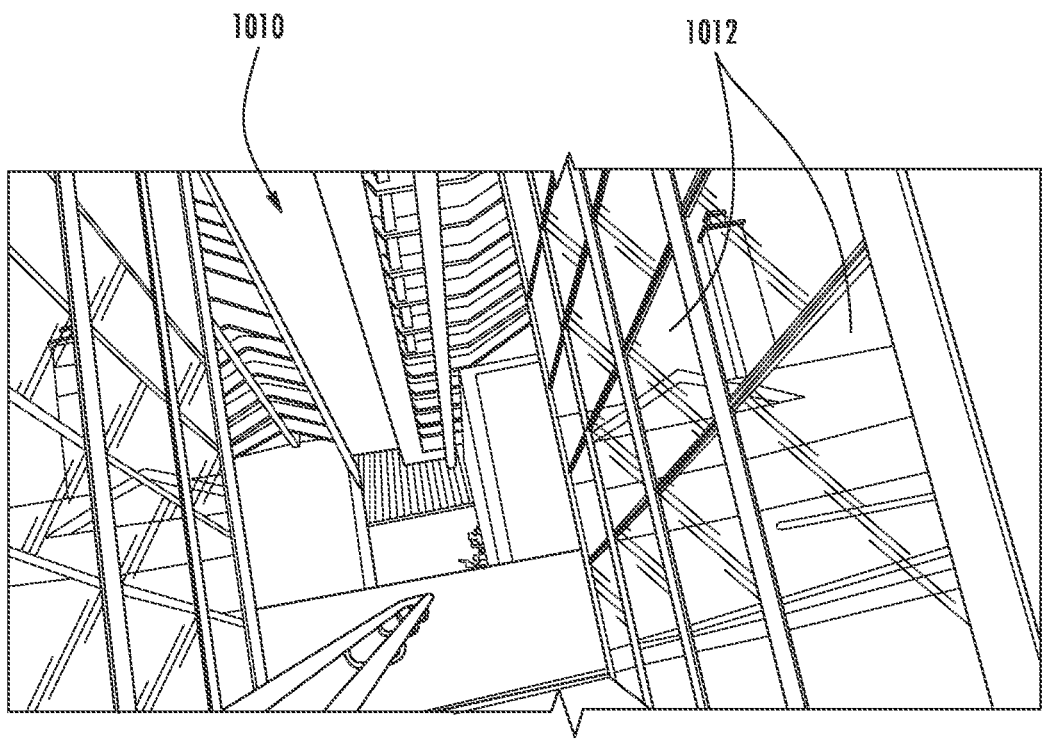
FIG. 27 is a perspective view of a building with glass windows according to an exemplary embodiment.

Referring to FIG. 27, a structure 1010, such as a building, house, vehicle, etc., includes a glass or glass-ceramic article 1012 in the form of a window, portion of walls (e.g., surfaces), dividers, etc. In contemplated embodiments, the glass or ceramic article 1012 may be strengthened such that the glass or ceramic article 1012 has a negative tensile stress on or near surfaces thereof, balanced by a positive tensile stress internal thereto, as disclosed herein. Further, the glass or glass-ceramic article 1012 may have a composition that resists chemicals and/or corrosion as may be present in outdoor environments by having a relatively high silicon dioxide content, such as at least 70% silicon dioxide by weight, such as at least 75% by weight.

According to an exemplary embodiment, the glass or glass-ceramic article 1012 has major surfaces orthogonal to a thickness thereof (see generally sheet 500 as shown in FIG. 4), where the major surfaces have a large area (e.g., at least 5 cm$^2$, at least 9 cm$^2$, at least 15 cm$^2$, at least 50 cm$^2$, at least 250 cm$^2$) relative to glass or glass-ceramic articles used in other applications (e.g., lenses, battery components, etc.). In contemplated embodiments, total light transmission through the glass or glass-ceramic articles 1012 is at least about 50% (e.g., at least 65%, at least 75%) from wavelengths of about 300 nm to about 800 nm, when the glass or glass ceramic article 1012 has thicknesses as disclosed herein, such as a thickness of less than 5 cm, less than 3 cm, less than 2 cm, less than 1.75 cm, less than 1.5 cm, less than 1 cm, less than 5 mm, less than 3 mm, less than 2 mm, less than 1.75 mm, less than 1.5 mm, less than 1 mm, less than 0.8 mm, less than 0.6 mm, less than 0.5 mm, less than 0.4 mm, less than 0.2 mm, and/or at least 10 micrometers, such as at least 50 micrometers.

Thin thicknesses of the glass or glass-ceramic article 1012 may not harm the function of the glass or glass-ceramic article 1012 in architectural, automotive, or other applications relative to conventional articles because the high level of strength of the glass or glass-ceramic article 1012 provided by the inventive processes disclosed herein. Thin glass or glass-ceramic articles 1012 may be particularly useful in such architectural, automotive, consumer electronics, or other applications because the glass or glass ceramic article 1012 may be lighter than conventional such articles, reducing the weight of the corresponding overall structure. For automobiles, a result may be greater fuel efficiency. For buildings, a result may be sturdier or less resource-intensive structures. For consumer electronics, a lighter device with greater impact resistance and/or resilience to recurring drops or impacts. In other contemplated embodiments, glass or glass-ceramic articles disclosed herein may have areas of lesser magnitude, greater thicknesses, transmit less light, and/or may be used in different applications, such as those disclosed with regard to FIGS. 27-30, for example.

Figure 28:
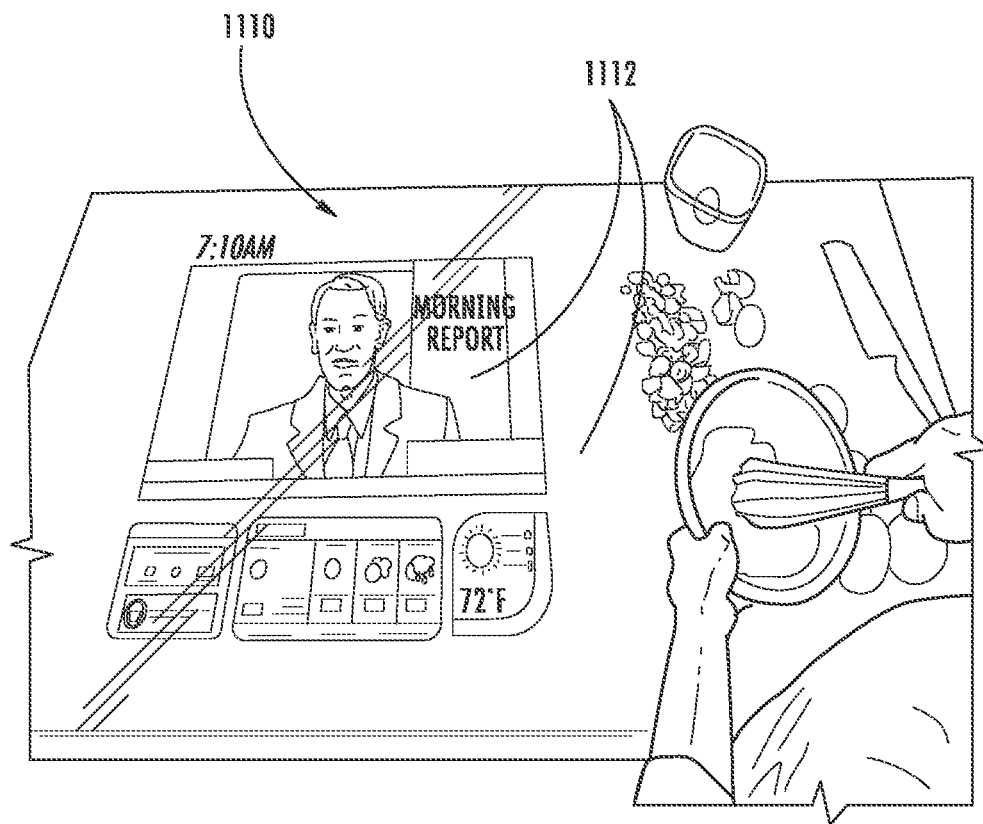
FIG. 28 is a perspective view of a display on a countertop according to an exemplary embodiment.

Referring to FIG. 28, a surface 1110 includes a glass or glass ceramic article 1112, manufactured as disclosed herein and/or with any combination of stress profiles, structures and/or physical properties discussed herein, that functions as a countertop and/or as a portion of a display. In some embodiments, total transmission through the cover glass or glass ceramic articles 1012 is at least about 30% (e.g., at least 50%) from infrared wavelengths of about 800 nm to about 1500 nm, facilitating use of the surface 1110 as a cooktop. In some embodiments, the cover glass or glass-ceramic article 1112 has a coefficient of thermal expansion (CTE) from about $10 \times 10^{-7}$° C.$^{-1}$ to about $140 \times 10^{-7}$° C.$^{-1}$, about $20 \times 10^{-7}$° C.$^{-1}$ to about $120 \times 10^{-7}$° C.$^{-1}$, about $30 \times 10^{-7}$° C.$^{-1}$ to about $100 \times 10^{-7}$° C.$^{-1}$, about $40 \times 10^{-7}$° C.$^{-1}$ to about $100 \times 10^{-7}$° C.$^{-1}$, about $50 \times 10^{-7}$° C.$^{-1}$ to about $100 \times 10^{-7}$° C.$^{-1}$, or about $60 \times 10^{-7}$° C.$^{-1}$ to about $120 \times 10^{-7}$° C. In various embodiments, the processes are ideally suited for glass compositions having moderate to high CTEs. Example cover glasses that work well with the processes described herein include alkali aluminosilicates, such as Corning's® Gorilla® Glasses, boroaluminosilicates, and soda-lime glasses. In some embodiments, the cover glasses used have CTEs greater than 40, greater than 50, greater than 60, greater than 70, greater than 80, or greater than $90 \times 10^{-7}$/° C. Some such CTEs may be particularly low for thermal tempering as disclosed herein, where the degree of negative tensile stress is no more than 50 MPa and/or at least 10 MPa.

Figure 29:
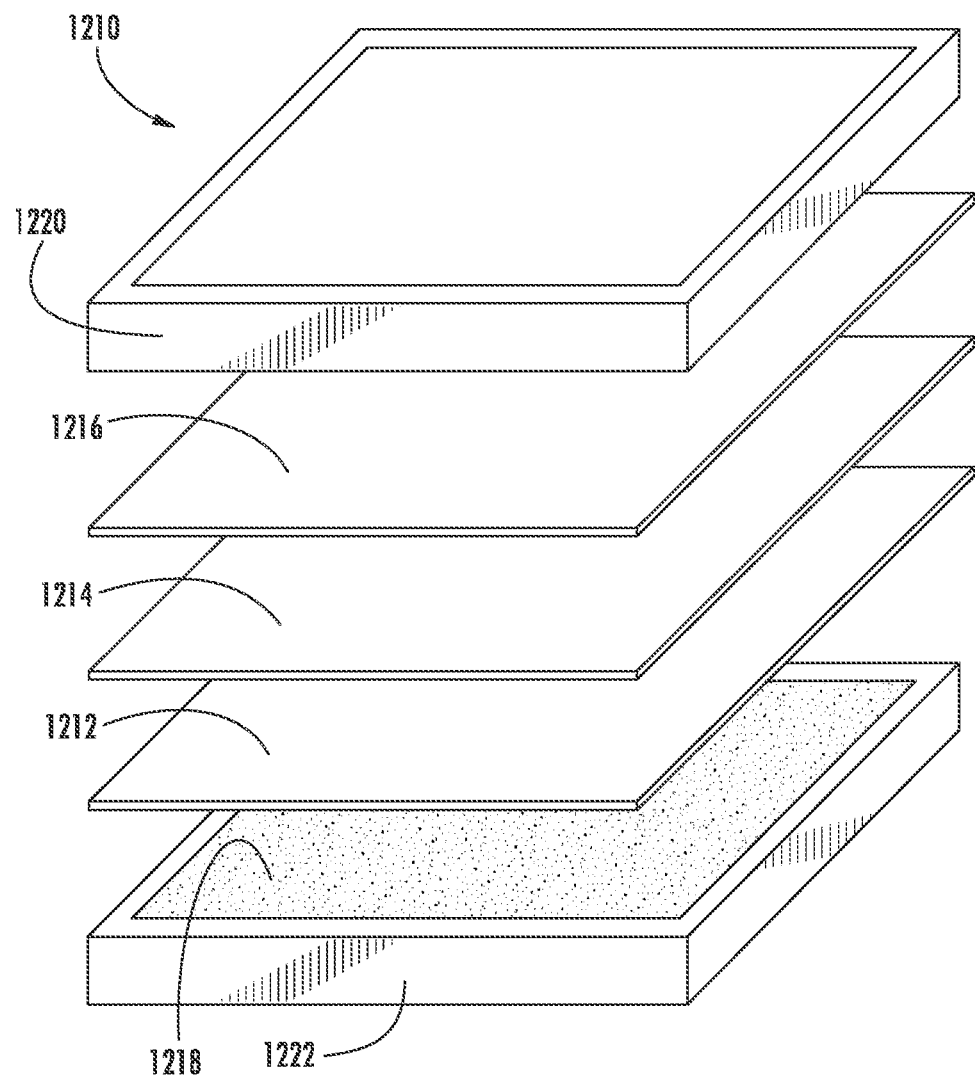
FIG. 29 is an exploded perspective view of a consumer electronic device or product including glass or glass-ceramic articles according to an exemplary embodiment.

Referring to FIG. 29, a device 1210 (e.g., handheld computer, tablet, portable computer, cellular phone, television, watch, display board, etc.) includes one or more cover glass or glass-ceramic articles 1212, 1214, 1216, manufactured as disclosed herein and/or with any combination of stress profiles, structures and/or physical properties as disclosed herein, and further includes electronic components 1218 (e.g., a display, and electrical display, a controller, a memory, a microchip, etc.) and a housing 1220. In embodiments, electrical components 1218 and/or the electrical display may include a liquid crystal display and/or at least one light emitting diode (LED). In embodiments, the electronic display may be a touch sensitive display. In further embodiments, the glass-based layer forming or covering the electronic display may include a surface feature on the first or second major surface for haptic feedback for a user. For example, raised projections, ridges, contours, or bumps are non-limiting example surface features for haptic feedback. In embodiments, electrical components 1218 are provided at least partially within housing 1220. In embodiments, electrical components 1218 are provided completely within housing 1220. In contemplated embodiments, the housing 1220 may be or include a cover glass or glass-ceramic article as disclosed herein. In contemplated embodiments, a substrate 1222 for the electronic components 1218 may be a cover glass or glass-ceramic article as disclosed herein.

In some embodiments, the cover glass or glass ceramic articles 1212, 1214 may function as frontplane and backplane substrates, and the cover glass or glass ceramic article 1216 may function as a cover glass in the device 1210. According to an exemplary embodiment, the cover glass or glass-ceramic article 1216 of the device 1210 is an alkali-aluminosilicate glass. Such composition may allow the cover glass or glass-ceramic article 1216 to be strengthened by thermal tempering, as disclosed herein, and may be additionally strengthened by ion-exchange, providing a particularly high degree of negative tensile stress (e.g., at least 200 MPa, at least 250 MPa) at or near surfaces thereof. In other embodiments, the cover glass or glass-ceramic article 1216 may include sodium carbonate, calcium oxide, calcium magnesium carbonate, silicon dioxide (e.g., at least 70% by weight), aluminum oxide, and/or other constituents; and may be strengthened by the inventive processes disclosed herein. The cover glass or glass ceramic article 1216 may be particularly thin or otherwise structured, such as having any of the dimensions, properties, and/or compositions as disclosed herein.

In embodiments, housing 1220 may include a front surface, a back surface, and at least one side surface 1220. Housing 1220 may include one or more glass-based layers including cover glass or glass-ceramic articles manufactured as disclosed herein and/or with any combination of stress profiles, structures and/or physical properties discussed herein. In embodiments, the glass-based layer may be a cover glass or glass-ceramic article as disclosed herein. The glass based layer (e.g., 1212, 1214, 1216) may form any surface of a consumer electronic product. In one or more embodiments, the glass-based layer extends across the housing front surface from at least one side surface (e.g., 1220) to an opposite side surface. In embodiments, the glass-based layer is provided at or adjacent the front surface of housing 1220. In further embodiments, the glass-based layer may include a surface feature on the first or second major surface for haptic feedback for a user. For example, raised projections, ridges, contours, or bumps are non-limiting example surface features for haptic feedback. In embodiments, glass based layer (e.g., 1212, 1214, 1216) may be shaped in 1-dimension, 2-dimensions, 2.5-dimensions (e.g., curvature at the edge of a display glass), or 3-dimensions.

In other embodiments, the glass-based layer (e.g., 1212, 1214, 1216) may have at least one beveled or curved edge, including an embodiment where the entire outside perimeter of the glass-based layer is beveled or curved. In embodiments, the average thickness of the glass-based layer may not exceed 1.5 mm, may not exceed 1.0 mm, may not exceed 0.7 mm, may not exceed 0.5 mm, or may have an average thickness within a range from about 0.5 mm to about 1.0 mm, or about 0.1 mm to about 1.5 mm, or an average thickness from about 0.5 mm to about 0.7 mm. In yet other embodiments, the one or more of the major surfaces of the glass-based layer may include an anti-scratch layer, an antireflection layer, and an antiglare layer. The one or more major surfaces of the glass-based layer may also include any combination or all of these layers.

The cover glass or glass-ceramic article may include a glass material that is substantially optically clear, transparent and free from light scattering. In such embodiments, the cover glass material may exhibit an average light transmission over a wavelength range from about 400 nm to about 780 nm of about 85% or greater, about 86% or greater, about 87% or greater, about 88% or greater, about 89% or greater, about 90% or greater, about 91% or greater or about 92% or greater. In one or more alternative embodiments, the glass material may be opaque or exhibit an average light transmission over a wavelength range from about 400 nm to about 780 nm of less than about 10%, less than about 9%, less than about 8%, less than about 7%, less than about 6%, less than about 5%, less than about 4%, less than about 3%, less than about 2%, less than about 1%, or less than about 0%. In some embodiments, these light reflectance and transmittance values may be a total reflectance or total transmittance (taking into account reflectance or transmittance on both major surfaces of the glass material). The glass material may optionally exhibit a color, such as white, black, red, blue, green, yellow, orange, etc.

Figure 30:
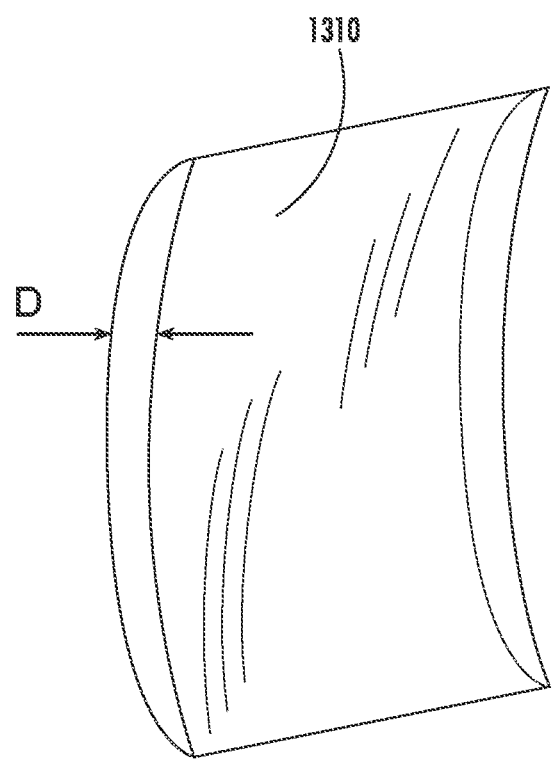
FIG. 30 is a perspective view of a glass or glass-ceramic article or sheet according to an exemplary embodiment.

Referring now to FIG. 30, a cover glass or glass-ceramic article 1310, manufactured according to processes disclosed herein and/or with any combination of stress profiles, structures and/or physical properties as disclosed herein, has curvature and/or a variable cross-sectional dimension D. Such articles may have thicknesses disclosed herein as an average of dimension D or as a maximum value of dimension D. While the cover glass or glass-ceramic article 1310 is shown as a curved sheet, other shapes, such as more complex shapes, may be strengthened by processes disclosed herein. In contemplated embodiments, the cover glass or glass ceramic article 1310 may be used as a front pane, back pane, or on any surface of a consumer electronic product.

In various embodiments, cover glass material manufactured according to processes disclosed herein, and/or with any combination of stress profiles, structures and/or physical properties as disclosed herein, is useful to form at least one sheet of a cover glass-interlayer-cover glass laminate, such as used in automotive glass sidelights. Stronger and thinner laminates can be produced, resulting in weight and cost savings and fuel efficiency increases. Desirably, a thermally strengthened thin sheet may be cold bent (see generally FIG. 30) and laminated to a formed thicker glass, providing an easy and reliable manufacturing process not requiring any hot forming/shaping of the thin sheet.

Glass and Glass Ceramic Materials for Thermally Strengthened Cover Glass Sheets The systems and methods discussed may be used to thermally condition, strengthen and/or temper a wide variety of cover glass and/or ceramic materials.

The processes and systems described herein may generally be used with almost any glass composition, and some embodiments can be used with glass laminates, glass ceramics, and/or ceramics. In various embodiments, the processes can be used with glass compositions having high CTEs. In embodiments, cover glasses strengthened via the processes and systems discussed herein include alkali aluminosilicates, such as Corning's® Gorilla® Glasses, SLG, soda- or alkali-free glasses and the like. In some embodiments, cover glasses strengthened via the processes and systems discussed herein have CTEs of greater than $40 \times 10^{-7}/°$ C., greater than $50 \times 10^{-7}/°$ C., greater than $60 \times 10^{-7}/°$ C., greater than $70 \times 10^{-7}/°$ C., greater than $80 \times 10^{-7}/°$ C., or greater than $90 \times 10^{-7}/°$ C.

In some applications and embodiments, cover glasses strengthened via the processes and systems discussed herein (such as cover glass sheet 500) may have a composition configured for chemical durability. In some such embodiments, the composition comprises at least 70% silicon dioxide by weight, and/or at least 10% sodium oxide by weight, and/or at least 7% calcium oxide by weight. Conventional articles of such compositions may be difficult to chemically temper to a deep depth, and/or may be difficult, if not impossible, to thermally temper by conventional processes to a sufficient magnitude of negative surface tensile stress for thin thicknesses, such as due to fragility and forces of conventional processes. However, in contemplated embodiments, inventive processes disclosed herein allow a strengthened cover glass or glass-ceramic article or sheet, such as cover glass sheet 500, with such a composition, where negative tensile stress extends into the respective strengthened cover glass or glass-ceramic sheet to a distance of at least 10% of the thickness of the strengthened cover glass or glass-ceramic sheet from at least one of the first and second surfaces (e.g., surfaces 510, 520 of cover glass sheet 500), such as at least 12% of the thickness, 15% of the thickness, 16% of the thickness, 17% of the thickness, 18% of the thickness, 19% of the thickness, 20% of the thickness, or 21% of the thickness.

In some embodiments, the cover glass or glass-ceramic sheets and articles strengthened as discussed herein have one or more coatings that are placed on the cover glass prior to the thermal strengthening of the cover glass sheet. The processes discussed herein can be used to produce strengthened cover glass sheets having one or more coatings, and, in some such embodiments, the coating is placed on the cover glass prior to thermal strengthening and is unaffected by the thermal strengthening process. Specific coatings that are advantageously preserved on cover glass sheets of the present disclosure include low E coatings, reflective coatings, antireflective coatings, anti-fingerprint coatings, cut-off filters, pyrolytic coatings, etc.

According to an exemplary embodiment, cover glass or glass-ceramic sheets or articles discussed herein, for example articles 1212, 1214 of the device 1210 shown in FIG. 29, are boro-aluminosilicate glasses. In some embodiments cover glass or glass ceramic sheets or articles discussed herein, for example articles 1212, 1214 of the device 1210 shown in FIG. 29, are generally non-alkali glasses, yet still have stress profiles and structures as disclosed herein. Such composition may reduce the degree of relaxation of the glass, facilitating coupling of transistors thereto. In some embodiments, the cover glass sheets/articles discussed herein are flexible glass sheets. In other embodiments, the cover glass sheets/articles discussed herein comprise a laminate of two or more cover glass sheets.

In some contemplated embodiments, cover glasses strengthened via the processes and systems discussed herein (such as cover glass sheet 500) may include an amorphous substrate, a crystalline substrate or a combination thereof, such as a glass-ceramic substrate. Cover glasses strengthened via the processes and systems discussed herein (such as cover glass sheet 500) may include an alkali aluminosilicate glass, alkali containing borosilicate glass, alkali aluminophosphosilicate glass or alkali aluminoborosilicate glass. In one or more embodiments, cover glasses strengthened via the processes and systems discussed herein (such as cover glass sheet 500), in portions thereof not ion-exchanged, may include a cover glass having a composition, in mole percent (mol %), including: $SiO_2$ in the range from about (e.g., plus or minus 1%) 40 to about 80 mol %, $Al_2O_3$ in the range from about 10 to about 30 mol %, $B_2O_3$ in the range from about 0 to about 10 mol %, $R_2O$ in the range from about 0 to about 20 mol %, and/or RO in the range from about 0 to about 15 mol %. In some contemplated embodiments, the composition may include either one or both of $ZrO_2$ in the range from about 0 to about 5 mol % and $P_2O_5$ in the range from about 0 to about 15 mol %. In some contemplated embodiments, $TiO_2$ can be present from about 0 to about 2 mol %.

In some contemplated embodiments, compositions used for the strengthened cover glass or glass-ceramic sheet or article discussed herein may be batched with 0-2 mol % of at least one fining agent selected from a group that includes $Na_2SO_4$, NaCl, NaF, NaBr, $K_2SO_4$, KCl, KF, KBr, and $SnO_2$. The cover glass composition according to one or more embodiments may further include $SnO_2$ in the range from about 0 to about 2 mol %, from about 0 to about 1 mol %, from about 0.1 to about 2 mol %, from about 0.1 to about 1 mol %, or from about 1 to about 2 mol %. Cover glass compositions disclosed herein for the strengthened cover glass or glass-ceramic sheet 500 may be substantially free of $As_2O_3$ and/or $Sb_2O_3$, in some embodiments.

In contemplated embodiments, the strengthened cover glass or glass-ceramic sheet or article discussed herein may include alkali aluminosilicate cover glass compositions or alkali aluminoborosilicate glass compositions that are further strengthened via an ion exchange process. One example cover glass composition comprises $SiO_2$, $B_2O_3$ and $Na_2O$, where $(SiO_2+B_2O_3) \geq 66$ mol. %, and/or $Na_2O \geq 9$ mol. %. In an embodiment, the cover glass composition includes at least 6 wt. % aluminum oxide. In a further embodiment, the strengthened cover glass or glass-ceramic sheet or article discussed herein may include a glass composition with one or more alkaline earth oxides, such that a content of alkaline earth oxides is at least 5 wt. %. Suitable cover glass compositions, in some embodiments, further comprise at least one of $K_2O$, MgO and CaO. In a particular embodiment, the cover glass compositions used in the strengthened cover glass or glass-ceramic sheet or article discussed herein can comprise 61-75 mol. % $SiO_2$; 7-15 mol. % $Al_2O_3$; 0-12 mol. % $B_2O_3$; 9-21 mol. % $Na_2O$; 0-4 mol. % $K_2O$; 0-7 mol. % MgO; and/or 0-3 mol. % CaO.

A further example cover glass composition suitable for the strengthened cover glass or glass-ceramic sheet or article discussed herein comprises: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$;

less than 50 ppm $As_2O_3$; and less than 50 ppm $Sb_2O_3$; where 12 mol. % ($Li_2O+Na_2O+K_2O$)≤20 mol. % and/or 0 mol. % (MgO+CaO)≤10 mol. %. A still further example glass composition suitable for the strengthened cover glass or glass-ceramic sheet or article discussed herein comprises: 63.5-66.5 mol. % $SiO_2$; 8-12 mol. % $Al_2O_3$; 0-3 mol. % $B_2O_3$; 0-5 mol. % $Li_2O$; 8-18 mol. % $Na_2O$; 0-5 mol. % $K_2O$; 1-7 mol. % MgO; 0-2.5 mol. % CaO; 0-3 mol. % $ZrO_2$; 0.05-0.25 mol. % $Sn_2O_2$; 0.05-0.5 mol. % $CeO_2$; less than 50 ppm $As_2O_3$; and less than 50 ppm $Sb_2O_3$; where 14 mol. %≤($Li_2O+Na_2O+K_2O$)≤18 mol. % and/or 2 mol. % (MgO+CaO)≤7 mol. %.

In particular contemplated embodiments, an alkali aluminosilicate glass composition suitable for the strengthened cover glass or glass-ceramic sheet or article discussed herein comprises alumina, at least one alkali metal and, in some embodiments, greater than 50 mol. % $SiO_2$, in other embodiments at least 58 mol. % $SiO_2$, and in still other embodiments at least 60 mol. % $SiO_2$, wherein the ratio ($Al_2O_3$+$B_2O_3$)/Σmodifiers (i.e., sum of modifiers) is greater than 1, where in the ratio the components are expressed in mol. % and the modifiers are alkali metal oxides. This cover glass composition, in particular embodiments, comprises: 58-72 mol. % $SiO_2$; 9-17 mol. % $Al_2O_3$; 2-12 mol. % $B_2O_3$; 8-16 mol. % $Na_2O$; and/or 0-4 mol. % $K_2O$, wherein the ratio ($Al_2O_3$+$B_2O_3$)/Σmodifiers (i.e., sum of modifiers) is greater than 1. In still another embodiment, the strengthened cover glass or glass-ceramic sheet 500 may include an alkali aluminosilicate glass composition comprising: 64-68 mol. % $SiO_2$; 12-16 mol. % $Na_2O$; 8-12 mol. % $Al_2O_3$; 0-3 mol. % $B_2O_3$; 2-5 mol. % $K_2O$; 4-6 mol. % MgO; and 0-5 mol. % CaO, wherein: 66 mol. %≤$SiO_2$+$B_2O_3$+CaO≤69 mol. %; $Na_2O$+$K_2O$+$B_2O_3$+MgO+CaO+SrO>10 mol. %; 5 mol. % MgO+CaO+SrO≤8 mol. %; ($Na_2O$+$B_2O_3$)—$Al_2O_3$≤2 mol. %; 2 mol. %≤$Na_2O$—$Al_2O_3$≤6 mol. %; and 4 mol. %≤($Na_2O$+$K_2O$)—$Al_2O_3$10 mol. %. In an alternative embodiment, the strengthened cover glass or glass-ceramic sheet or articles discussed herein may comprise an alkali aluminosilicate glass composition comprising: 2 mol. % or more of $Al_2O_3$ and/or $ZrO_2$, or 4 mol. % or more of $Al_2O_3$ and/or $ZrO_2$.

In contemplated embodiments, examples of suitable glass ceramics for the strengthened cover glass or glass-ceramic sheet or articles discussed herein may include $Li_2O$—$Al_2O_3$—$SiO_2$ system (i.e. LAS-System) glass ceramics, MgO—$Al_2O_3$—$SiO_2$ system (i.e. MAS-System) glass ceramics, and/or glass ceramics that include a predominant crystal phase including β-quartz solid solution, β-spodumene ss, cordierite, and lithium disilicate. The strengthened cover glass or glass-ceramic sheet or article discussed herein may be characterized by the manner in which it is formed. For instance, the strengthened cover glass or glass-ceramic sheet or article discussed herein may be characterized as float-formable (i.e., formed by a float process), down-drawable and, in particular, fusion-formable or slot-drawable (i.e., formed by a down draw process such as a fusion draw process or a slot draw process).

A float-formable strengthened cover glass or glass-ceramic sheet or article may be characterized by smooth surfaces and consistent thickness, and is made by floating molten cover glass on a bed of molten metal, typically tin. In an example process, molten cover glass or glass-ceramic that is fed onto the surface of the molten tin bed forms a floating glass or glass-ceramic ribbon. As the cover glass ribbon flows along the tin bath, the temperature is gradually decreased until the cover glass or glass-ceramic ribbon solidifies into a solid cover glass or glass-ceramic article that can be lifted from the tin onto rollers. Once off the bath, the cover glass or glass-ceramic article can be cooled further and annealed to reduce internal stress. Where the cover glass or glass-ceramic article is a glass ceramic, the cover glass article formed from the float process may be subjected to a ceramming process by which one or more crystalline phases are generated.

Down-draw processes produce cover glass or glass-ceramic articles having a consistent thickness that possess relatively pristine surfaces. Because the average flexural strength of the cover glass or glass-ceramic article is controlled by the amount and size of surface flaws, a pristine surface that has had minimal contact has a higher initial strength. When this high strength cover glass or glass-ceramic article is then further strengthened (e.g., chemically), the resultant strength can be higher than that of a cover glass or glass-ceramic article with a surface that has been lapped and polished. Down-drawn cover glass or glass-ceramic articles may be drawn to a thickness of less than about 2 mm. In addition, down-drawn cover glass or glass-ceramic articles have a very flat, smooth surface that can be used in its final application without costly grinding and polishing. Where the cover glass or glass-ceramic article is a glass ceramic, the cover glass or glass-ceramic article formed from the down-draw process may be subjected to a ceramming process by which one or more crystalline phases are generated.

The fusion draw process, for example, uses a drawing tank that has a channel for accepting molten glass raw material. The channel has weirs that are open at the top along the length of the channel on both sides of the channel. When the channel fills with molten material, the molten glass overflows the weirs. Due to gravity, the molten glass flows down the outside surfaces of the drawing tank as two flowing glass films. These outside surfaces of the drawing tank extend down and inwardly so that they join at an edge below the drawing tank. The two flowing glass films join at this edge to fuse and form a single flowing cover glass article. The fusion draw method offers the advantage that, because the two cover glass films flowing over the channel fuse together, neither of the outside surfaces of the resulting cover glass article comes in contact with any part of the apparatus. Thus, the surface properties of the fusion drawn cover glass article are not affected by such contact. Where the cover glass or glass-ceramic article is a glass ceramic, the cover glass or glass-ceramic article formed from the fusion process may be subjected to a ceramming process by which one or more crystalline phases are generated.

The slot draw process is distinct from the fusion draw method. In slot draw processes, the molten raw material glass is provided to a drawing tank. The bottom of the drawing tank has an open slot with a nozzle that extends the length of the slot. The molten glass flows through the slot/nozzle and is drawn downward as a continuous cover glass article and into an annealing region. Where the cover glass or glass-ceramic article is a glass ceramic, the cover glass article formed from the slot draw process may be subjected to a ceramming process by which one or more crystalline phases are generated.

In some embodiments, the cover glass article may be formed using a thin rolling process, as described in U.S. Pat. Nos. 8,713,972, 9,003,835, U.S. Patent Publication No. 2015/0027169, and U.S. Patent Publication No. 20050099618, the contents of which are incorporated herein by reference in their entirety. More specifically the cover glass or glass-ceramic article may be formed by supplying a vertical stream of molten glass, forming the supplied stream of molten glass or glass-ceramic with a pair of forming rolls, maintained at a surface temperature of about 500° C. or higher or about 600° C. or higher, to form a formed cover glass ribbon having a formed thickness, sizing the formed ribbon of glass with a pair of sizing rolls, maintained at a surface temperature of about 400° C. or lower to produce a sized glass ribbon having a desired thickness less than the formed thickness and a desired thickness consistency. The apparatus used to form the cover glass ribbon may include a glass feed device for supplying a supplied stream of molten glass; a pair of forming rolls maintained at a surface temperature of about 500° C. or higher, the forming rolls being spaced closely adjacent each other, defining a glass forming gap between the forming rolls with the glass forming gap located vertically below the glass feed device for receiving the supplied stream of molten glass and thinning the supplied stream of molten glass between the forming rolls to form a formed glass ribbon having a formed thickness; and a pair of sizing rolls maintained at a surface temperature of about 400° C. or lower, the sizing rolls being spaced closely adjacent each other, defining a glass sizing gap between the sizing rolls with the cover glass sizing gap located vertically below the forming rolls for receiving the formed cover glass ribbon and thinning the formed cover glass ribbon to produce a sized cover glass ribbon having a desired thickness and a desired thickness consistency.

In some instances, the thin rolling process may be utilized where the viscosity of the glass does not permit use of fusion or slot draw methods. For example, thin rolling can be utilized to form the cover glass or glass-ceramic articles when the glass exhibits a liquidus viscosity less than 100 kP. The cover glass or glass-ceramic article may be acid polished or otherwise treated to remove or reduce the effect of surface flaws.

In contemplated embodiments, the cover glass or glass-ceramic sheet or article discussed herein has a composition that differs by side surface. On one side of the cover glass or glass-ceramic sheet 500, an exemplary composition is: 69-75 wt. % $SiO_2$, 0-1.5 wt. % $Al_2O_3$, 8-12 wt. % CaO, 0-0.1 wt. % Cl, 0-500 ppm Fe, 0-500 ppm K, 0.0-4.5 wt. % MgO, 12-15 wt. % $Na_2O$, 0-0.5 wt. % $SO_3$, 0-0.5 wt. % $SnO_2$, 0-0.1 wt. % SrO, 0-0.1 wt. % $TiO_2$, 0-0.1 wt. % ZnO, and/or 0-0.1 wt. % $ZrO_2$. On the other side of the cover glass or glass-ceramic sheet or article discussed herein an exemplary composition is: 73.16 wt. % $SiO_2$, 0.076 wt. % $Al_2O_3$, 9.91 wt. % CaO, 0.014 wt. % Cl, 0.1 wt. % $Fe_2O_3$, 0.029 wt. % $K_2O$, 2.792 wt. % MgO, 13.054 wt. % $Na_2O$, 0.174 wt. % $SO_3$, 0.001 $SnO_2$, 0.01 wt. % SrO, 0.01 wt. % $TiO_2$, 0.002 wt. % ZnO, and/or 0.005 wt. % $ZrO_2$.

In other contemplated embodiments, composition of the cover glass or glass-ceramic sheet or article discussed herein includes $SiO_2$ 55-85 wt. %, $Al_2O_3$ 0-30 wt. %, $B_2O_3$ 0-20 wt. %, $Na_2O$ 0-25 wt. %, CaO 0-20 wt. %, $K_2O$ 0-20 wt. %, MgO 0-15 wt. %, BaO 5-20 wt. %, $Fe_2O_3$ 0.002-0.06 wt. %, and/or $Cr_2O_3$ 0.0001-0.06 wt. %. In other contemplated embodiments, composition of the cover glass or glass-ceramic sheet or article discussed herein includes $SiO_2$ 60-72 mol. %, $Al_2O_3$ 3.4-8 mol. %, $Na_2O$ 13-16 mol. %, $K_2O$ 0-1 mol. %, MgO 3.3-6 mol. %, $TiO_2$ 0-0.2 mol. %, $Fe_2O_3$ 0.01-0.15 mol. %, CaO 6.5-9 mol. %, and/or $SO_3$ 0.02-0.4 mol. %.

EXAMPLES

Apparatus setup—As detailed above, the apparatus comprises three zones—a hot zone, a transition zone, and a cool or quench zone. The gaps between the top and bottom thermal bearings (heat sinks) in the hot zone and the quench zone are set to the desired spacings. Gas flow rates in the hot zone, transition zone, and quench zone are set to ensure centering of the glass material, sheet or part on the air-bearing. The hot zone is pre-heated to the desired $T_0$, the temperature from which the glass article will be subsequently quenched. To ensure uniform heating, cover glass articles are pre-heated in a separate pre-heating apparatus, such as a batch or continuous furnace. Generally, cover glass sheets are pre-heated for greater than 5 minutes prior to loading in the hot zone. For soda-lime glasses, pre-heating is done around 450° C. After the pre-heat phase, the cover glass article is loaded into the hot zone and allowed to equilibrate, where equilibration is where the glass is uniformly at $T_0$. $T_0$ can be determined by the level of strengthening/tempering desired, but is generally kept in the range between the softening point and the glass transition temperature. The time to equilibration is dependent at least on the thickness of the cover glass. For example, for cover glass sheets of approximately 1.1 mm or less, equilibration occurs in approximately 10 seconds. For 3 mm cover glass sheets, equilibration occurs in approximately 10 seconds to 30 seconds. For thicker sheets, up to approximately 6 mm, the equilibration time may be on the order of 60 seconds. Once the cover glass has equilibrated to $T_0$, it is rapidly transferred through the transition zone on air bearings and into the cool or quench zone. The cover glass article rapidly quenches in the quench zone to a temperature below the glass transition temperature, Tg. The cover glass sheet can be maintained in the quench zone for any period of time from 1 second, 10 seconds, or to several minutes or more, depending on the degree of quench desired and/or the desired temperature of the cover glass at removal. Upon removal the cover glass is optionally allowed to cool before handling.

The following examples are summarized in Table VI.

Example 1—A soda-lime silicate glass plate (e.g., glass comprising at least 70% silicon dioxide by weight, and/or at least 10% sodium oxide by weight, and/or at least 7% calcium oxide by weight) of 5.7 mm thickness is pre-heated for 10 minutes at 450° C. before transferring to the hot zone where it is held at a $T_0$ of 690° C. for 60 seconds. After equilibrating to $T_0$, it is rapidly transferred to the quench zone filled with helium, which has a gap of 91 µm (wherein the gap is the distance between the surface of the glass sheet and the nearest heat sink), where it is held for 10 seconds. The resulting article has a surface compression of −312 MPa, a central tension of 127 MPa, and a flatness of 83 µm.

Example 2—A soda-lime silicate glass plate of 5.7 mm thickness is pre-heated for 10 minutes at 450° C. before transferring to the hot zone where it is held at a $T_0$ of 690° C. for 60 seconds. After equilibrating it is rapidly transferred to the quench zone, which has a gap of 91 µm, where it is held for 10 seconds. The resulting article has a surface compression of −317 MPa, a central tension of 133 MPa, and a flatness of about 89.7 micrometers.

Example 3—A soda-lime silicate glass plate of 1.1 mm thickness is pre-heated for 10 minutes at 450° C. before transferring to the hot zone where it is held at a $T_0$ of 700° C. for 10 seconds. After equilibrating it is rapidly transferred to the quench zone filled with helium, which has a gap of 56 µm, where it is held for 10 seconds. The resulting article has a surface fictive temperature measured to be 661° C., a surface compression of −176 MPa, a central tension of 89 MPa, a flatness of 190 µm, and a Vicker's cracking threshold of 10-20 N.

Example 4—A soda-lime silicate glass plate of 0.55 mm thickness is pre-heated for 10 minutes at 450° C. before transferring to the hot zone where it is held at a $T_0$ of 720° C. for 10 seconds. After equilibrating it is rapidly transferred to the quench zone, which has a gap of 25 μm, where it is held for 10 seconds, resulting in an effective heat transfer rate of 0.184 cal/(cm²-s-° C.). The resulting article has a surface compression of −176 MPa and a central tension of 63 MPa. Also, the resulting strengthened articles had a flatness of about 168 (for the initial 710° C. temperature sample) and 125 micrometers (for the initial 720° C. temperature sample).

Example 5—A CORNING® GORILLA® Glass plate of 1.5 mm thickness is pre-heated for 10 minutes at 550° C. before transferring to the hot zone where it is held at a $T_0$ of 790° C. for 30 seconds. After equilibrating it is rapidly transferred to the quench zone, which has a gap of 226 μm, where it is held for 10 seconds. The glass article has an improvement in flatness measured to be 113 μm pre-processing and 58 μm post-processing.

Example 6—A soda-lime silicate glass plate of 0.7 mm thickness is pre-heated for 10 minutes at 450° C. before transferring to the hot zone where it is held at a $T_0$ of 730° C. for 10 seconds. After equilibrating it is rapidly transferred to the quench zone filled with helium, which has a gap of 31 μm, where it is held for 10 seconds, resulting in an effective heat transfer rate of 0.149 cal/(cm²-s-° C.). The resulting article has a surface compression of −206 MPa, a central tension of 100 MPa, and a flatness of 82 μm. Upon fracture, the glass sheet is observed to "dice" (using standard terminology for 2 mm thickness or greater sheet dicing—i.e., a 5×5 cm square of glass sheet breaks into 40 or more pieces) suggesting that the sheet is fully tempered.

Example 7—A Borofloat-33 glass plate of 3.3 mm thickness is pre-heated for 10 minutes at 550° C. before transferring to the hot zone where it is held at a $T_0$ of 800° C. for 30 seconds. After equilibrating it is rapidly transferred to the quench zone, which has a gap of 119 μm, where it is held for 10 seconds. The resulting article has a flatness of 120 μm. Upon fracture of the part it is observed to "dice" (using standard terminology for 2 mm or greater thickness sheet dicing—i.e., a 5×5 cm square of glass sheet breaks into 40 or more pieces) showing that the sheet is fully tempered.

Example 8—A soda-lime silicate glass plate of 3.2 mm thickness is pre-heated for 10 minutes at 450° C. before transferring to the hot zone where it is held at a $T_0$ of 690° C. for 30 seconds. After equilibrating it is rapidly transferred to the quench zone, which has a gap of 84 μm, where it is held for 10 seconds. The resulting article has a surface compression of −218 MPa, a central tension of 105 MPa, and a flatness of 84 μm.

Example 9—A soda-lime silicate glass plate of 0.3 mm thickness is pre-heated for 10 minutes at 450° C. before transferring to the hot zone where it is held at a $T_0$ of 630° C. for 10 seconds. After equilibrating it is rapidly transferred to the quench zone, which has a gap of 159 μm, where it is held for 10 seconds. The resulting article has membrane stresses which are observable by gray field polarimetry, suggesting the glass has incorporated the thermal stress.

Example 10—A CORNING® GORILLA® Glass plate of 0.1 mm thickness is pre-heated for 10 minutes at 550° C. before transferring to the hot zone where it is held at a $T_0$ of 820° C. for 10 seconds. After equilibrating it is rapidly transferred to the quench zone, which has a gap of 141 μm, where it is held for 10 seconds, resulting in an effective heat transfer rate of 0.033 cal/(cm²-s-° C.). Upon fracture, the resulting article displays behavior consistent with a residually stressed glass.

Example 11—A soda-lime silicate glass plate of 1.1 mm thickness is pre-heated for 10 minutes at 450° C. before transferring to the hot zone where it is held at a $T_0$ of 700° C. for 10 seconds. After equilibrating it is rapidly transferred to the quench zone, which has a gap of 65 μm, where it is held for 10 seconds, resulting in an effective heat transfer rate of 0.07 cal/(cm²-s-° C.). The resulting article has a surface fictive temperature measured to be 657° C., a surface compression of −201 MPa, a central tension of 98 MPa, a flatness of 158 μm, and a Vicker's cracking threshold of 10-20 N.

Example 12—A CORNING® GORILLA® Glass plate of 1.1 mm thickness is pre-heated for 10 minutes at 550° C. before transferring to the hot zone where it is held at a $T_0$ of 810° C. for 10 seconds. After equilibrating it is rapidly transferred to the quench zone which has a gap of 86 μm, where it is held for 10 seconds, resulting in an effective heat transfer rate of 0.058 cal/(cm²-s-° C.). The resulting article has a surface fictive temperature measured to be 711° C., a surface compression of −201 MPa, a central tension of 67 MPa, and a Vicker's cracking threshold of 20-30 N.

Example 13—A CORNING® GORILLA® Glass plate of 1.1 mm thickness is pre-heated for 10 minutes at 550° C. before transferring to the hot zone where it is held at a $T_0$ of 800° C. for 10 seconds. After equilibrating it is rapidly transferred to the quench zone, which has a gap of 91 μm, where it is held for 10 seconds. The resulting article has a surface fictive temperature measured to be 747° C., a surface compression of −138 MPa, a central tension of 53 MPa, a flatness of 66 μm, and a Vicker's cracking threshold of 20-30 N.

TABLE VI

| Example | Thickness (mm) | Composition | Gaps (um) | $T_0$ | Gas | CS (MPa) | CT (MPa) | Flatmaster (um) | Fictive (° C.) | Vickers (N) |
|---|---|---|---|---|---|---|---|---|---|---|
| 1 | 5.7 | SLG | 91 | 690 | Helium | −312 | 127 | 83 | — | — |
| 2 | 5.7 | SLG | 91 | 690 | Helium | −317 | 133 | 90 | — | — |
| 3 | 1.1 | SLG | 56 | 700 | Helium | −176 | 89 | 190 | 661.3 | 10-20 |
| 4 | 0.55 | SLG | 25 | 720 | Helium | −176 | 63 | 125 | — | — |
| 5 | 1.5 | GG | 226 | 790 | Helium | — | — | 113 before/58 after | — | — |
| 6 | 0.7 | SLG | 31 | 730 | Helium | −206 | 100 | 82 | — | — |
| 7 | 3.3 | Borofloat 33 | 119 | 800 | Helium | — | — | 121 | — | — |
| 8 | 3.2 | SLG | 84 | 690 | Helium | −218 | 105 | 81 | — | — |
| 9 | 0.3 | SLG | 159 | 630 | Helium | — | — | — | — | — |
| 10 | 0.1 | GG | 141 | 820 | Helium | — | — | — | — | — |
| 11 | 1.1 | SLG | 65 | 700 | Helium | −201 | 98 | 158 | 657 | 10-20 |
| 12 | 1.1 | GG | 86 | 810 | Helium | −201 | 67 | — | 711 | 20-30 |
| 13 | 1.1 | GG | 91 | 800 | Helium | −138 | 53 | 66 | 747 | 20-30 |

Additional Example—a 5.7 mm thick sheet of glass comprising at least 70% silicon dioxide by weight, and/or at least 10% sodium oxide by weight, and/or at least 7% calcium oxide by weight was run with helium gas and gaps 204*a*, 204*b* (FIG. 21) of about 90 micrometers. The glass was heated to an initial temperature of about 690° C. and quickly cooled. The resulting strengthened article had a negative tensile stress of about 300 MPa on surfaces thereof and a positive tensile stress of about 121 MPa in the center. Also, the resulting strengthened article had a flatness of about 106.9 micrometers.

Additional Example—In one experiment using inventive technology disclosed herein, a 1.1 mm thick sheet of glass comprising at least 70% silicon dioxide by weight, and/or at least 10% sodium oxide by weight, and/or at least 7% calcium oxide by weight was run with helium gas and gaps 204*a*, 204*b* (FIG. 21) of about 160 micrometers. The glass was heated to an initial temperature of about 680° C. and quickly cooled. The resulting strengthened article had a negative tensile stress of about 112 MPa on surfaces thereof and a positive tensile stress of about 54 MPa in the center. Prior to strengthening, the sheet of glass had a flatness of about 96 micrometers, but the resulting strengthened article had a flatness of about 60 micrometers. Accordingly, the strengthening process also flattened the strengthened glass or glass ceramic article.

Other aspects and advantages will be apparent from a review of the specification as a whole and the appended claims.

The construction and arrangements of the cover glass and glass-ceramic, as shown in the various exemplary embodiments, are illustrative only. Although only a few embodiments have been described in detail in this disclosure, many modifications are possible (e.g., variations in sizes, dimensions, structures, shapes, and proportions of the various elements, values of parameters, mounting arrangements, use of materials, colors, orientations) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present inventive technology.

What is claimed is:

1. A glass sheet for use in or on consumer electronic products, the glass sheet comprising:
    glass comprising soda-lime glass, alkali aluminosilicate glass, alkali-containing borosilicate glass, alkali aluminophosphosilicate glass, or alkali aluminoborosilicate glass;
    a first major surface opposite a second major surface with an interior region located therebetween;
    wherein surface fictive temperature measured on the first major surface is at least 50° C. above a glass transition temperature of the glass of the glass sheet;
    wherein an average thickness between the first and second major surfaces is less than 2 mm;
    wherein an ion content and chemical constituency of at least a portion of both the first major surface and the second major surface is the same as an ion content and chemical constituency of at least a portion of the interior region;
    wherein the first and second major surfaces are under compressive stress greater than 150 MPa and at least a portion of the interior region is under tensile stress;
    wherein a surface roughness of the first major surface is between 0.2 and 1.5 nm Ra roughness.

2. The glass sheet of claim 1, wherein stress within the glass sheet varies as a function of position relative to the first and second major surfaces, wherein the stress has a change of at least 200 MPa over a distance of less than 500 μm of thickness of the glass sheet.

3. The glass sheet of claim 1, wherein a surface roughness of the second major surface is between 0.2 and 1.5 nm Ra roughness.

4. The glass sheet of claim 1, wherein the first and second major surfaces are flat to at least 50 μm total indicator run-out along a 50 mm profile of the first and second major surfaces.

5. The glass sheet of claim 1, wherein the areas of the first and second major surfaces are at least 2500 mm$^2$.

6. The glass sheet of claim 1, wherein thickness of the glass sheet is about 0.1 mm to about 1.5 mm.

7. The glass sheet of claim 6, wherein the glass sheet at the thickness thereof exhibits an average light transmission over a wavelength range from 400 nm to 780 nm of 85% or greater.

8. The glass sheet of claim 6, wherein the glass sheet further comprises a depth of compression that is greater than 17% of the thickness.

9. The glass sheet of claim 1, wherein the glass of the glass sheet has a coefficient of thermal expansion greater than $40 \times 10^{-7}/°$ C.

10. A glass sheet for use in or on consumer electronic products, the glass sheet comprising:
    glass comprising soda-lime glass, alkali aluminosilicate glass, alkali-containing borosilicate glass, alkali aluminophosphosilicate glass, or alkali aluminoborosilicate glass;
    a first major surface opposite a second major surface with an interior region located therebetween;
    wherein surface fictive temperature measured on the first major surface is at least 50° C. above a glass transition temperature of the glass of the glass sheet;
    wherein an average thickness between the first and second major surfaces is less than 2 mm;
    wherein an ion content and chemical constituency of at least a portion of both the first major surf ace and the second major surface is the same as an ion content and chemical constituency of at least a portion of the interior region;
    wherein the first and second major surfaces are under compressive stress greater than 150 MPa and at least a portion of the interior region is under tensile stress;
    wherein a surface roughness of the first major surface is between 0.2 and 1.5 nm Ra roughness, and wherein a surface roughness of the second major surface is between 0.2 and 1.5 nm Ra roughness;
    wherein stress within the glass sheet varies as a function of position relative to the first and second major surfaces, wherein the stress has a change of at least 200 MPa over a distance of less than 500 μm of thickness of the glass sheet.

11. The glass sheet of claim 10, wherein the first and second major surfaces are flat to at least 50 μm total indicator run-out along a 50 mm profile of the first and second major surfaces.

12. The glass sheet of claim 10, wherein the areas of the first and second major surfaces are at least 2500 mm$^2$.

13. The glass sheet of claim 10, wherein thickness of the glass sheet is about 0.1 mm to about 1.5 mm.

14. The glass sheet of claim 13, wherein the glass sheet at the thickness thereof exhibits an average light transmission over a wavelength range from 400 nm to 780 nm of 85% or greater.

15. The glass sheet of claim 13, wherein the glass sheet further comprises a depth of compression that is greater than 17% of the thickness.

16. The glass sheet of claim 10, wherein the glass of the glass sheet has a coefficient of thermal expansion greater than $40 \times 10^{-7}$° C.

17. A glass sheet for use in or on consumer electronic products, the glass sheet comprising:
  glass comprising soda-lime glass, alkali aluminosilicate glass, alkali-containing borosilicate glass, alkali aluminophosphosilicate glass, or alkali aluminoborosilicate glass;
  a first major surface opposite a second major surface with an interior region located therebetween;
  wherein surface fictive temperature measured on the first major surface is at least 50° C. above a glass transition temperature of the glass of the glass sheet;
  wherein an average thickness between the first and second major surfaces is less than 2 mm;
  wherein an ion content and chemical constituency of at least a portion of both the first major surface and the second major surface is the same as an ion content and chemical constituency of at least a portion of the interior region;
  wherein the first and second major surfaces are under compressive stress greater than 150 MPa and at least a portion of the interior region is under tensile stress;
  wherein a surface roughness of the first major surface is between 0.2 and 1.5 nm Ra roughness;
  wherein the areas of the first and second major surfaces are at least 2500 mm$^2$; and
  wherein the glass sheet further comprises a depth of compression that is greater than 17% of the thickness.

18. The glass sheet of claim 17, wherein stress within the glass sheet varies as a function of position relative to the first and second major surfaces, wherein the stress has a change of at least 200 MPa over a distance of less than 500 μm of thickness of the glass sheet.

19. The glass sheet of claim 17, wherein a surface roughness of the second major surface is between 0.2 and 1.5 nm Ra roughness.

20. The glass sheet of claim 17, wherein the first and second major surfaces are flat to at least 50 μm total indicator run-out along a 50 mm profile of the first and second major surfaces.

* * * * *

UNITED STATES PATENT AND TRADEMARK OFFICE
CERTIFICATE OF CORRECTION

PATENT NO. : 11,891,324 B2
APPLICATION NO. : 17/380461
DATED : February 6, 2024
INVENTOR(S) : Peter Joseph Lezzi et al.

Page 1 of 3

It is certified that error appears in the above-identified patent and that said Letters Patent is hereby corrected as shown below:

On the Title Page

On page 2, in Column 1, in Item (63) "Related U.S. Patent Documents", Lines 7-8, delete "which is" and insert -- and --.

On page 6, in Column 1, Item (56) under "Other Publications", Line 17, delete ", ," and insert -- , --.

On page 6, in Column 1, Item (56) under "Other Publications", Line 22, after "2008," insert -- 075107, --.

On page 6, in Column 2, Item (56) under "Other Publications", Line 19, delete "Writien Opinin" and insert -- Written Opinion --.

On page 6, in Column 2, Item (56) under "Other Publications", Line 21, delete "Writien" and insert -- Written --.

On page 6, in Column 2, Item (56) under "Other Publications", Line 24, delete "Writien" and insert -- Written --.

On page 6, in Column 2, Item (56) under "Other Publications", Line 26, delete "Writien" and insert -- Written --.

On page 7, in Column 1, Item (56) under "Other Publications", Line 2, delete "Manufactureing," and insert -- Manufacturing, --.

On page 7, in Column 2, Item (56) under "Other Publications", Line 30, delete "Dalasheet" and insert -- Datasheet --.

On page 7, in Column 2, Item (56) under "Other Publications", Line 61, delete "32A" and insert -- 32 --.

Signed and Sealed this
Second Day of July, 2024

Katherine Kelly Vidal
*Director of the United States Patent and Trademark Office*

CERTIFICATE OF CORRECTION (continued)
U.S. Pat. No. 11,891,324 B2

On page 7, in Column 2, Item (56) under "Other Publications", Line 69, delete "Waxachachie" and insert -- Waxahachie --.

On page 8, in Column 2, Item (56) under "Other Publications", Line 4, delete "Mass En," and insert -- Massen," --.

On page 8, in Column 2, Item (56) under "Other Publications", Line 5, delete "andscape,"" and insert -- landscape," --.

On page 8, in Column 2, Item (56) under "Other Publications", Line 13, delete "II" and insert -- It --.

On page 8, in Column 2, Item (56) under "Other Publications", Line 19, delete "A_" and insert -- A. --.

On page 8, in Column 2, Item (56) under "Other Publications", Line 35, delete "0." and insert -- O. --.

On page 9, in Column 1, Item (56) under "Other Publications", Line 24, delete "[8J Journal of Shangdong" and insert -- Journal of Shandong --.

On page 9, in Column 1, Item (56) under "Other Publications", Line 28, delete "Shangdong" and insert -- Shandong --.

On page 9, in Column 2, Item (56) under "Other Publications", Line 7, delete "offictive" and insert -- of fictive --.

On page 9, in Column 2, Item (56) under "Other Publications", Line 33, delete "(Orignal" and insert -- (Original --.

On page 9, in Column 2, Item (56) under "Other Publications", Line 54, delete "Biillleness" and insert -- Brittleness --.

On page 10, in Column 1, Item (56) under "Other Publications", Line 7, delete "IIMI" and insert -- IMI --.

On page 10, in Column 1, Item (56) under "Other Publications", Line 10, delete "empered" and insert -- tempered --.

On page 10, in Column 1, Item (56) under "Other Publications", Line 61, delete ""Themal" and insert -- "Thermal --.

On page 10, in Column 1, Item (56) under "Other Publications", Line 65, delete "Sprectroscopy," and insert -- Spectroscopy, --.

In the Claims

In Column 56, Line 51, in Claim 10, delete "surf ace" and insert -- surface --.

In Column 57, Line 18, in Claim 16, delete "40×10$^{-7\circ}$ C." and insert -- 40×10$^{-7}$/° C. --.

In Column 58, Line 4, in Claim 17, delete "surf ace" and insert -- surface --.